(12) United States Patent
Kluss et al.

(10) Patent No.: US 12,553,555 B2
(45) Date of Patent: Feb. 17, 2026

(54) DEVICE AND METHOD FOR ASSEMBLING COMPONENTS OF A PLUMBING FITTING

(71) Applicant: RELIANCE WORLDWIDE CORPORATION, Atlanta, GA (US)

(72) Inventors: William Vernon Kluss, Brisbane (AU); Derres Catalano, Roswell, GA (US); Sai Kishore Ravisankar, Alpharetta, GA (US); Randy Graves, Atlanta, GA (US); Eliana Pippen, Powder Springs, GA (US); Samantha Kelly, New York, NY (US)

(73) Assignee: Reliance Worldwide Corporation, Atlanta, GA (US)

( * ) Notice: Subject to any disclaimer, the term of this patent is extended or adjusted under 35 U.S.C. 154(b) by 154 days.

(21) Appl. No.: 18/143,960

(22) Filed: May 5, 2023

(65) Prior Publication Data
US 2023/0288001 A1    Sep. 14, 2023

Related U.S. Application Data

(63) Continuation-in-part of application No. 17/932,024, filed on Sep. 14, 2022, now Pat. No. 12,049,974, and
(Continued)

(51) Int. Cl.
*F16L 37/091* (2006.01)
*B23P 19/10* (2006.01)
(Continued)

(52) U.S. Cl.
CPC ....... *F16L 37/0915* (2016.05); *F16L 55/1157* (2013.01); *B23P 19/10* (2013.01);
(Continued)

(58) Field of Classification Search
CPC .... B23P 19/10; B23P 19/12; Y10T 29/49945; Y10T 29/49876; B21D 39/04; B21D 39/046; B21D 39/048; B25B 27/10
See application file for complete search history.

(56) References Cited

U.S. PATENT DOCUMENTS

| 788,600 A | 5/1905 | Rogers |
| D194,015 S | 11/1962 | Stringham |

(Continued)

FOREIGN PATENT DOCUMENTS

| AT | 512772 B1 | 11/2013 |
| CN | 202812590 U | 3/2013 |

(Continued)

OTHER PUBLICATIONS

Design U.S. Appl. No. 29/677,195, filed Jan. 17, 2019; Reliance Worldwide Corporation.
(Continued)

*Primary Examiner* — Sarang Afzali
(74) *Attorney, Agent, or Firm* — Barnes & Thornburg LLP

(57) ABSTRACT

A system for manufacturing a connector assembly includes a connector body, a retainer sleeve and a tool member. The tool member is acted upon by an actuating fixture to travel a distance relative to the connector body to press the retainer sleeve over a portion of the connector body. The tool member further includes a plurality of latch engagement portions equally spaced about the tool member to press a respective one of a plurality of latches of the retainer sleeve inwardly to provide an effective latch with the connector body. A method of mounting the retainer sleeve over a portion of the connector body is done simultaneously while pushing the plurality of latches located on the retainer sleeve to secure the retainer sleeve to the connector body.

12 Claims, 44 Drawing Sheets

Related U.S. Application Data a continuation-in-part of application No. 17/930,814, filed on Sep. 9, 2022, said application No. 17/932,024 is a continuation of application No. 17/048,557, filed as application No. PCT/US2019/025851 on Apr. 4, 2019, now Pat. No. 11,525,534, said application No. 17/930,814 is a continuation-in-part of application No. 17/048,557, filed as application No. PCT/US2019/025851 on Apr. 4, 2019, now Pat. No. 11,525,534.

(60) Provisional application No. 63/339,164, filed on May 6, 2022, provisional application No. 63/242,951, filed on Sep. 10, 2021, provisional application No. 62/718,562, filed on Aug. 14, 2018.

(51) Int. Cl.
*F16L 55/115* (2006.01)
*F16L 41/02* (2006.01)
*F16L 41/03* (2006.01)

(52) U.S. Cl.
CPC ........... *F16L 41/021* (2013.01); *F16L 41/023* (2013.01); *F16L 41/03* (2013.01); *Y10T 29/49945* (2015.01)

(56) References Cited

U.S. PATENT DOCUMENTS

| | | | |
|---|---|---|---|
| 3,819,207 A | 6/1974 | Leopold, Jr. | |
| 4,026,006 A * | 5/1977 | Moebius | B21D 39/04 29/520 |
| 4,248,460 A | 2/1981 | Murray et al. | |
| 4,265,470 A | 5/1981 | Danner | |
| 4,406,485 A | 9/1983 | Giebeler | |
| 4,407,526 A | 10/1983 | Cicenas | |
| 4,431,216 A | 2/1984 | Legris | |
| 4,642,155 A | 2/1987 | Ramsey | |
| 4,993,755 A | 2/1991 | Johnston | |
| 5,299,838 A | 4/1994 | Yang | |
| D354,801 S | 1/1995 | Grant et al. | |
| 5,413,386 A | 5/1995 | Dal Palú | |
| 5,538,297 A * | 7/1996 | Mc Naughton | F16L 37/0985 285/379 |
| 5,584,513 A | 12/1996 | Sweeny et al. | |
| 5,692,784 A | 12/1997 | Hama et al. | |
| 5,868,435 A * | 2/1999 | Bartholomew | F16L 33/2071 29/451 |
| 5,921,588 A | 7/1999 | Vogel et al. | |
| 6,027,143 A | 2/2000 | Berg et al. | |
| 6,027,144 A | 2/2000 | Hagen et al. | |
| 6,095,570 A | 8/2000 | Hagen et al. | |
| 6,258,197 B1 | 7/2001 | Helander | |
| D449,515 S | 10/2001 | Sato | |
| 6,334,634 B1 | 1/2002 | Osterkil | |
| D461,545 S | 8/2002 | Nishio | |
| 6,443,500 B1 | 9/2002 | Inoue et al. | |
| D482,761 S | 11/2003 | Gotoh et al. | |
| 6,913,292 B2 | 7/2005 | Synder, Sr. et al. | |
| 6,964,436 B2 | 11/2005 | Le Quere | |
| 7,025,842 B2 | 4/2006 | Monsheimer et al. | |
| D529,998 S | 10/2006 | Mutou | |
| 7,270,349 B2 | 9/2007 | Bamberger et al. | |
| 7,293,804 B2 | 11/2007 | Li et al. | |
| 7,384,074 B2 | 6/2008 | He | |
| 7,475,913 B2 | 1/2009 | Muto | |
| 7,621,569 B2 | 11/2009 | Anthoine | |
| D615,165 S | 5/2010 | McAlpine et al. | |
| 7,850,208 B2 | 12/2010 | Greenberger | |
| 7,862,089 B2 | 1/2011 | Crompton | |
| 7,867,420 B2 | 1/2011 | Wolter | |
| D638,919 S | 5/2011 | Grether | |
| 8,025,318 B1 | 9/2011 | Morroney et al. | |
| 8,205,915 B1 | 6/2012 | Crompton et al. | |
| 8,210,576 B2 | 7/2012 | Crompton | |
| 8,398,122 B2 | 3/2013 | Crompton et al. | |
| 8,480,134 B2 | 7/2013 | Crompton et al. | |
| 8,746,752 B2 | 6/2014 | Hayashi et al. | |
| D710,485 S | 8/2014 | Nudo | |
| D710,977 S | 8/2014 | Chen | |
| 8,813,348 B2 * | 8/2014 | Williams | B23P 19/10 700/114 |
| D713,943 S | 9/2014 | Luke | |
| 8,844,981 B1 | 9/2014 | Crompton et al. | |
| 8,857,861 B2 | 10/2014 | German et al. | |
| D722,362 S | 2/2015 | Kluss et al. | |
| D722,363 S | 2/2015 | Kluss et al. | |
| 9,052,023 B2 | 6/2015 | Janousek | |
| 9,068,680 B1 | 6/2015 | Crompton et al. | |
| 9,217,529 B2 | 12/2015 | Crompton et al. | |
| D746,951 S | 1/2016 | Gledhill et al. | |
| D746,952 S | 1/2016 | Gledhill et al. | |
| D746,953 S | 1/2016 | Gledhill et al. | |
| D746,954 S | 1/2016 | Gledhill et al. | |
| D746,958 S | 1/2016 | Gledhill et al. | |
| 9,228,681 B2 | 1/2016 | Kluss | |
| D751,673 S | 3/2016 | Gledhill et al. | |
| D751,674 S | 3/2016 | Gledhill et al. | |
| D751,675 S | 3/2016 | Gledhill et al. | |
| D754,303 S | 4/2016 | Smith | |
| 9,322,496 B1 | 4/2016 | Crompton et al. | |
| D756,494 S | 5/2016 | Gledhill et al. | |
| 9,447,906 B2 | 9/2016 | Bobo et al. | |
| 9,541,228 B2 | 1/2017 | Bobo et al. | |
| 9,574,691 B1 | 2/2017 | Crompton et al. | |
| D788,600 S | 6/2017 | Lee et al. | |
| 9,671,049 B1 | 6/2017 | Crompton et al. | |
| 9,772,058 B2 | 9/2017 | Le Quere | |
| 9,777,875 B2 | 10/2017 | Bobo et al. | |
| 9,816,655 B2 | 11/2017 | Crompton et al. | |
| 9,822,912 B2 | 11/2017 | Crompton et al. | |
| 9,879,810 B2 | 1/2018 | Crompton et al. | |
| 9,903,518 B2 | 2/2018 | Clason et al. | |
| 9,920,866 B2 | 3/2018 | Crompton et al. | |
| 9,958,100 B2 | 5/2018 | Williams et al. | |
| 10,006,575 B2 | 6/2018 | Bobo et al. | |
| D823,442 S | 7/2018 | Sugatani et al. | |
| 10,016,856 B2 | 7/2018 | Neal et al. | |
| 10,072,783 B2 | 9/2018 | Gledhill et al. | |
| D830,522 S | 10/2018 | De Liberto | |
| 10,094,500 B2 | 10/2018 | Crompton et al. | |
| 10,114,326 B2 | 10/2018 | Yamashita | |
| D833,581 S | 11/2018 | Atwell et al. | |
| 10,180,202 B2 | 1/2019 | Crompton et al. | |
| 10,458,582 B2 | 10/2019 | Williams et al. | |
| 10,480,699 B2 | 11/2019 | Meister et al. | |
| 10,550,966 B2 | 2/2020 | Blomberg | |
| 10,578,235 B2 | 3/2020 | Graham et al. | |
| 10,584,820 B2 | 3/2020 | Williams et al. | |
| 10,619,780 B2 | 4/2020 | Clason et al. | |
| D886,250 S | 6/2020 | Ji Ho et al. | |
| 10,704,722 B2 | 7/2020 | Williams et al. | |
| D902,360 S | 11/2020 | Kluss et al. | |
| 10,850,451 B2 | 12/2020 | Lennon et al. | |
| D908,846 S | 1/2021 | Kluss et al. | |
| D908,847 S | 1/2021 | Kluss et al. | |
| D908,848 S | 1/2021 | Kluss et al. | |
| 10,962,153 B2 | 3/2021 | Kluss et al. | |
| 10,969,047 B1 | 4/2021 | Crompton et al. | |
| D919,775 S | 5/2021 | Kluss et al. | |
| 11,002,395 B2 | 5/2021 | Williams et al. | |
| 11,105,452 B1 | 8/2021 | Dias et al. | |
| D943,407 S | 2/2022 | Buckley et al. | |
| D943,715 S | 2/2022 | Kwak et al. | |
| D984,597 S | 4/2023 | Wang | |
| D986,393 S | 5/2023 | Smith | |
| D990,300 S | 6/2023 | Liebelt | |
| D991,023 S | 7/2023 | Cooper | |
| D996,581 S | 8/2023 | Li | |
| D996,584 S | 8/2023 | Nakano | |
| D999,345 S | 9/2023 | Yu | |
| D1,000,585 S | 10/2023 | Koiwa | |

(56) References Cited

U.S. PATENT DOCUMENTS

| | | | |
|---|---|---|---|
| 11,796,101 | B2 | 10/2023 | Watson |
| 2002/0125721 | A1 | 9/2002 | Imaeda et al. |
| 2002/0163191 | A1 | 11/2002 | Muenster et al. |
| 2003/0001385 | A1 | 1/2003 | Favre et al. |
| 2004/0245766 | A1 | 12/2004 | Vallee |
| 2004/0262920 | A1 | 12/2004 | Le Quere |
| 2005/0285394 | A1 | 12/2005 | Muto |
| 2006/0108705 | A1 | 5/2006 | Rowley |
| 2006/0244258 | A1 | 11/2006 | Baumgartner |
| 2007/0001454 | A1 | 1/2007 | Baving et al. |
| 2008/0136166 | A1 | 6/2008 | Guest |
| 2008/0314205 | A1 | 12/2008 | Feliciano |
| 2009/0026758 | A1 | 1/2009 | Sanzone |
| 2009/0032170 | A1 | 2/2009 | Williams |
| 2010/0025986 | A1 | 2/2010 | Seton-Anderson |
| 2011/0025054 | A1 | 2/2011 | Kluss |
| 2011/0042943 | A1 | 2/2011 | Gershkovich et al. |
| 2011/0285126 | A1 | 11/2011 | Jahan |
| 2012/0096700 | A1 | 4/2012 | Patterson et al. |
| 2013/0119659 | A1 | 5/2013 | Williams et al. |
| 2013/0181446 | A1 | 7/2013 | Le Clinche |
| 2013/0257036 | A1 | 10/2013 | Guest |
| 2014/0015200 | A1 | 1/2014 | Scimeca et al. |
| 2014/0152002 | A1 | 6/2014 | Crompton et al. |
| 2015/0159792 | A1 | 6/2015 | Bobo et al. |
| 2015/0159794 | A1 | 6/2015 | Bobo et al. |
| 2015/0240980 | A1 | 8/2015 | Bobo et al. |
| 2016/0040812 | A1 | 2/2016 | Lai |
| 2016/0273695 | A1 | 9/2016 | Bobo et al. |
| 2016/0327196 | A1 | 11/2016 | Gledhill et al. |
| 2017/0082229 | A1 | 3/2017 | Meissner |
| 2018/0001571 | A1 | 1/2018 | Lennon et al. |
| 2020/0263818 | A1 | 8/2020 | Prince |
| 2020/0276771 | A1 | 9/2020 | Shi et al. |
| 2020/0378536 | A1 | 12/2020 | Osteen et al. |
| 2021/0071793 | A1 | 3/2021 | Kluss et al. |
| 2021/0172553 | A1 | 6/2021 | Kluss et al. |
| 2021/0239248 | A1 | 8/2021 | Watson et al. |
| 2021/0285584 | A1 | 9/2021 | Ravisankar et al. |
| 2021/0324986 | A1 | 10/2021 | Simon |
| 2023/0288001 | A1 | 9/2023 | Kluss et al. |

FOREIGN PATENT DOCUMENTS

| | | | |
|---|---|---|---|
| CN | 102788212 | B | 11/2014 |
| CN | 206723646 | U | 12/2017 |
| CN | 207333974 | U | 5/2018 |
| CN | 208169780 | U | 11/2018 |
| CN | 208487316 | U | 2/2019 |
| CN | 208651875 | U | 3/2019 |
| CN | 208997526 | U | 6/2019 |
| CN | 209960045 | U | 1/2020 |
| CN | 210510666 | U | 5/2020 |
| CN | 211667324 | U | 10/2020 |
| CN | 112384726 | A | 2/2021 |
| CN | 212455889 | U | 2/2021 |
| DE | 10114326 | A1 | 10/2002 |
| DE | 202008006949 | U1 | 9/2008 |
| EP | 3845791 | A1 | 7/2021 |
| FR | 3086366 | A1 | 3/2020 |
| GB | 1555640 | A | 11/1979 |
| GB | 2143918 | A | 2/1985 |
| JP | 2003314763 | A | 11/2003 |
| JP | 2004324858 | A | 11/2004 |
| JP | 20080286258 | A | 11/2008 |
| JP | 2010043729 | A | 2/2010 |
| JP | 2012077803 | A | 4/2012 |
| JP | 2012180940 | A | 9/2012 |
| JP | 2012219894 | A | 11/2012 |
| JP | 2016075308 | A | 5/2016 |
| MY | 143104 | A | 3/2011 |
| WO | 8901109 | A1 | 2/1989 |
| WO | 2020036637 | A1 | 2/2020 |
| WO | 2021101383 | A2 | 5/2021 |

OTHER PUBLICATIONS

U.S. Appl. No. 62/662,147, filed Apr. 24, 2018; Reliance Worldwide Corporation.
U.S. Appl. No. 62/682,098, filed Jun. 7, 2018; Reliance Worldwide Corporation.
U.S. Appl. No. 62/718,562, filed Aug. 14, 2018; Reliance Worldwide Corporation.
Final Office Action; U.S. Appl. No. 29/689,799; Oct. 8, 2020; 6 pages.
Foreign Office Action; Chinese Patent Application No. 2019305973504; May 8, 2020; 1 page (No. English Translation).
International Patent Application No. PCT/CN2021/082998; Mar. 25, 2021; Reliance Worldwide Corporation.
International Patent Application No. PCT/US2019/025851; Apr. 4, 2019; Reliance Worldwide Corporation.
International Patent Application No. PCT/US2019/028772; Apr. 23, 2019; Reliance Worldwide Corporation.
International Search Report and Written Opinion; International Patent Application No. PCT/US2019/025851; Jun. 25, 2019; 12 pages.
International Search Report and Written Opinion; International Patent Application No. PCT/US2019/028772; Jul. 25, 2019; 9 pages.
International Preliminary Report on Patentability; International Patent Application No. PCT/US2019/025851; Feb. 16, 2021; 6 pages.
International Preliminary Report on Patentability; International Patent Application No. PCT/US2019/028772; Nov. 5, 2020; 8 pages.
Notice of Allowance; U.S. Appl. No. 29/689,798; Sep. 11, 2020; 5 pages.
Notice of Allowance; U.S. Appl. No. 29/689,798; Sep. 23, 2020; 5 pages.
Notice of Allowance; U.S. Appl. No. 29/689,799; Jan. 22, 2021; 7 pages.
Office Action; U.S. Appl. No. 17/050,714; Mar. 31, 2023.
Office Action; U.S. Appl. No. 29/689,798; Jun. 24, 2020; 7 pages.
Office Action; U.S. Appl. No. 29/689,799; Jun. 23, 2020; 10 pages.
Supplementary European Search Report for European Patent Application No. 19850630.5; Jun. 8, 2022; 7 pages.
US Non-Final Office Action; U.S. Appl. No. 18/300,298; Nov. 20, 2024.
CN Office Action; Chinese Patent Application No. 202210969604.1; Feb. 15, 2023.
CN Office Action; Chinese Patent Application No. 202210969604.1; Mar. 9, 2023.
EP Supplementary European Search Report; European Patent Application No. 19792913.6; Dec. 13, 2021.
US Ex Parte Quayle Office Action; U.S. Appl. No. 29/686,256; Jun. 24, 2020.
US Non-Final Office Action; U.S. Appl. No. 29/821,932; Jun. 2, 2023.
US Non-Final Office Action; U.S. Appl. No. 29/832,045; May 24, 2023.
US Non-Final Office Action; U.S. Appl. No. 29/834,892; May 24, 2023.
US Notice of Allowance; U.S. Appl. No. 29/689,798; Sep. 11, 2020.
US Notice of Allowance; U.S. Appl. No. 29/689,798; Sep. 23, 2020.
WO International Patent Application No. PCT/US2019/028772; Apr. 23, 2019; Reliance Worldwide Corporation.
WO International Search Report and Written Opinion; International Patent Application No. PCT/US2022/076157; Jan. 4, 2023.
WO International Search Report and Written Opinion; International Patent Application No. PCT/US2023/018558; Jul. 25, 2023.
WO International Preliminary Report on Patentability; International Patent Application No. PCT/US2022/076157; Mar. 21, 2024.
WO International Search Report and Written Opinion; International Patent Application No. PCT/US2023/018507; Jul. 25, 2023.
WO International Preliminary Report on Patentability; International Patent Application No. PCT/US2023/018507; Oct. 24, 2024.
WO International Preliminary Report on Patentability; International Patent Application No. PCT/US2023/018558; Oct. 24, 2024.

(56) References Cited

OTHER PUBLICATIONS

Extended Search Report in EP Application No. 22868325.6, dated Jun. 5, 2025.

\* cited by examiner

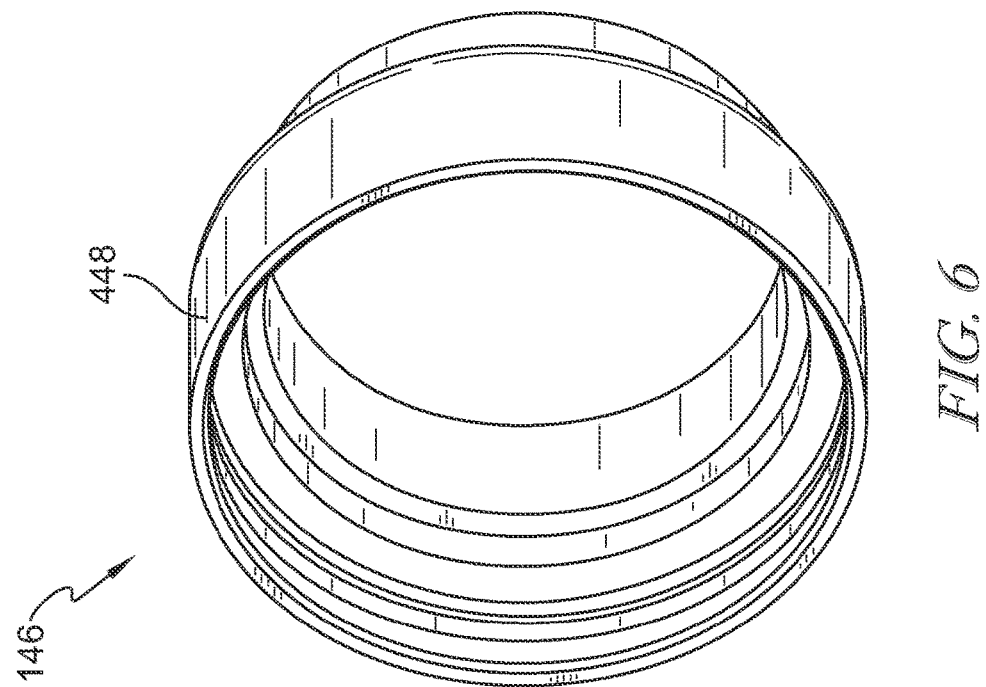
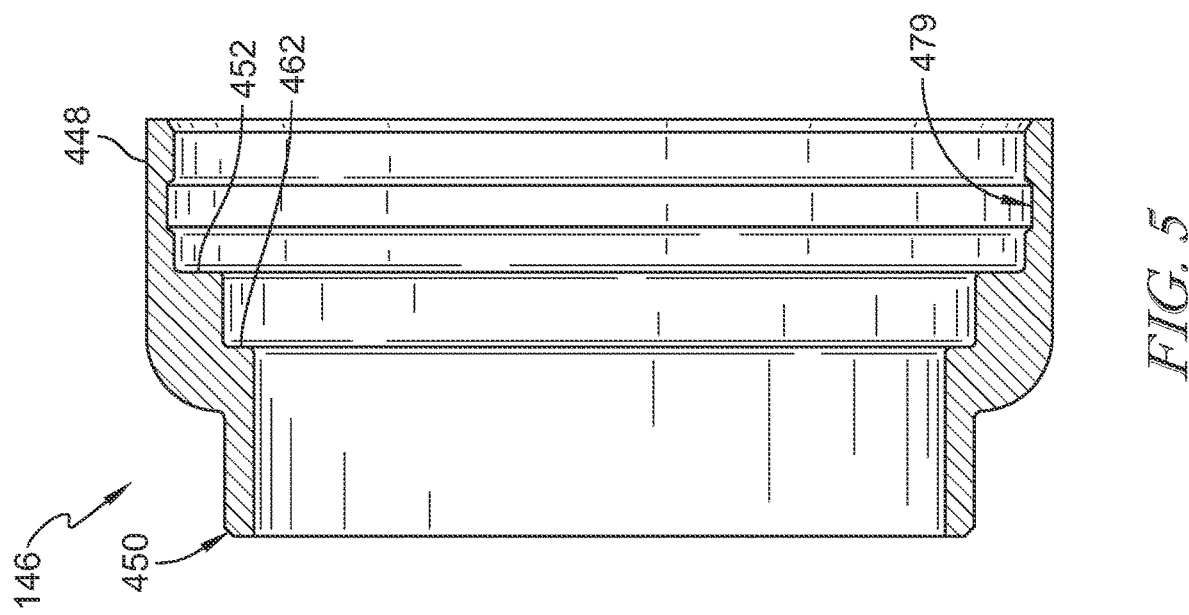

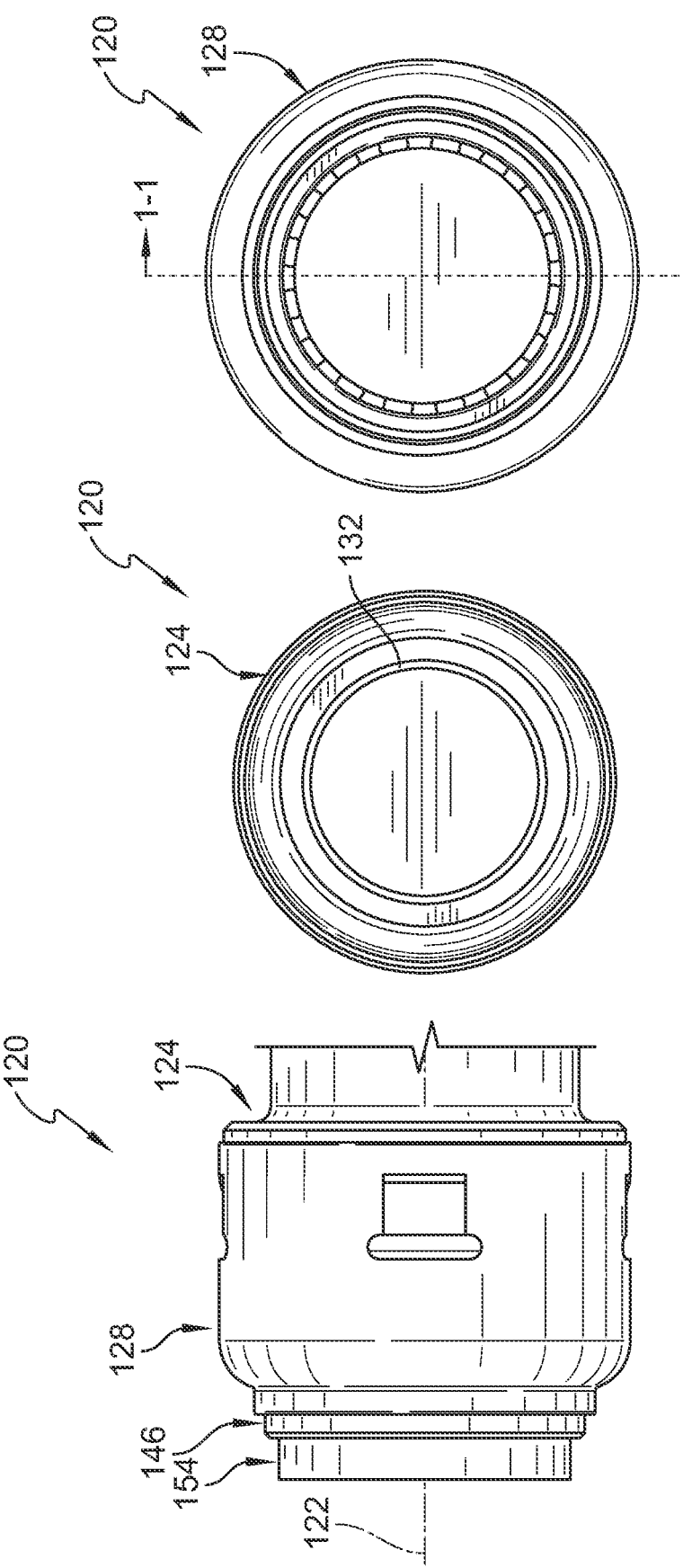

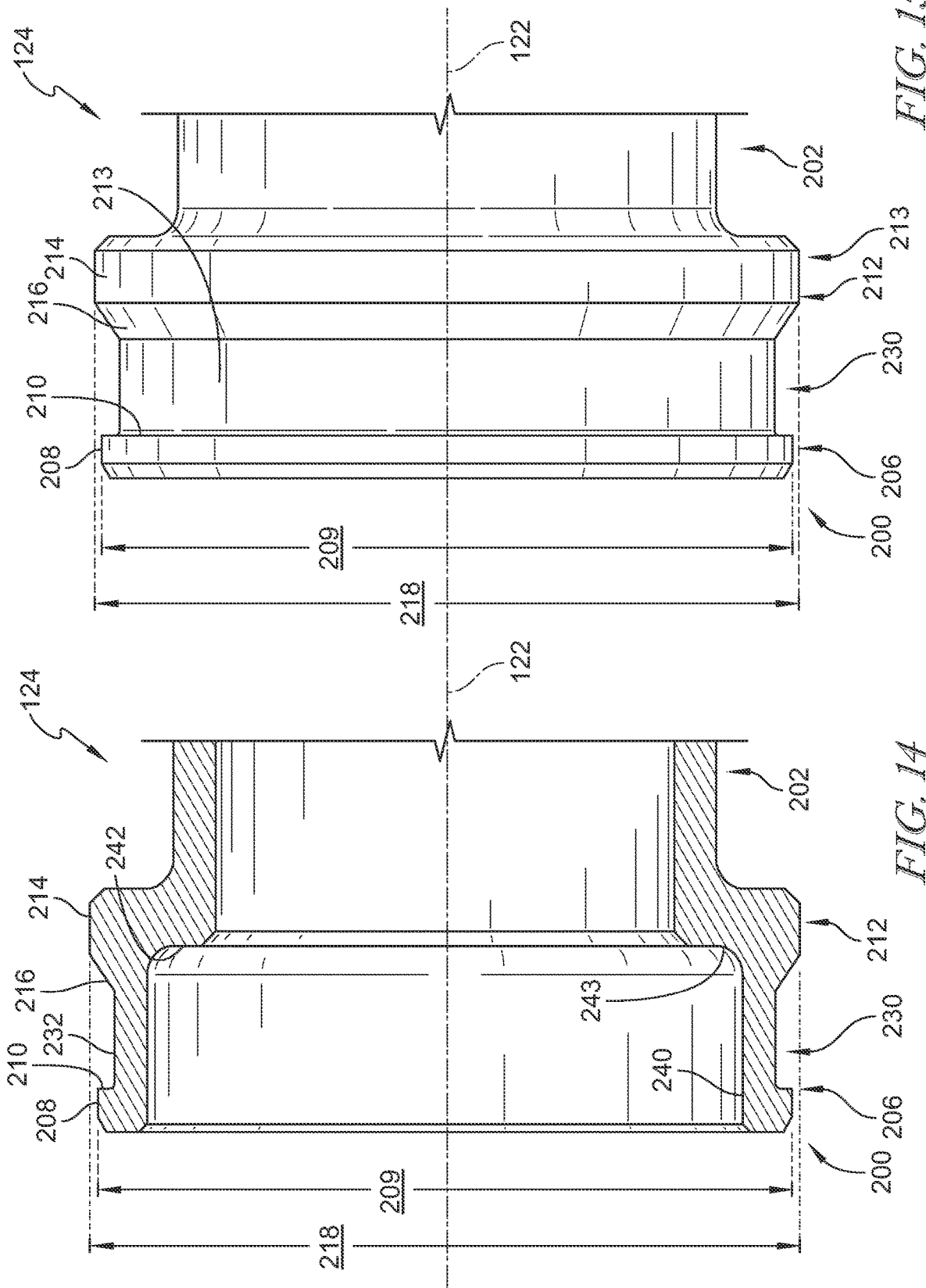

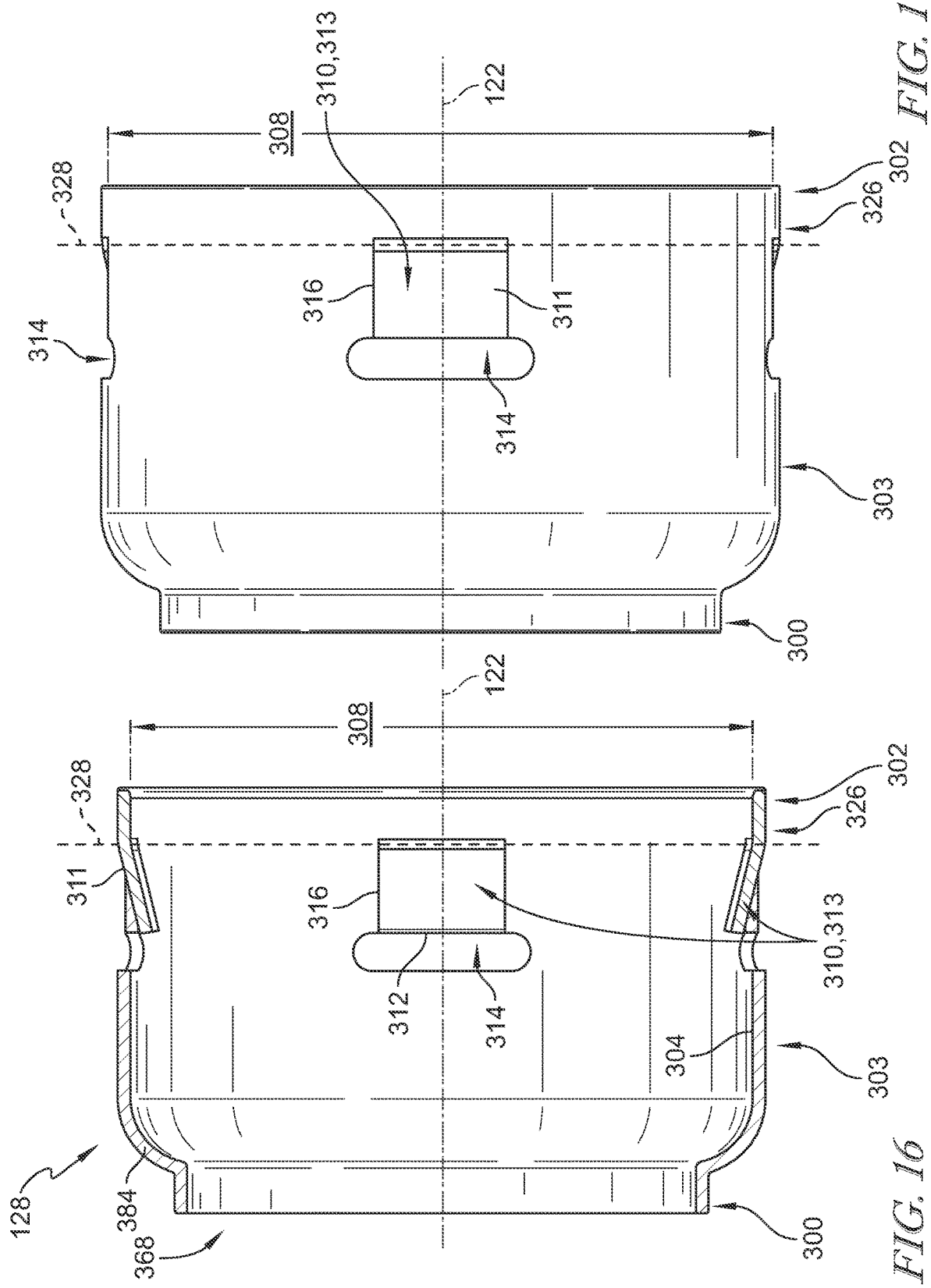

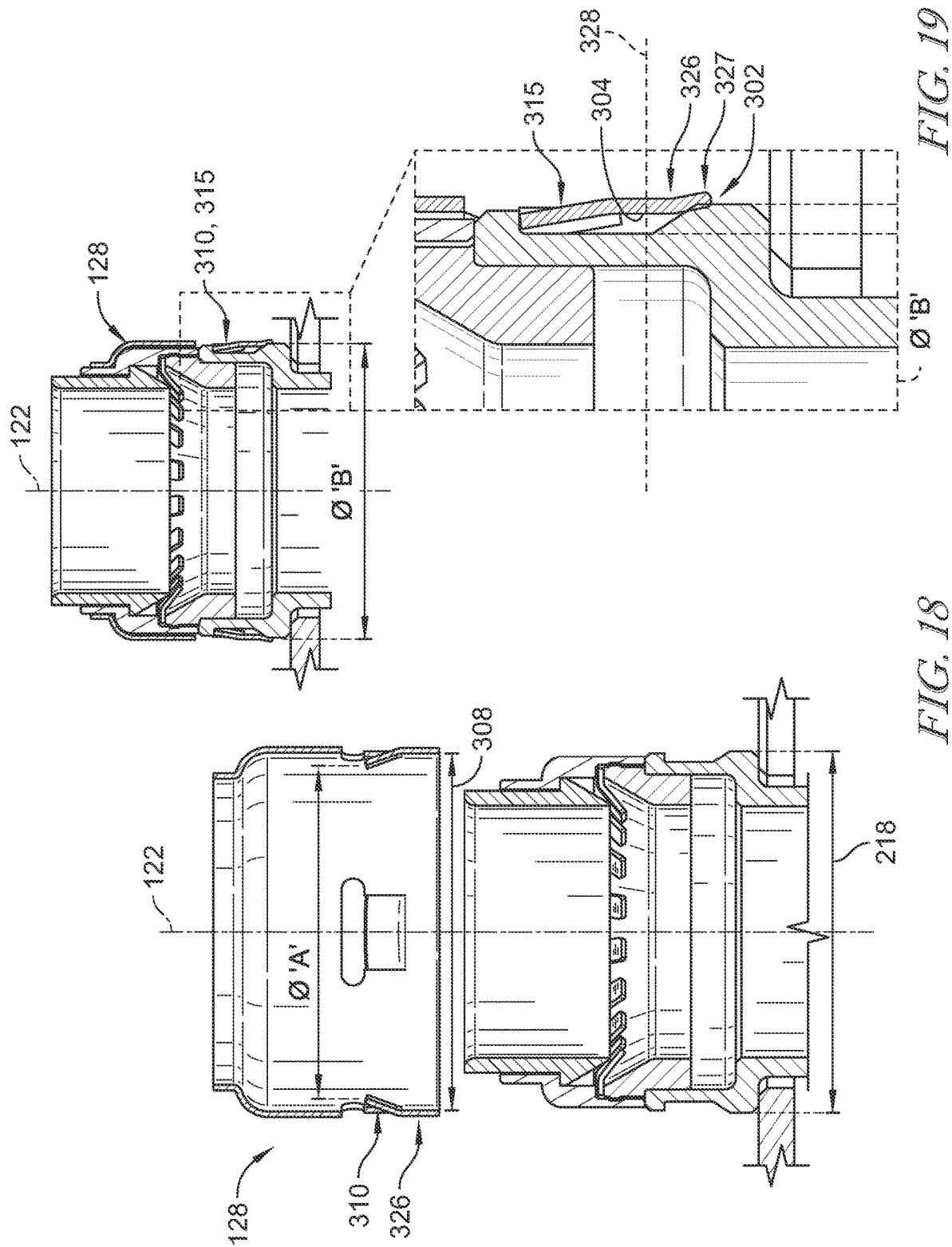

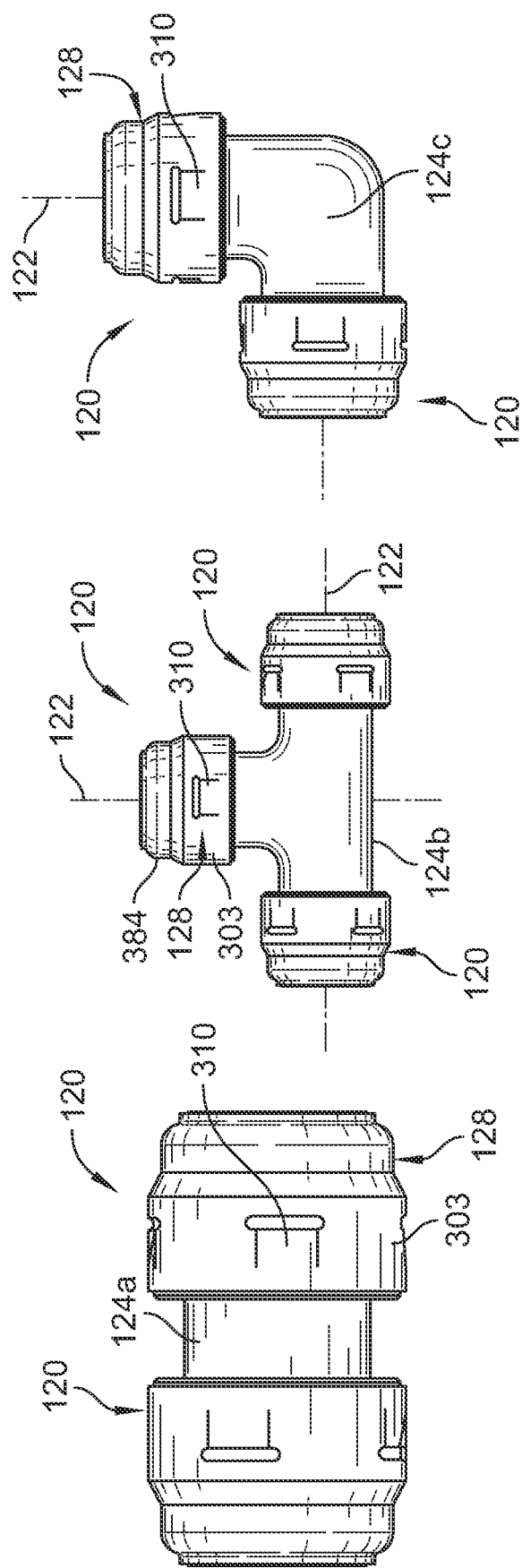

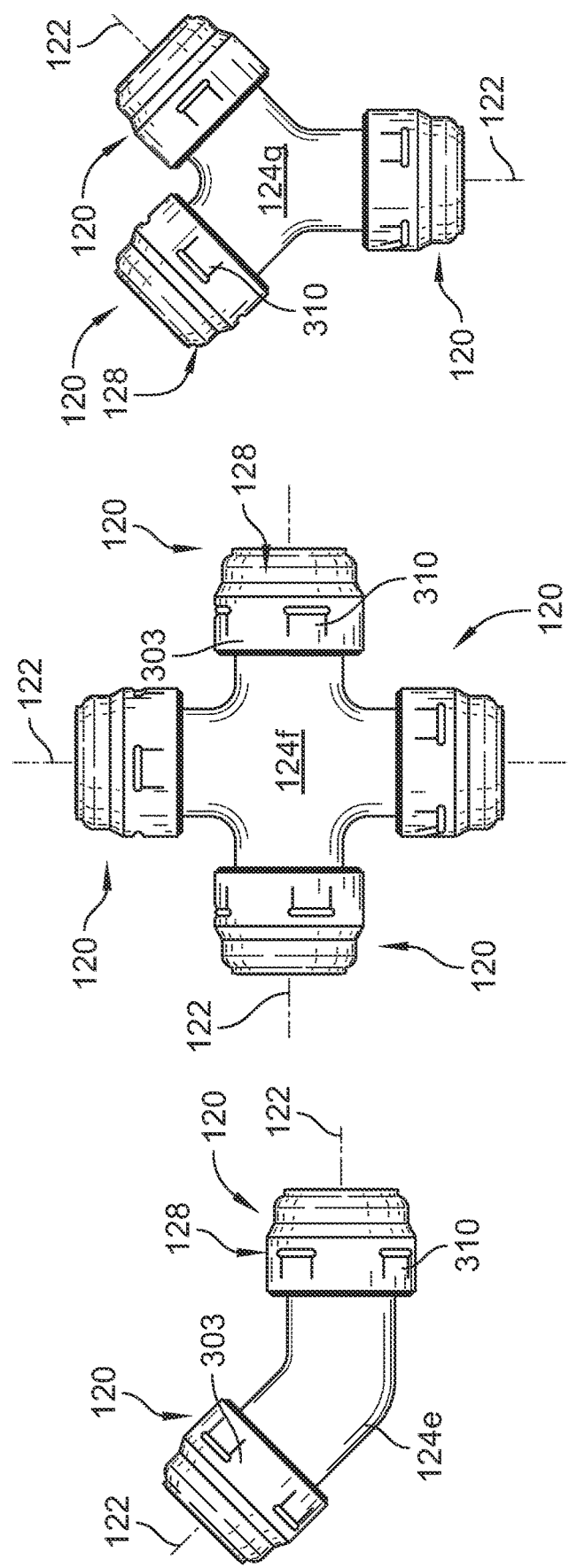

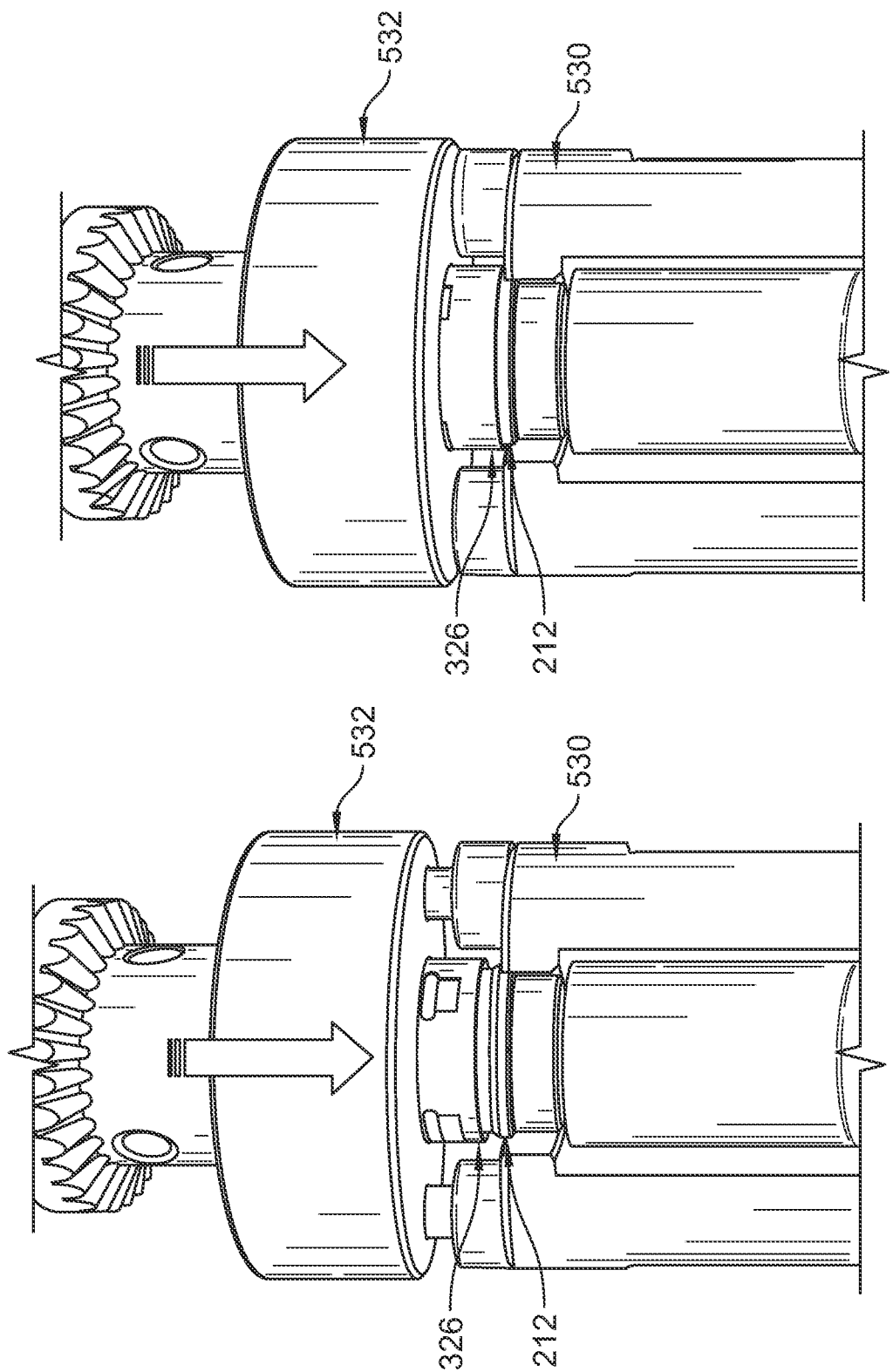

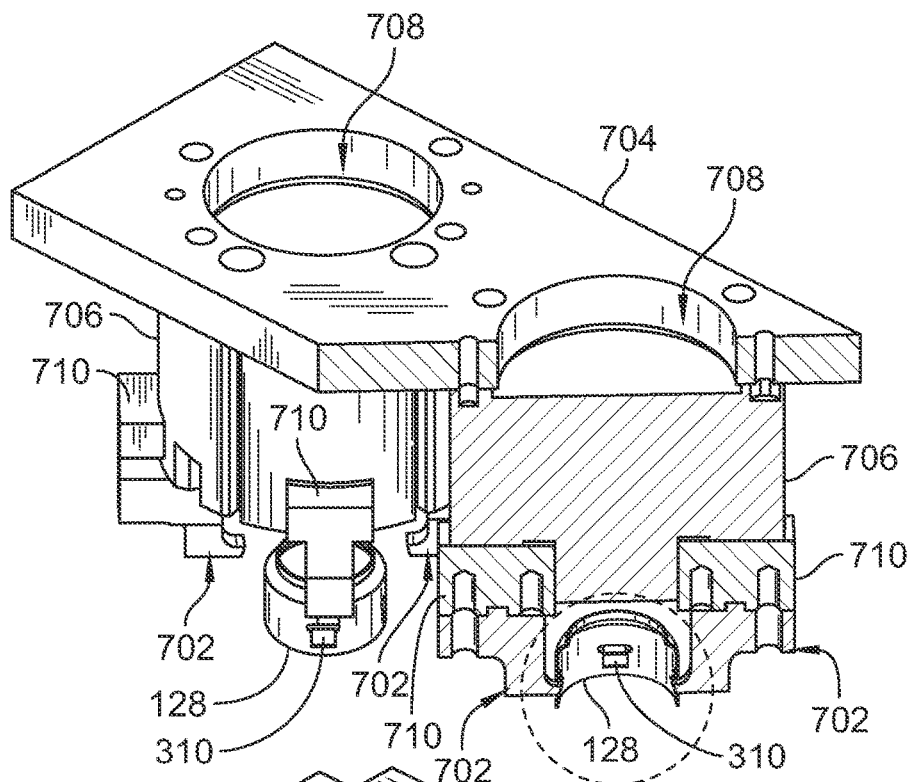
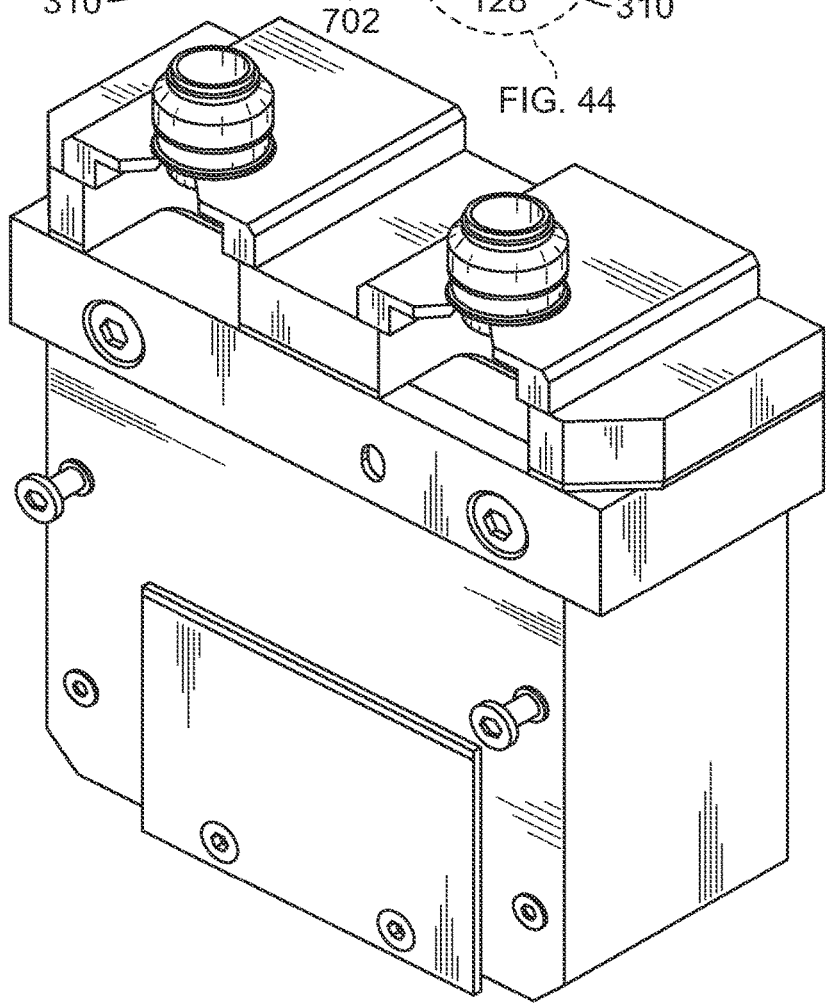
FIG. 43

DEVICE AND METHOD FOR ASSEMBLING COMPONENTS OF A PLUMBING FITTING

PRIORITY CLAIM

This patent application is a continuation-in-part of U.S. patent application Ser. No. 17/932,024, filed on Sep. 14, 2022, now U.S. Pat. No. 12,049,974, which is a continuation of U.S. patent application Ser. No. 17/048,557, filed Oct. 16, 2020, now U.S. Pat. No. 11,525,534, which is a U.S. National Phase of PCT/US2019/025851, filed Apr. 4, 2019, which claims the benefit of U.S. Provisional Patent Application No. 62/718,562, filed Aug. 14, 2018; and is a continuation-in-part of U.S. patent application Ser. No. 17/930,814, filed on Sep. 9, 2022, which claims the benefit of U.S. Provisional Patent Application No. 63/242,951, filed Sep. 10, 2021, U.S. patent application Ser. No. 17/930,814 is a continuation-in-part of U.S. patent application Ser. No. 17/048,557, filed Oct. 16, 2020, now U.S. Pat. No. 11,525,534; and this patent application claims the benefit U.S. Provisional Patent Application No. 63/339,164, filed May 6, 2022, the disclosures of which are incorporated herein by reference in their entireties.

FIELD

The present disclosure relates generally to pipe fittings. More specifically, the present disclosure relates to a device and method for assembling push-to-connect fittings with improved burst resistance.

BACKGROUND

Conduits are used to carry a variety of liquids and/or gases. Couplings, connectors, and fittings are used to join the conduits in various ways so that the conduits can be arranged in different configurations to move media through the conduits. The conduits may be stiff or rigid as with metal or plastic pipes used in household plumbing applications, or the conduits may be flexible. Connectors are used for end-to-end connection of conduits, or they can route conduits at different directions relative to the conduit axis. For example, connectors can be employed to change the direction of piping, such as by a 45° or 90° angle with respect to a flow passage through the pipe to which the connector is connected. Connectors can also be employed to branch or split piping in different directions. For example, a single pipe section can be connected by a T-fitting or a Y-fitting or a multi-conduit joint or a change in diameter.

SUMMARY

The present disclosure relates to connectors for conduits with improved ease of assembly and coupling, among other benefits. Certain conduit connectors may be difficult to assemble or require special tools in order to couple the connectors to a conduit. For example, threaded connectors may require a wrench to hold one part while rotating a mating part. Thus, there is a need for a connector that does not require tools for coupling with a conduit, such that a substantially watertight seal may be achieved manually between the connector and the conduit without tools.

Further, some existing connectors require deformation to join two parts or to join the connector to the conduit. For example, the ends of garden hoses have an outer portion of a hose bib crimped around the outside of the conduit to connect the male or female hose bib to the garden hose. In some connectors, a user must manually deform an end portion of a sleeve so that two parts of a connector cannot move axially apart, thus securing the parts of the connector together. There is thus a need for a simpler connector that does not require manual deformation to join parts.

Some connectors are irreversibly coupled to a conduit and may not be removed except by destroying the connector. A welded or soldered pipe joint is a historic example of a permanent connector. However, it may be advantageous to uncouple a conduit and reuse the connector. There is thus a need for a connector that may be uncoupled without destroying the connector. The connectors according to the implementations discussed below address these issues.

It is desirable that the fluid connectors not leak, as it may lead to loss of system pressure, or pooling of liquids, for example. The connectors according to the implementations discussed below is configured to provide a fluid-tight seal at least at pressures several times greater than the expected operational pressure of the tubular connector.

Various exemplary descriptions below contain instances of representative ranges, dimensions and/or tolerances for certain components. These are provided by way of illustration and not by way of limitation. Unless otherwise indicated, all numbers expressing quantities of properties, parameters, conditions, and so forth, used in the specification and claims are to be understood as being modified in all instances by the terms "about" or "approximately." Accordingly, unless indicated to the contrary, the numerical parameters set forth in the following specification and attached claims are approximations. Any numerical parameter should at least be construed in light of the number reported significant digits and by applying ordinary rounding techniques. The terms "about" or "approximately" when used before a numerical designation, e.g., a dimension of a measured property, indicates approximations which may vary by (+) or (−) 10%, 5% or 1%.

At least one embodiment relates to a push-to-connect fitting. The push-to-connect fitting includes a connector body, a sealing member, a grab ring, a cartridge, a retainer sleeve, a plurality of latches, and an interference portion. The connector body has a fluid passage that extends at least partially therethrough. The sealing member is configured to form a sealing engagement with a fluid conduit. The grab ring includes a plurality of teeth configured for coupling to the fluid conduit. The cartridge is positioned adjacent to at least part of the grab ring and has a hollow portion therethrough. The grab ring is interposed between the cartridge and the sealing member when the push-to-connect fitting is assembled. The retainer sleeve is received over at least part of the cartridge and is received over at least part of the connector body. The plurality of latches are located on the retainer sleeve and are configured to secure the retainer sleeve to the connector body to facilitate retention of the sealing member, the grab ring, and the cartridge. The interference portion is interposed between the connector body and the retainer sleeve when the push-to-connect fitting is assembled. The interference portion is configured to engage the retainer sleeve to substantially prevent rotation of the retainer sleeve relative to the connector body.

In some embodiments, the push-to-connect fitting further comprises a demount body movable within the hollow portion of the cartridge and configured to engage the plurality of teeth of the grab ring to facilitate decoupling of the plurality of teeth from the fluid conduit.

In some embodiments, the push-to-connect fitting further comprises a protection ring positioned within the connector body and positioned between the sealing member and the grab ring. The protection ring includes an inclined surface that tapers to a smaller diameter as the inclined surface extends away from the grab ring.

In some embodiments, the retainer sleeve includes an inner sleeve surface having a first diameter and the interference portion includes one or more protrusions with a second diameter that is greater than the first diameter. The first diameter and the second diameters are sized such that an interference fit exists between the interference portion and the retainer sleeve.

In some embodiments, the retainer sleeve further includes a compliant material such that an end portion of the retainer sleeve expands to a third diameter when the end portion engages the interference portion. The third diameter is greater than the second diameter.

In some embodiments, the interference portion is formed as an annular member having a diameter larger than a diameter of the connector body. The interference portion is also integrally formed with the connector body, and the interference portion extends radially from the connector body in a direction away from the fluid passage.

In some embodiments, the push-to-connect fitting further comprises a catch surface and a plurality of latches. The catch surface is located on the connector body and the plurality of latches are configured to engage the catch surface to facilitate coupling of the retainer sleeve to the connector body.

In some embodiments, each of the plurality of latches is configured to rotate about a sidewall connected thereto such that each of the plurality of latches engages with the catch surface when the retainer sleeve engages the interference portion.

In some embodiments, the plurality of latches are configured to move in a direction away from or toward the catch surface in order to engage the catch surface.

In some embodiments, the plurality of latches include one or more protruding portions that extend transversely from a sidewall connected thereto.

In some embodiments, the engagement of the plurality of latches with the catch surface inhibits rotation of the retainer sleeve relative to the connector body.

In some embodiments, each of the plurality of latches includes a released position and a locked position. When the retainer sleeve is engaged by the interference portion, each of the plurality of latches are in the locked position.

In some embodiments, the interference portion further comprises a shoulder surface having a frustoconical profile configured to engage an end portion of the retainer sleeve as the retainer sleeve is received over the interference portion.

In some embodiments, the shoulder surface facilitates alignment of the retainer sleeve.

In some embodiments, the retainer sleeve comprises a first retainer sleeve, and the connector body further comprises a first connector end coupled to the first retainer sleeve and a second connector end coupled to a second retainer sleeve. The first connector end and the second connector end are in fluid communication with one another via the fluid passage.

Another embodiment relates to a plumbing fitting. The plumbing fitting includes a first connector assembly, a second connector assembly, and a fluid passage extending between the first connector assembly and the second connector assembly. The first connector assembly includes a first connector body, a first retainer sleeve, and a first interference portion. The first connector body is centered along a first axis and is configured to receive a first fluid conduit end. The first retainer sleeve is coupled to the first connector body and is configured to receive the first fluid conduit end. The first interference portion is interposed between the first connector body and the first retainer sleeve. The first interference portion is configured to prevent rotation of the first retainer sleeve about the first axis relative to the first connector body. The second connector assembly includes a second connector body, a second retainer sleeve, and a second interference portion. The second connector body is centered along a second axis and is configured to receive a second fluid conduit end. The second connector body is in fluid communication with the first connector body. The second retainer sleeve is coupled to the second connector body and is configured to receive the second fluid conduit end. And the second interference portion is interposed between the second connector body and the second retainer sleeve. The second interference portion is configured to prevent rotation of the second retainer sleeve about the second axis relative to the second connector body.

In some embodiments, the first retainer sleeve includes a first inner sleeve surface having a first diameter, and the first interference portion has a second diameter greater than the first diameter. The first inner sleeve surface and the first interference portion are sized such that an interference fit exists between the first interference portion and the first retainer sleeve.

In some embodiments, the first interference portion is integrally formed with the first connector body. The first interference portion extends radially from the first connector body in a direction away from the first axis.

In some embodiments, the first retainer sleeve further comprises a compliant material. The compliant material is configured such that an end portion of the first retainer sleeve engaged by the first interference portion expands to a third diameter when the end portion engages the first interference portion. The third diameter is greater than the second diameter.

In some embodiments, the plumbing fitting further comprises a catch surface and a plurality of latches. The catch surface is located on the first connector body. The plurality of latches are located on the first retainer sleeve and are configured to engage the catch surface to facilitate coupling of the first retainer sleeve to the first connector body.

In some embodiments, each of the plurality of latches is configured to rotate about a sidewall connected thereto and engage with the catch surface when the first interference portion engages the retainer sleeve.

In some embodiments, each of the plurality of latches includes a released position and a locked position. When the first retainer sleeve is engaged by the first interference portion, the each of the plurality of latches are in the locked position.

Another embodiment relates to a connector assembly. The connector assembly includes a connector body and a retainer sleeve. The connector body has a fluid passage that extends at least partially therethrough. The connector body also includes a first end and a second end opposite the first end. A first connector flange extends radially away from the connector body and is positioned between the first end and the second end. The first connector flange has a first diameter. A second connector flange extends radially from the connector body and is positioned between the first connector flange and the second end. The second connector flange has a second diameter greater than the first diameter. The retainer sleeve is configured for coupling to the connector body and is configured for extending around the fluid passage. The retainer sleeve includes a first sleeve end and a second sleeve end opposite to the first sleeve end. The retainer sleeve further includes an inner sleeve surface having a third diameter, where the third diameter is less than the second diameter. The retainer sleeve further includes a plurality of latches positioned circumferentially about the inner sleeve surface and extending radially inward relative to the inner sleeve surface. The retainer sleeve is configured such that when the retainer sleeve is coupled to the connector body and the second connector flange engages a portion of the inner sleeve surface proximate to the first sleeve end, a portion of the inner sleeve surface proximate to the first sleeve end expands to a fourth diameter greater than the second diameter responsive to deformation of the retainer sleeve, and the plurality of latches rotate inward toward the connector body when the first sleeve end expends to the fourth diameter.

In some embodiments, the connector body further comprises a catch surface positioned on the first connector flange and extending circumferentially about the fluid passage. The plurality of latches are configured to engage the catch surface when the retainer sleeve is coupled to the connector body.

In some embodiments, the connector body further comprises a shoulder surface positioned between the first connector flange and the second connector flange. The shoulder surface tapers outward toward the second connector flange to facilitate centering of the retainer sleeve around the connector body.

In some embodiments, the third diameter is less than the second diameter by between about 0.01 and about 0.15 millimeters, inclusive, such that an interference fit is formed between the retainer sleeve and the connector body.

In some embodiments, the third diameter is less than the second diameter by between about 0.2 and about 0.5 millimeters, inclusive, such that an interference fit is formed between the retainer sleeve and the connector body.

In some embodiments, the retainer sleeve is a first retainer sleeve and the connector body further comprises a first connector end and a second connector end. The first connector end is coupled to the first retainer sleeve. The second connector end is coupled to a second retainer sleeve, the second retainer sleeve being substantially similar to the first retainer sleeve. The first connector end and the second connector end are in fluid communication with one another via the fluid passage.

Another embodiment relates to a method of manufacturing a connector assembly. The method includes the steps of obtaining a connector body positioned along an axis and obtaining a retainer sleeve configured to mount over a portion of the connector body. The retainer sleeve further comprises a plurality of latches, the retainer sleeve extends around the axis. The method further includes pressing the retainer sleeve around the connector body while also simultaneously pressing the plurality of latches in the retainer sleeve to provide an effective latch or engagement with the connector body.

In some embodiments, the connector body incudes an interference portion. Pressing the retainer sleeve around the connector body and the interference portion forms an interference fit between the retainer sleeve and the interference portion such that rotation of the retainer sleeve relative to the connector body about the axis is prevented.

In some embodiments, the connector body further comprises a catch surface and the plurality of latches are configured to engage the catch surface when the retainer sleeve is coupled to the connector body. The method further comprises simultaneously pressing the retainer sleeve around the connector body and the interference portion and pressing the plurality of latches for engagement with the catch surface.

In some embodiments, the connector body further comprises a shoulder surface defining a frustoconical profile that tapers outward toward the interference portion. The method further comprises pressing the retainer sleeve around the connector body and the interference portion such that the inner sleeve surface engages the shoulder surface. Engagement of the retainer sleeve with the shoulder surface causes expansion of the second sleeve end to the coupling diameter and facilitates centering of the retainer sleeve about the connector body and the interference portion.

BRIEF DESCRIPTION OF THE FIGURES

By way of example only, other embodiments of the present disclosure will be described more fully hereinafter with reference to the accompanying figures, in which like numbers refer to like parts throughout, wherein:

FIG. 5 is a side cross-sectional view of a cartridge of the connector assembly of FIG. 1, according to an example embodiment;

FIG. 6 is a perspective view of the cartridge of FIG. 6, according to an example embodiment;

FIG. 9 is a side view of the connector assembly of FIG. 1, according to an example embodiment;

FIG. 10 is a distal view of the connector assembly of FIG. 9;

FIG. 11 is a proximate view of the connector assembly of FIG. 9;

FIG. 14 is a side cross-sectional view a connector body of the connector assembly of FIG. 1, according to an example embodiment;

FIG. 15 is a side view of the connector body of FIG. 14, according to an example embodiment;

FIG. 16 is a side cross-sectional view of a retainer sleeve of the connector assembly of FIG. 1, according to an example embodiment;

FIG. 17 is a side view of the retainer sleeve of FIG. 16, according to an example embodiment;

FIG. 18 is a side cross-sectional view of the retainer sleeve of FIG. 16 having a plurality of latches in a released position;

FIG. 19 is a side cross-sectional view of the retainer sleeve of FIG. 16 having the plurality of latches of FIG. 18 in a locked position;

FIG. 20 is a side view of a plumbing fitting having a plurality of the connector assemblies of FIG. 1, according to an example embodiment;

FIG. 21 is a side view of a plumbing fitting having a plurality of the connector assemblies of FIG. 1, according to an example embodiment;

FIG. 22 is a side view of a plumbing fitting having a plurality of the connector assemblies of FIG. 1, according to an example embodiment;

FIG. 24 is a side view of a plumbing fitting having a plurality of the connector assemblies of FIG. 1, according to an example embodiment;

FIG. 25 is a side view of a plumbing fitting having a plurality of the connector assemblies of FIG. 1, according to an example embodiment;

FIG. 26 is a side view of a plumbing fitting having a plurality of the connector assemblies of FIG. 1, according to an example embodiment;

FIG. 30 is a front view of a press operable to partially couple the retainer sleeve to the connector body;

FIG. 31 is a front view of a press operable to fully couple the retainer sleeve to the connector body to form the connector assembly, according to an example embodiment;

FIGS. 36-44 are multiple views of another bit for use with a pressing tool according to another example embodiment.

DETAILED DESCRIPTION

As used herein, the relative directions and terms "inward" and "outward" are referenced with respect to a longitudinal axis, with inward being in a direction radially toward the longitudinal axis and outward being in a direction radially away from the longitudinal axis.

Figure 1:
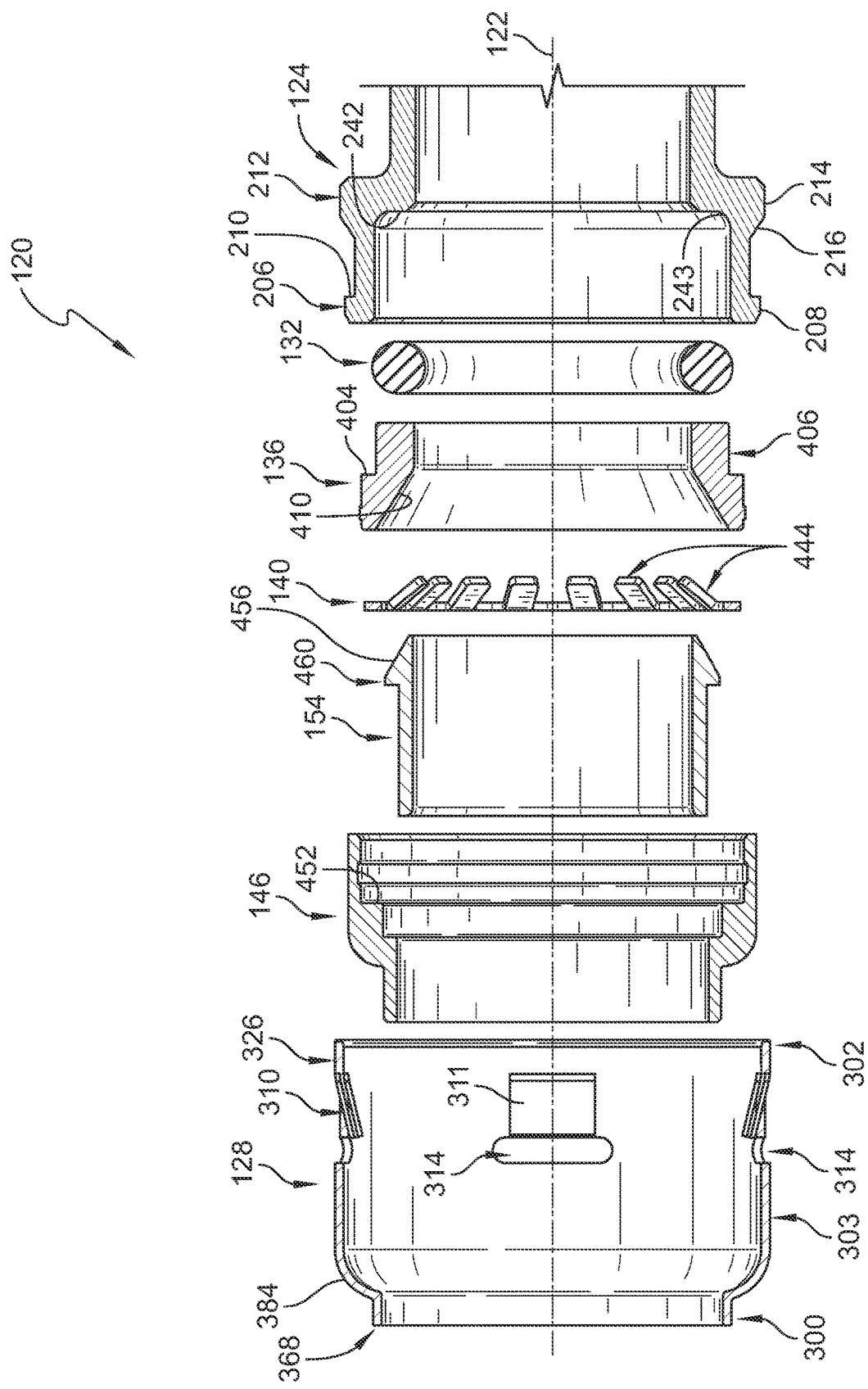
FIG. 1 is an exploded side, cross-sectional view of a connector assembly taken along section 1-1 of FIG. 11, according to an example embodiment.

The relative directions and terms "distal" and "proximal" are used with respect to a connector assembly fastened to an end of a fluid conduit, with the distal direction being toward the end of the connector assembly on the end of the fluid conduit (e.g., the receiving end of the connector assembly; to the right side of FIG. 1), and the proximal direction being toward the beginning of the fluid conduit to which the connector assembly is fastened (e.g., to the left side of FIG. 1). The relative direction and term lateral or laterally are in a plane generally orthogonal to the longitudinal axis.

Referring generally to the Figures, a connector assembly (e.g., plumbing fitting, push-to-connect fitting, etc.) 120 is shown. The connector assembly 120 is configured for sealingly engaging (e.g., forming a substantially watertight connection with) an end portion of a fluid conduit, such as a copper pipe, PEX tubing, CPVC pipe, PVC tubing, and the like. The connector assembly 120 may be used with fluid conduits of varying diameters, including fluid conduits having a diameter less than 0.25 inches to fluid conduits having a diameter of greater than 2 inches or more.

Referring generally to FIGS. 1-26, the connector assembly 120 is shown. The connector assembly 120 includes an annular connector body 124, a retainer sleeve (e.g., sleeve body) 128, a sealing member (e.g., sealing ring) 132, a protection ring (protection body) 136, a grab ring (e.g., grab body) 140, a cartridge (e.g., cartridge body) 146, and a demount body (e.g., demount ring) 154.

In brief, the connector body 124 includes a catch surface 210 at an end of the connector body 124. The catch surface 210 extends circumferentially around the connector body 124. The retainer sleeve 128 has at least one and, in this embodiment, a plurality of latches 310 extending inwardly at an end of the connector assembly 120. The latches 310 engage the catch surface 210 to connect the retainer sleeve 128 to the connector body 124. In the illustrated embodiment, four equally spaced latches are formed along the retainer sleeve 128; however, different numbers and configurations of latches can be employed without departing from the scope of the present disclosure, such as two, three, five, or six latches equally or unequally spaced along the retainer sleeve 128.

The connector assembly 120 has other parts, as outlined above and in further detail below, held between and preferably contained within the connector body 124 and retainer sleeve 128. For instance, the sealing member 132 is urged toward (e.g., compressed against) an inner shoulder 242 of the connector body 124 by an inwardly stepped projection 406 of the protection ring 136. The grab ring 140 has an annular base 442 with a plurality of protrusions in the form of teeth 444 extending inward and distally toward the connector body 124. The cartridge 146 has a tubular wall 448 proximate to a distal end of the cartridge 146 and a smaller diameter proximal end 450 opposite to the tubular wall 448. The tubular wall 448 fits into a recess in the connector body 124 having an annular, inner shoulder 242 that limits the motion along the longitudinal axis 122 in the longitudinal direction. The tubular wall 448 extends along the longitudinal axis 122 and encloses the sealing member 132, the protection ring 136, and the grab ring 140.

The demount body 154 is also located within the retainer sleeve 128 and includes a tubular proximal end (e.g., free end) 458 passing through the proximal end 450 of the cartridge 146 as the demount body 154 extends along the longitudinal axis 122. A stop flange 460 is positioned between an inclined distal end surface 456 and the tubular proximal end 458. The stop flange 460 contacts a second internal shoulder 462 of the cartridge 146. The inclined distal end surface 456 may have a frustoconical profile that inclines toward the longitudinal axis 122 and inclines toward the connector body 124. The inclined distal end surface 456 is further configured to generally conform to the conical shape formed by the inclined teeth 444 of the grab ring 140 and to incline toward the sealing member 132.

To further elaborate on the components above, the connector body 124 may be formed of metal material (e.g., brass, such as Bi brass, naval brass, Si brass; stainless steel, etc.); a plastic or other polymeric material suitable for the intended application, such as polyethylene, PPR, or UHMWP, or any combination thereof; a composite material; or any combination thereof. The fluid transported by the fluid conduit and pressures will determine the suitable material for the conduits and for the connector body 124.

Figure 23C:
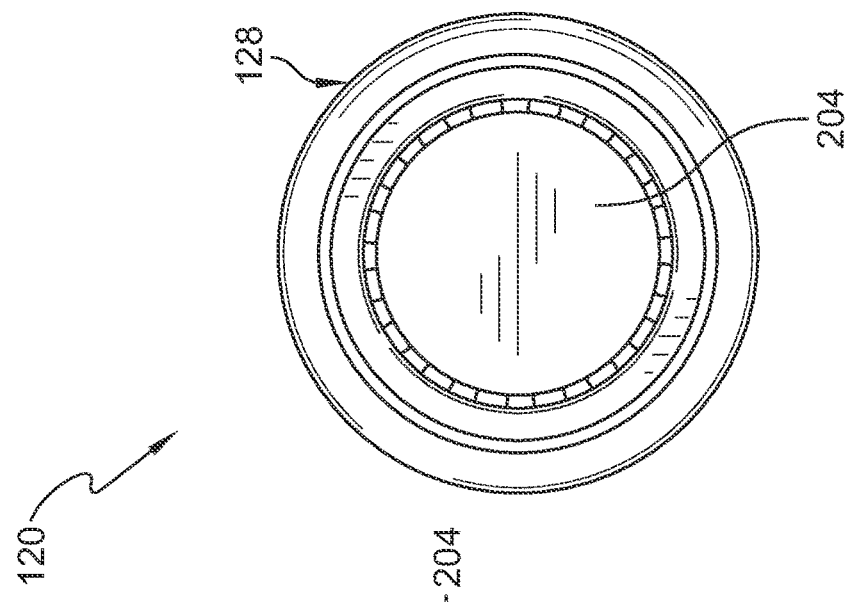
FIG. 23C is a proximate view of the pluming fitting of FIG. 23A.
Figure 23B:
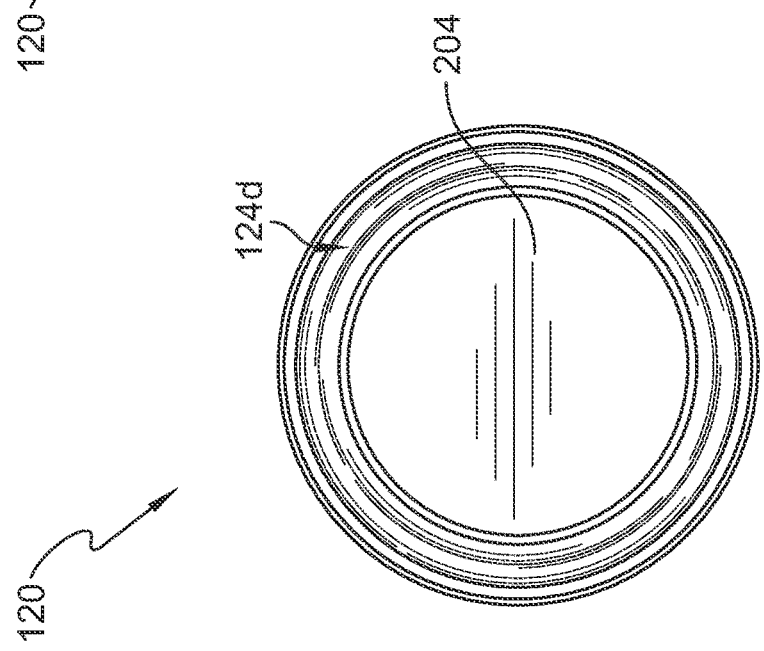
FIG. 23B is a distal view of the plumbing fitting of FIG. 23A.
Figure 23A:
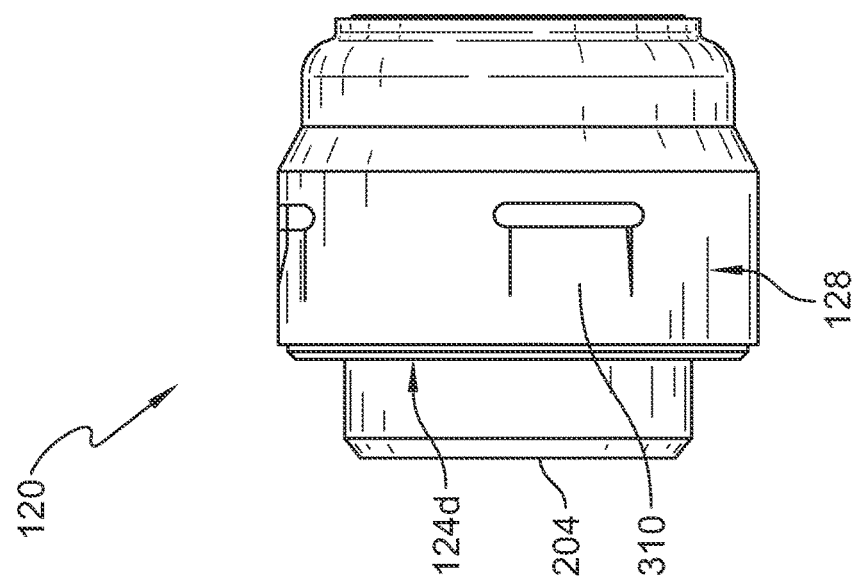
FIG. 23A is a side view of a plumbing fitting having a connector assembly of FIG. 1 and an end wall, according to an example embodiment.
Figure 27:
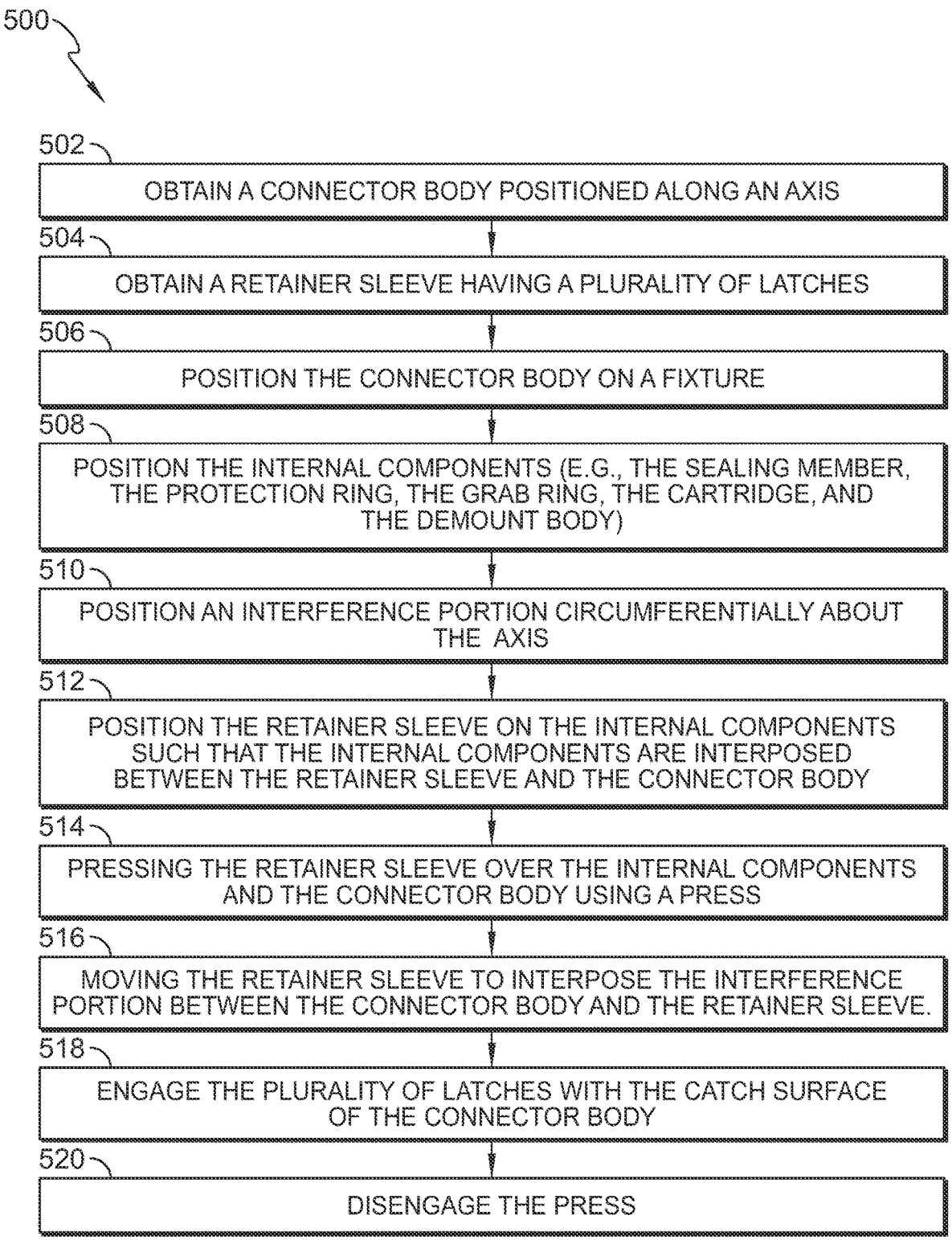
FIG. 27 is a flow chart of a method of assembling a connector assembly, according to an example embodiment.

In some embodiments, the connector body 124 may be a straight-line connector body 124a or coupler (FIG. 20), a T-connector body 124b (FIG. 21), an elbow connector body 124c (FIG. 22), a blind-end connector body 124d (FIGS. 23A-23C) which blocks flow through the fluid conduit (similar to connector body 124), a connector body configured to receive different diameter fluid conduits, an angle connector body 124e (FIG. 24), a multi-line (or 4-way) connector body 124f (FIG. 25), a wye (Y) connector body 124g (FIG. 26), a tee-wye connector body, another type of connector body, or combinations of connector bodies. The connector bodies 124a-124g may have a similar or the same catching arrangement to the catch surface 210, so as to be complementary to the catch surface 210. As indicated in FIGS. 23A-23C, the connector body 124d that is a blind-end connector body has an end wall 204 closing off the fluid passage through the connector body 124d. The end wall 204 forms a tube stop that limits movement of the fluid conduit through the connector body 124d.

A first end 200 of the connector body 124 is slightly chamfered so it may resiliently urge the resilient laches 310 outward as the retainer sleeve 128 and the connector body 124 are moved relative to each other, until the latches 310 engage the catch surface 210. It will be appreciated that the chamfering may be included on any one of the connector bodies 124a-124g. An inclined exterior shoulder surface 216 adjacent the catch surface 210 may optionally be provided with the shoulder surface 216 inclined inward and toward the first end 200 so as to be aligned with the latches 310. The shoulder surface 216 may prevent the latches 310 from being bent inward and may strengthen the latch-catch connection (e.g., connection between the latches 310 and the catch surface 210) to better resist separation of the connector assembly 120 along the longitudinal axis 122.

Referring specifically to FIG. 1, an exploded, cross-sectional view of the connector assembly 120 is shown. The connector assembly 120 extends along, and is centered on, a longitudinal axis 122. When the connector assembly 120 is fully assembled, as shown in FIGS. 9-13 and 19, all of the sealing member 132, the protection ring 136, the grab ring 140, the cartridge 146, and the demount body 154 are positioned between (e.g., interposed between) the retainer sleeve 128 and the connector body 124. The retainer sleeve 128 and the connector body 124 are coupled together such that the rest of the connector assembly 120 (the sealing member 132, the protection ring 136, the grab ring 140, the cartridge 146, and the demount body 154) is maintained in confronting relation to each other (e.g., pressed, compressed, sandwiched together, etc.) without each component being coupled together individually, such as by potting, adhesives, fasteners, latches, and the like.

The sealing member 132 is formed of a resilient material, such as rubber, EPDM, or other suitable elastomers. The sealing member 132 is shown as an O-ring with a circular cross-section. However, in some embodiments, the sealing member 132 may have various cross-sectional shapes, such as rectangular, oblong, pill shape, and the like. The inner and outer diameters of the sealing member 132 are selected to fit into and seal against the connector body 124 and to form a substantially fluid tight seal with a fluid conduit passing through the inner diameter of the sealing member 132. In some embodiments, the inner shoulder 242 is configured to seal against the sealing member 132. As shown in FIG. 14, the inner shoulder 242 is contiguous with the inner surface 240 at a curved corner 243. A radius of the curved corner may be selected to conform to a shape and size of the cross-section of the sealing member 132.

Figure 3:
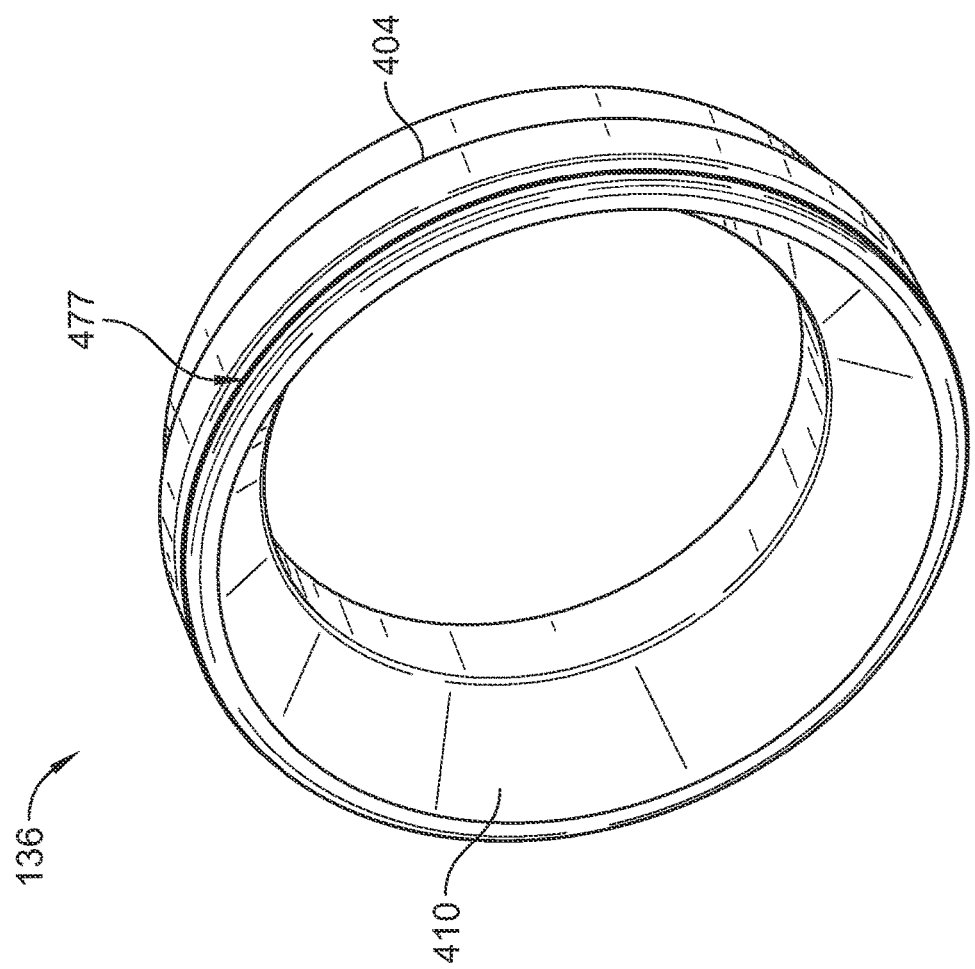
FIG. 3 is a perspective view of the protector body of FIG. 2, according to an example embodiment.
Figure 2:
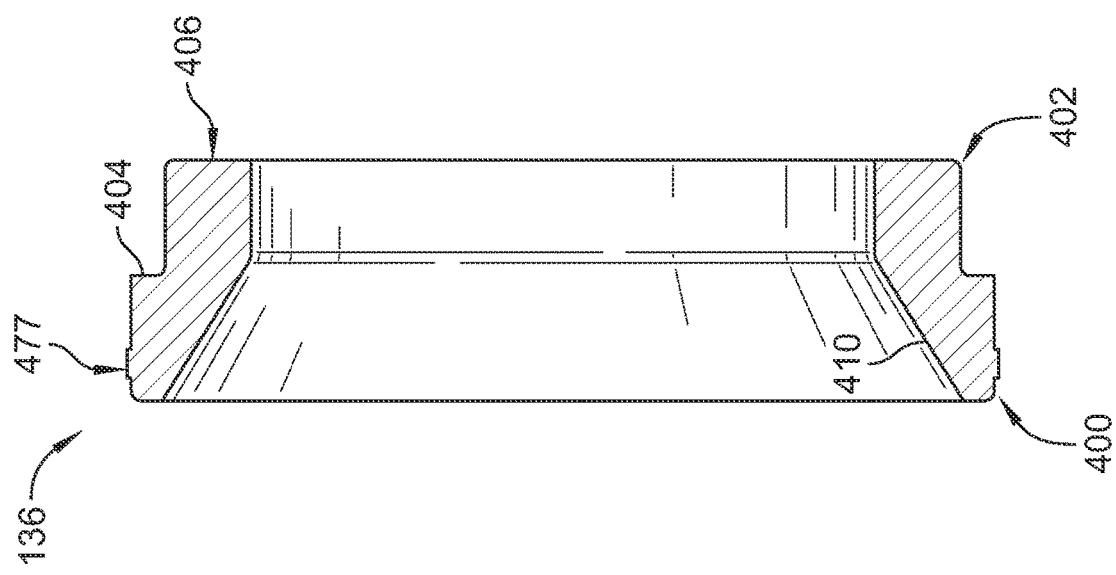
FIG. 2 is a side cross-sectional view of a protector body of the connector assembly of FIG. 1, according to an example embodiment.

Referring now to FIGS. 2 and 3, the protection ring 136 is shown, according to an example embodiment. The protection ring 136 includes a first end 400 (e.g., proximal end) and a second end 402 (e.g., distal end) opposite to the first end 400. The second end 402 is configured to fit inside the first end 200 of the connector body 124 to trap the sealing member 132 between the inner shoulder 242 and the protection ring 136. The sealing member 132 is allowed to translate axially along the longitudinal axis 122 between the inner shoulder 242 and the protection ring 136. In some embodiments, the sealing member 132 is allowed to translate a distance of 2-5 mm along longitudinal axis 122. The second end 402 is preferably cylindrical as is the larger diameter, outer body of the annular, protection ring 136, so as to form an annular, radially inward extending protection shoulder 404 acting as a stop that contacts the first end 200 of the connector body 124 to limit the relative axial positions of the protection ring 136 and connector body 124 along the longitudinal axis 122.

In addition, the protection shoulder 404 facilitates centering the protection ring 136 within the connector body 124. When the protection shoulder 404 engages the first end 200, the second end 402 extends a predetermined distance toward the inner shoulder 242, thus defining 2-5 mm of axial movement of the sealing member 132 along the longitudinal axis 122. In other words, the protection ring 136 includes a projection 406 extending away from the protection shoulder 404 that facilitates positioning of the sealing member 132 in the fluid passage along the longitudinal axis 122. The extension of the projection 406 through at least a portion of the connector body 124 assists in supporting the received fluid conduit and assists in achieving higher pressure ratings (e.g., burst failure ratings) of the connector assembly 120. Furthermore, the protection shoulder 404 reduces tolerance "stack up" that may affect the positioning of the sealing member 132 and the effectiveness of the sealing engagement between the received fluid conduit, the sealing member 132, and the rest of the connector assembly 120. Accordingly, the projection 406 assists during assembly such that calibration requirements may be reduced. Separately, the protection shoulder 404 extends radially outward only a short distance and less than the first portion diameter 209.

The protection ring 136 includes an inclined surface 410 inclined inward and toward the second end 402 of the protection ring 136 so as to generally align with the teeth 444 of the grab ring 140. The inclined surface 410 forms a generally frustoconical surface. The axial length of the protection ring 136 and the inclined surface 410 prevent the teeth 444 of the grab ring 140 from contacting and damaging the sealing member 132. The protection ring 136 can be made of a suitable plastic, e.g., including but not limited to thermoplastics such as nylon fiber.

Figure 4:
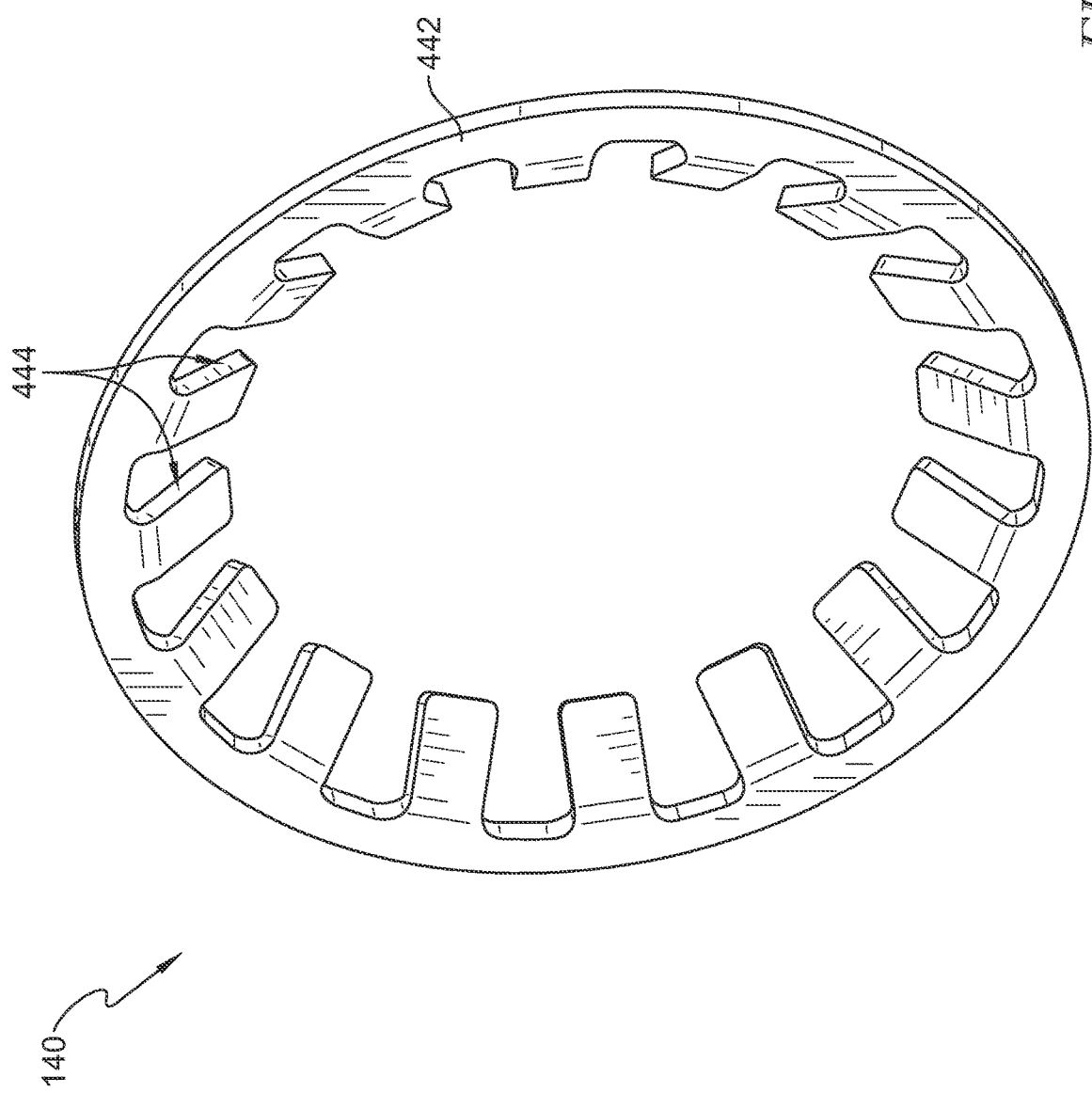
FIG. 4 is a perspective view of a grab body of the connector assembly of FIG. 1, according to an example embodiment.

Referring now to FIG. 4, the grab ring 140 is shown according to an example embodiment. The grab ring 140 is formed of metal, such as stainless steel, and includes a flat, radially extending base 442 and a plurality of teeth 444 encircling the longitudinal axis 122. The teeth 444 are equally spaced circumferentially and are sufficient in number to resiliently engage an outer surface of a fluid conduit. The teeth 444 bite into an outer surface of the fluid conduit to selectively prevent the fluid conduit from being removed from the connector assembly 120 along the longitudinal axis 122. The grab ring 140 is held between the cartridge 146 and the protection ring 136 when the connector assembly 120 is assembled. The first end 400 of the protection ring 136 engages a distal side of the base 442 while a first internal shoulder 452 on the cartridge 146 (FIG. 5) contacts the proximal side of the base 442. The teeth 444 flex radially outward and toward the inclined surface 410 when the fluid conduit passes through the opening formed by the teeth 444. One or all of the inner diameters of the protection ring 136 and the relative angles of the teeth 444 may limit the maximum diameter of the fluid conduit able to be inserted through the grab ring 140 and protection ring 136.

Referring now to FIGS. 5 and 6, the cartridge 146 is shown according to an example embodiment. The cartridge 146 includes a second internal shoulder 462 extending radially inward of the first internal shoulder 452. The first internal shoulder 452 forms an axially aligned face against which a stop flange 460 of the demount body 154 rests to limit axial motion of the demount body 154 relative to the cartridge 146 in one axial direction. A tubular proximal end 458 of the demount body 154 (FIG. 7) is inserted from the distal end of the cartridge 146 until the stop flange 460 contacts the second internal shoulder 462 on the cartridge 146. Thus, the cartridge 146 limits motion along the longitudinal axis 122 (in the proximal direction) of the demount body 154 and/or the grab ring 140. The demount body 154 can move in the distal direction along the longitudinal axis 122 and can spread the teeth 444 outward to disengage the teeth 444 from the fluid conduit previously engaged by the teeth 444. Thus, an application of force in the distal direction on the proximal end 458 of the demount body 154 may disengage the teeth 444 from the fluid conduit and allow removal of the fluid conduit from the connector assembly 120. The cartridge 146 may be formed of a suitable strong polymer compatible with the fluid carried in the fluid conduit. In some embodiments, the cartridge 146 is formed of POM (polyoxymethylene).

Figure 8:
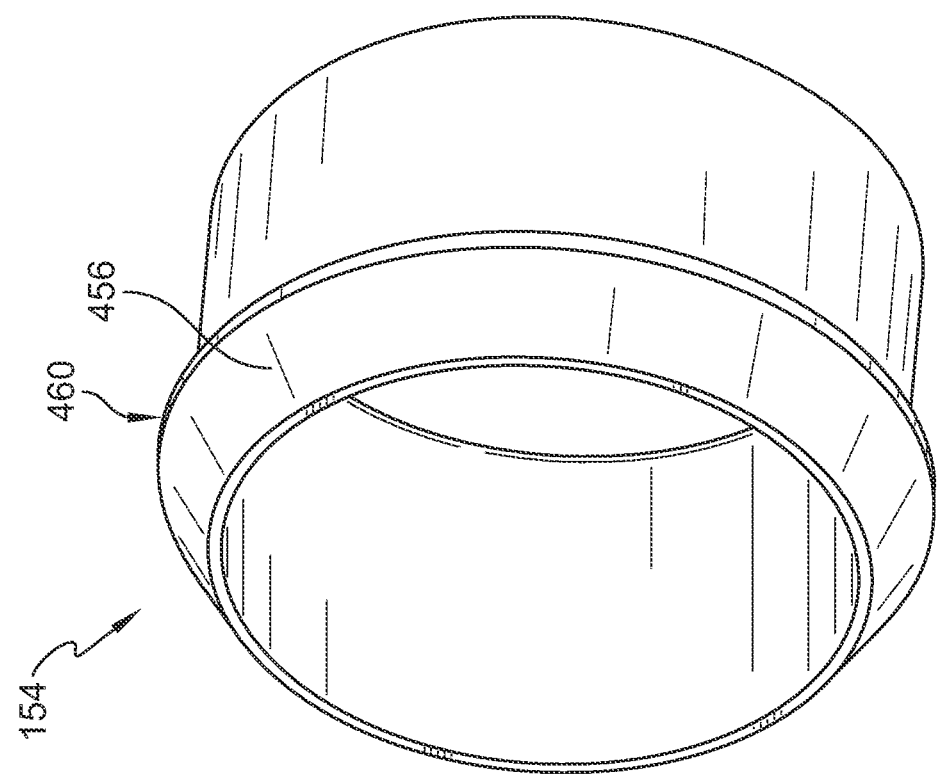
FIG. 8 is a perspective view of the disengagement body of FIG. 7, according to an example embodiment.
Figure 7:
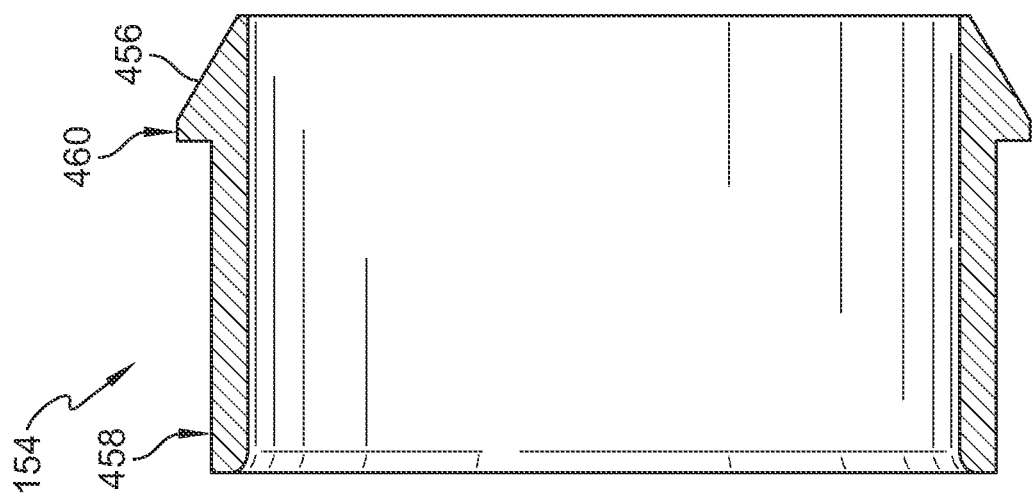
FIG. 7 is a side cross-sectional view of a disengagement body of the connector assembly of FIG. 1, according to an example embodiment.

Referring now to FIGS. 7 and 8, the demount body 154 is shown, according to an example embodiment. When the connector assembly 120 is assembled, the demount body 154 is positioned within the cartridge 146 and configured to move axially along the longitudinal axis 122 while positioned within the cartridge 146. An inclined distal end surface 456 of the demount body 154 is on a proximal side of the teeth 444, while the inclined surface 410 on the protection ring 136 is on the distal side of the teeth 444. The teeth 444 are interposed between the inclined distal end surface 456 and the inclined surface 410. Advantageously, the inclined distal end surface 456 on the demount body 154 is configured to engage the base of the teeth 444 adjacent the base 442. The demount body 154 may be formed of POM.

To further detail the construction of the connector assembly 120, the protection ring 136 advantageously has an engaging member 477 (FIG. 2) extending radially away from an outer surface of the protection ring 136 and configured for mating with another engaging part on the cartridge 146. The depicted construction of the engaging member 477 includes a slight outward protrusion, preferably a slightly raised, circumferential ring with inclined leading and/or trailing edges. When the connector assembly 120 is assembled, the engaging member 477 is located within and configured to fit into a circumferential recess 479 (FIG. 5) in the inside of the tubular wall 448 of the cartridge 146. Advantageously, when the engaging member 477 on the protection ring 136 engages the recess 479 on the cartridge 146, the protection ring 136 and the cartridge 146 are held together to secure the grab ring 140 between the first internal shoulder 452 on the cartridge 146 and the first end 400 of the protection ring 136. Moreover, the demount body 154 is preferably already seated such that the stop flange 460 engages the second internal shoulder 462 of the cartridge 146. The snap connection of the engaging member 477 and recess 479 restrains the demount body 154 from moving out of the cartridge 146. The demount body 154 can move axially between the second internal shoulder 462 and the grab ring 140. The cartridge 146 and protection ring 136 may thus form a snap-fit sub assembly which restrains movement of the demount body 154 and grab ring 140 so that these parts may collectively move as a unit.

The diameter of the tubular wall 448 is selected such that the tubular wall 448 engages the connector body 124. When the cartridge 146 engages the connector body 124, the grab ring 140 is coupled between the protection ring 136 and the first internal shoulder 452 on the cartridge 146, and the demount body 154 is located such that the inclined distal end surface 456 does not urge the teeth 444 radially outward and away from the longitudinal axis 122. Advantageously, the protection ring 136 extends into the connector body 124 and, as outlined above, allows the sealing member 132 to move axially along the longitudinal axis 122 about 2-5 mm before contacting the protection ring 136 or the inner shoulder 242 on the connector body 124. The axial motion of the sealing member 132 is insufficient to allow the sealing member 132 to skew or tilt enough to become misaligned when the distal end of the fluid conduit contacts the sealing member 132.

Referring now to FIG. 9, a side view of the connector assembly 120 is shown, according to an example embodiment. The retainer sleeve 128 covers a portion of the connector body 124 when the retainer sleeve 128 is coupled to the connector body 124. A portion of the cartridge 146 extends axially out of a proximal end of the retainer sleeve 128, and a portion of the demount body 154 extends axially out of a proximal end of both the retainer sleeve 128 and the cartridge 146. In some embodiments, the connector assembly 120 does not include the end wall 204 and fluid is configured to flow through both ends of the connector assembly 120.

Referring now to FIG. 10, a distal view of the connector assembly 120 is shown, according to another example embodiment. The connector body 124 may include the end wall 204 such that the connector body 124 has a closed end that cuts off a fluid passage through the connector assembly 120 along the longitudinal axis 122. In some embodiments, the connector body 124 has a center aperture 205, such as shown in FIG. 1, which allows the fluid passage to extend all the way through the connector body 124.

Referring now to FIG. 11, a proximal view of the connector assembly 120 is shown, according to an example embodiment. The proximal end of the connector assembly 120 is configured for receiving a fluid conduit.

Figure 13:
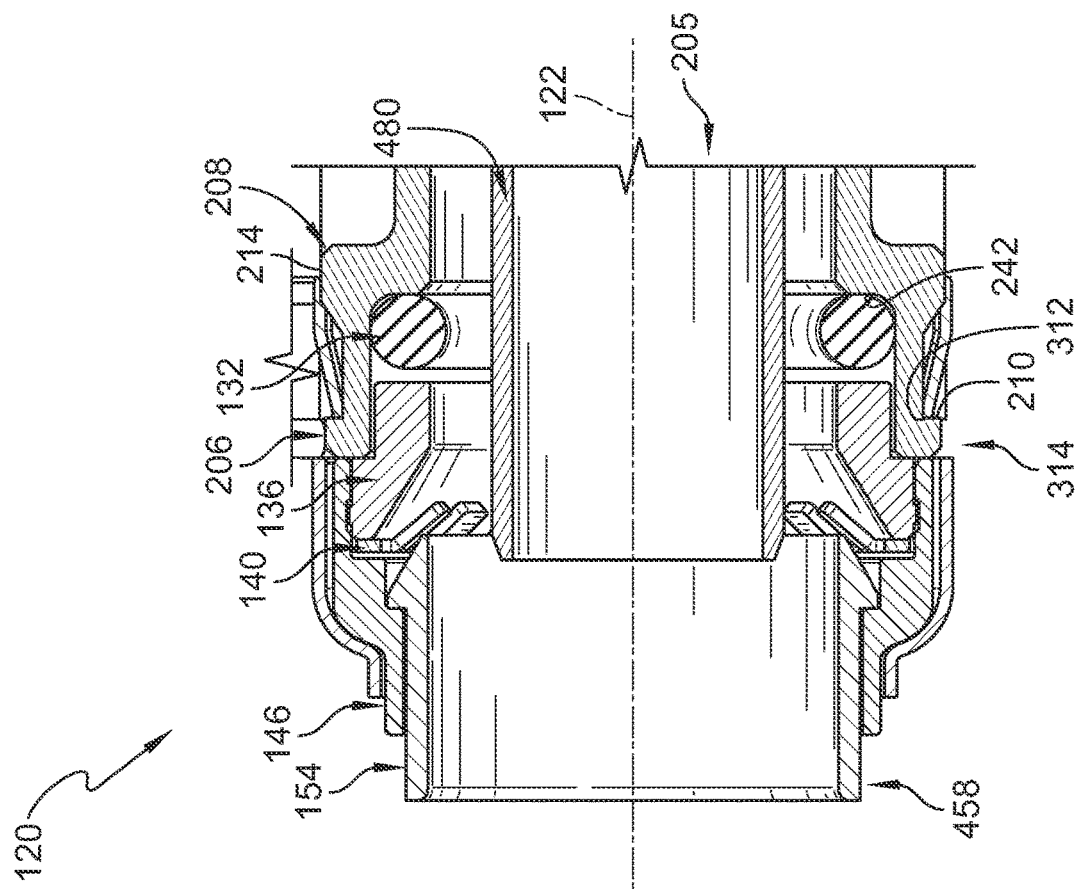
FIG. 13 is a cross-sectional view of the connector assembly of FIG. 1, according to another example embodiment.
Figure 12:
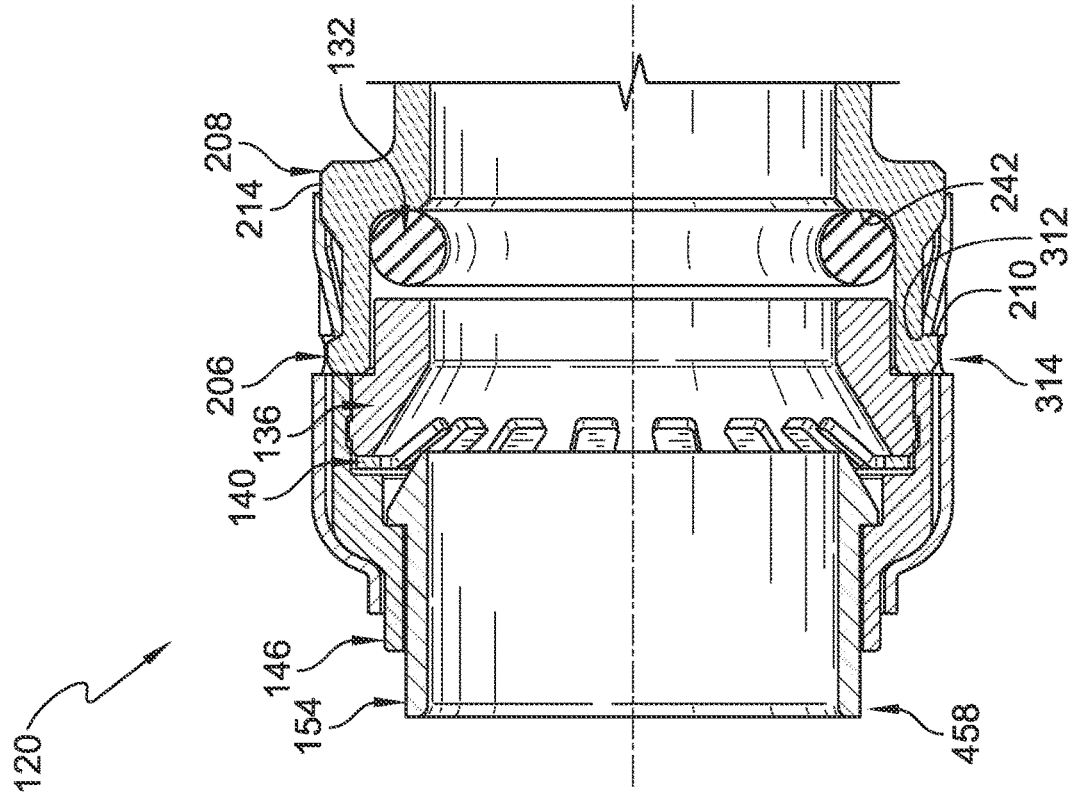
FIG. 12 is a cross-sectional view of the connector assembly of FIG. 1, according to an example embodiment.

Referring now to FIGS. 12 and 13, side cross-sectional views of the connector assembly 120 are shown, according to example embodiments. After assembly of the connector assembly 120, a fluid conduit may then be inserted through the open end of the connector assembly 120. The fluid conduit is inserted through the retainer sleeve 128, through the demount body 154, and through the tubular wall 448 of the cartridge 146 until a distal end of the fluid conduit passes through the grab ring 140, protection ring 136, and the sealing member 132. In some embodiments, the fluid conduit contacts a hard stop, which stops relative axial movement of the fluid conduit along the longitudinal axis 122. In some embodiments, the connector assembly 120 includes a tube liner 480 that is retained within the connector assembly 120. The tube liner 480 assists in supporting the inner wall of a fluid conduit configured to be received by the connector assembly 120. In this regard, the tube liner 480 would be located inboard of the demount body 154 and configured to receive the fluid conduit.

The teeth 444 prevent the fluid conduit from being pulled out of the proximal end of the connector assembly 120. An outer diameter of the fluid conduit is larger than the inner diameter of the sealing member 132 to form a substantially fluid tight seal. Depending on the amount of fluid seal or leakage that is desired or permitted, the interference fit between the sealing member 132 and the fluid conduit may vary. The sealing member 132 is advantageously allowed to slide axially in the cylindrical recess ending with the inner shoulder 242 being at a distance of about 2-5 mm along the longitudinal axis 122. Alternatively, in some embodiments, the sealing member 132 may be pressed against the inner shoulder 242 by the second end 402 of the protection ring 136. That is, the projection 406 may, for instance, extend to a position to compress the sealing member 132. This may increase the integrity of the sealing engagement by the sealing member 132.

Further, to avoid accidental disengagement of the fluid conduit from the connector assembly 120, the tubular proximal end 458 of the demount body 154 has an axial length selected to end with the proximal end of the retainer sleeve 128 and/or the cartridge 146. Thus, the sleeve opening 368, the proximal end of the demount body 154, the tubular proximal end 458, and the proximal end 450 of the cartridge 146 are in the same general plane. Advantageously, the demount body 154 is slightly distal of the plane through the proximal end 458 and/or proximal end 450, by about 1 mm or less. The cartridge 146 contacts the connector body 124 and may be held stationary relative to the demount body 154, which is configured to move axially toward the connector body 124. To avoid accidental contact between with the proximal end of the demount body 154 and the grab ring 140, contact that may reduce the gripping force of the grab ring 140 on the fluid conduit, the proximal end of the demount body 154 may sit flush with or slightly distal of both the first end 300 of the retainer sleeve 128 and the proximal end of the cartridge 146 such that the connector body 124 and the cartridge 146 resist axial movement of the demount body 154 when a force is provided over at least the demount body 154 to the cartridge 146 or the connector body 124. In other words, the demount body 154 is positioned such that an external force being applied from at least the demount body 154 to the cartridge 146 will not allow the demount body 154 to move to a position to disengage the teeth 444 from the fluid conduit. On this basis, in order to release the fluid conduit, the connector assembly 120 may require a particular tool to engage the demount body 154 alone while not engaging another component of the connector assembly 120.

To remove the fluid conduit from the connector assembly 120, the demount body 154 is pushed axially along the longitudinal axis 122 toward the distal end of the connector assembly 120 (such as with a specific tool) and toward the connector body 124 so that the inclined surface 410 of the demount body 154 engages with and spreads the teeth 444 outward, disengaging the teeth 444 from the outer surface of the fluid conduit and allowing the fluid conduit to be removed along the longitudinal axis 122. Thus, the connector assembly 120 is structured such that part of the connector assembly 120 encircles and prevents lateral movement of the fluid conduit relative to the connector assembly 120 and prevents removal of the fluid conduit laterally from the connector assembly 120.

Advantageously, the connector assembly 120 allows parts (e.g., fluid conduits) to be arranged and snapped together for use relatively conveniently. The connector assembly 120 does not require manual deformation of any parts to create a substantially watertight engagement with a fluid conduit. The connector assembly 120 need only be placed on the end of the fluid conduit and either or both of the connector assembly 120 and the fluid conduit moved axially together in order to connect them such that the sealing member 132 provides a fluid tight connection while the connector body 124 (or 124a-124g) allows the fluid conduit to be used in a variety of fluid connections. If a user desires to disconnect the parts, the demount body 154 may be used and pressed manually to disengage the fluid conduit, although preferably a tool is used to engage the proximal end of the demount body 154 and move it axially along the longitudinal axis 122 to release the grab ring 140 and disengage the fluid conduit. If desired to open up the connector assembly 120, a tool could be inserted into each latch opening 314 in the sleeve sidewall 303 to urge each of the plurality of latches 310 out of engagement with the catch surface 210 and thus disassemble the connector assembly 120.

Beneficially, the latch opening 314 does not allow manual access by a user's fingers to release the latch member 311 from catch surface 210. The use of two or more mating latches and catch(es) along with a tight fit of the retainer sleeve 128 around the enclosed parts makes it impractical to release the plurality of latches 310 sequentially from the catch surface 210. Thus, disengaging the plurality of latches 310 from the catch surface 210 is preferably not achieved without special purpose tools or without permanently deforming at least one of the retainer sleeve 128 or the connector body 124. Thus, the coupling between the plurality of latches 310 and the catch surface 210 is not a releasable (e.g., removable, selectively releasable) connection and may require deformation or breakage of the retainer sleeve 128 or the connector body 124, which may result in a visible record (e.g., indicator) that the plurality of latches 310 was disconnected. In some embodiments, the plurality of latches 310 and the catch surface 210 form a permanent connection between the retainer sleeve 128 and the connector body 124 that cannot be removed without breaking the connector assembly 120.

As outlined above, the connector assembly 120 may be formed from one or more materials. For high strength or high-pressure applications, it is believed suitable to make all parts of suitable metal, except the sealing member 132. The material used for the fluid conduit will vary with the intended use, and may include metal pipes (e.g., copper, brass, iron), stiff plastic pipes (e.g., for plumbing), flexible tubes of plastic or flexible tubes of braided metal, and braided plastic or other braided materials.

Referring now to FIG. 14, a side, cross-sectional view of the connector body 124 is shown, according to an example embodiment. The connector body 124 includes a substantially annular body having a first end 200 (e.g., distal end) and a second end 202 (e.g., proximal end) opposite to the first end 200. The first end 200 is configured to receive a fluid conduit, such as a copper pipe. As generally indicated in FIG. 14, the second end 202 is open such that fluid is configured to flow through both ends (e.g., the first end 200 and the second end 202) of the connector body 124. The second end 202 may be fluidly coupled to a pipe fitting having a plurality of the connector assemblies 120. For example, a T-fitting may include three connector assemblies 120. Other example fittings are shown in FIGS. 20-26. In some embodiments, as generally indicated in FIGS. 23A-23C, the second end 202 includes the end wall 204 that is fluidly sealed and provides a hard stop for the fluid conduit.

The connector body 124 further includes a first portion (e.g., flange) 206 extending radially away from the annular body proximate to the first end 200. The first portion 206 extends circumferentially about the longitudinal axis 122. The first portion 206 includes a first engagement surface 208 and a catch surface 210. The first engagement surface 208 is the outermost radial surface of the first portion 206. In some embodiments, the first engagement surface 208 is concentric with the longitudinal axis 122. The first engagement surface 208 defines a first portion diameter 209 (e.g., first diameter). The catch surface 210 is contiguous with the first engagement surface 208, extends circumferentially about the longitudinal axis 122, and extends substantially perpendicular to the longitudinal axis 122.

The connector assembly 120 further includes an interference portion (or interference feature) 212 positioned along the connector body 124. For example, as indicated in FIGS. 14 and 15, the interference portion 212 extends circumferentially about the connector body 124 at a position between the first end 200 and the second end 202. In some embodiments, the interference portion 212 extends circumferentially about the connector body 124 at a position between the first portion 206 and the second end 202. In some embodiments, the interference portion 212 is at a position approximately halfway between the first end 200 and the second end 202. In some embodiments, the interference portion 212 is positioned nearer to the first end 200 than to the second end 202. The interference portion 212 includes a second engagement surface 214. The second engagement surface 214 is the outermost radial surface of the interference portion 212. In some embodiments, the second engagement surface 214 is concentric with the longitudinal axis 122 and the first engagement surface 208. The second engagement surface 214 defines a second portion diameter 218 (e.g., second diameter).

The connector assembly 120 further includes a shoulder surface 216. The shoulder surface 216 is contiguous with the second engagement surface 214 and extends circumferentially about the longitudinal axis 122. The shoulder surface 216 defines a frustoconical profile that tapers to a larger diameter as the shoulder surface 216 extends from the first portion 206 to the interference portion 212. The shoulder surface 216 functions as a ramp that guides a portion of the retainer sleeve 128 into engagement with the second engagement surface 214 during assembly. In some embodiments, the second portion diameter 218 is greater than the first portion diameter 209. In some embodiments, the second portion diameter 218 is greater than the first portion diameter 209 by an amount between approximately 0.3 mm (millimeters) and approximately 0.5 mm, inclusive.

During assembly of the connector assembly 120, the interference portion 212 may be interposed between the retainer sleeve 128 and the connector body 124. In some embodiments, the interference portion 212 is coupled to the connector body 124. In the illustrated embodiment, as indicated in FIGS. 14 and 15, the interference portion 212 and the shoulder surface 216 are integrally formed with the connector body 124. As utilized herein, two or more elements are "integrally formed" with each other when the two or more elements are formed and joined together as part of a single manufacturing step to create a single-piece or unitary construction that cannot be disassembled without an at least partial destruction of the overall component. For example, the interference portion 212 and the shoulder surface 216 may be formed into the connector body 124 by turning, milling, or other suitable cutting or machining process such that the interference portion 212 and the connector body 124 are integrally formed. In other examples, the connector body 124 can be molded or otherwise formed to include the interference portion 212 and shoulder surface 216. In additional or alternative embodiments, the interference portion 212 can be part of or coupled to the retainer sleeve 128. For example, the interference portion 212 can include a plurality of ribs, protuberances, etc., or sets or groupings thereof, formed along or connected to the inner surface of the retainer sleeve 128 that are configured to engage the connector body 124 to facilitate an interference fit between the connector body 124 and the retainer sleeve 128.

In some embodiments, the interference portion 212 may be formed separately from the connector body 124 and later coupled to the connector body 124. For example, the interference portion 212 may include an annular ring, such as a circlip or other movable, detachable portion, which can be selectively positioned around the connector body 124. In addition, the shoulder surface 216 may be formed separately from the connector body 124 and later coupled to the connector body 124. For example, during assembly of the connector assembly 120, the shoulder surface 216 may be interposed between the retainer sleeve 128 and the connector body 124. In some embodiments, the shoulder surface 216 is coupled to the connector body 124. In some embodiments, the shoulder surface 216 is slidable between the first portion 206 and the interference portion 212.

Referring to FIG. 15, the interference portion 212 can include a flange or other protruding portion (e.g., a second flange 213) extending radially away from the connector body 124 at a position between the first portion 206 and the second end 202. In some embodiments, the second flange 213 is at a position approximately half way between the first end 200 and the second end 202. In some embodiments, the second flange 213 is positioned nearer to the first end 200 than to the second end 202. The second flange 213 includes the second engagement surface 214 and the shoulder surface 216. The second engagement surface 214 is the outermost radial surface of the second flange 213.

Positioned between the first portion 206 and the interference portion 212 is a connector body groove 230 (e.g., channel or other recessed area). The connector body groove 230 includes a groove surface 232 that extends circumferentially about the longitudinal axis 122. In some embodiments, the groove surface 232 is generally concentric about and parallel with the longitudinal axis 122. In some embodiments, the shoulder surface 216 extends between the first portion 206 and the interference portion 212 such that the shoulder surface 216 is contiguous with the catch surface 210.

Referring again to FIG. 14, an inner shoulder 242 is shown extending radially inward from an inner surface 240 of the connector body 124. The inner shoulder 242 is configured to interface with the sealing member 132 to form a substantially watertight seal between all of the connector body 124, the sealing member 132, and a fluid conduit when a fluid conduit is extended into the connector assembly 120.

Referring now to FIG. 16, a cross-sectional view of the retainer sleeve 128 is shown. The retainer sleeve 128 includes a substantially annular body having a first end 300

(e.g., proximal end) and a second end 302 (e.g., distal end) opposite to the first end 300. The first end 300 is configured to receive a fluid conduit, such as a copper pipe. The second end 302 is configured to receive the connector body 124 and to cover at least a portion of the connector body 124.

The retainer sleeve 128 further includes a sleeve opening 368 extending into the first end 300 and along the longitudinal axis 122. The sleeve opening 368 is sized to allow the proximal end 450 of the cartridge 146 to pass through. Advantageously, the fit between the sleeve opening 368 and the proximal end 450 of the cartridge 146 is snug (e.g., a slip fit) such that the retainer sleeve 128 radially supports the proximal end 450 of the cartridge 146, which in turn supports the proximal end 458 of the demount body 154, which further in turn supports the fluid conduit passing through the demount body 154. The first end 300 of the retainer sleeve 128 includes a rounded reduction in diameter, shown as a sleeve chamfer 384, proximate to the first end 300. The sleeve chamfer 384 increases the radial and axial stiffness of the retainer sleeve 128 and allows a suitable clearance for the parts contained within the retainer sleeve 128. By way of example, the first end 300 of the retainer sleeve 128 is shown as including a straight portion extending axially away from the sleeve chamfer 384, which increases the strength of the retainer sleeve 128 and prevents (e.g., stops) unrolling of the retainer sleeve 128. The outer periphery of the retainer sleeve 128 preferably conforms to the outer shape of the parts inside the retainer sleeve 128, including the portion of the connector body 124 enclosed by the retainer sleeve 128. Advantageously, the second end 302 of the retainer sleeve 128 overlaps a portion of the connector body 124. The remainder of the connector body 124 will vary, as outlined above, depending on whether the connector body 124 is an in-line connector, an elbow connector, a T-connector, a Y-connector, a multi-tube connector, a blind end connector, or another type of connector.

The retainer sleeve 128 further includes a sleeve sidewall 303 having an inner sleeve surface 304 that extends between the first end 300 and the second end 302. The inner sleeve surface 304 defines a sleeve diameter 308 (e.g., third diameter). In some embodiments, the sleeve diameter 308 is greater than the first portion diameter 209 and less than the second portion diameter 218. In some embodiments, the sleeve diameter 308 is less than both the first portion diameter 209 and the second portion diameter 218.

The retainer sleeve 128 further includes a plurality of latches 310, the plurality of latches 310 including at least one latch member 311. Each of the plurality of latches 310 extends radially inward from the inner sleeve surface 304 and toward the longitudinal axis 122. Each of the plurality of latches 310 includes a resiliently flexible protrusion that is in the form of a rectangular tab. A latch opening 314 is positioned at a proximal end of each of the plurality of latches 310 and extends through the sleeve sidewall 303. In some embodiments, each of the plurality of latches 310 includes an elongated member resiliently urged in a direction toward the longitudinal axis 122 and configured to engage the catch surface 210 when the retainer sleeve 128 is coupled to the connector body 124. Each of the plurality of latches 310 is shown in a released position 313. In the released position 313, the plurality of latches 310 extends radially inward from the inner sleeve surface 304 at a first non-zero angle relative to the longitudinal axis 122. In some embodiments, the first non-zero angle may be greater than 15 degrees, such as between 15-30 degrees, inclusive, or between 30-45 degrees, inclusive. In some embodiments, the first non-zero angle is a non-zero angle of five degrees or less. Accordingly, each of the plurality of latches 310 extends transversely toward the longitudinal axis 122 in order to extend into the connector body groove 230 and engage with the catch surface 210.

Each of the plurality of latches 310 is cut into the sleeve sidewall 303 such that each of the plurality of latches 310 is integrally formed with the retainer sleeve 128. In some embodiments, each of the plurality of latches 310 includes a rectangular profile. In some embodiments, each of the plurality of latches 310 includes a trapezoidal profile. In some embodiments, each of the plurality of latches 310 includes a rounded profile. After at least one of the plurality of latches 310 is formed with the retainer sleeve 128, the at least one latch member 311 is bent radially inward toward the longitudinal axis 122. The latch opening 314 in the sidewall 303 defines a latch end 312 (e.g., free end, proximal end, etc.) of the latch member 311. Two parallel cuts 316 that are substantially parallel to the longitudinal axis 122 extend into the sleeve sidewall 303 and toward the latch opening 314 to define the remaining two sides of the generally rectangular plate forming the latch member 311. Because the sleeve sidewall 303 is curved, the latch end 312 of the latch member 311 is slightly curved at the same general curvature as the sleeve sidewall 303. When the retainer sleeve 128 is coupled to the connector body 124, the curvature of the latch member 311 may approximate the curvature of the groove surface 232. The curvature (e.g., radius) of the latch member 311 provides reinforcement to the latch member 311 and increases the burst failure pressure of the connector assembly 120.

The retainer sleeve 128 further includes an end portion or area 326 proximate to the second end 302. The end portion 326 extends between the second end 302 and the base of the plurality of latches 310. A bend plane 328 is demarcated on FIGS. 16 and 17 with a dotted line to show the approximate position of the bend of the plurality of latches 310 (e.g., a base of the plurality of the latches 310). When the retainer sleeve 128 is coupled to the connector body 124, the end portion 326 engages the second engagement surface 214 of the interference portion 212. In some embodiments, such as when the sleeve diameter 308 is less than the second portion diameter 218, the end portion 326 expands to the second portion diameter 218 such that an interference fit is formed between the retainer sleeve 128 and the connector body 124. As a result, the end portion 326 is at least one of plastically or elastically deformed to correspond to the second portion diameter 218.

For example, the sleeve diameter 308 may be between about 0.001 and about 0.005 inches (approximately between about 0.0254 and about 0.127 millimeters) less than the second portion diameter 218. When the retainer sleeve 128 is pressed onto the connector body 124, the second end 302 of the retainer sleeve 128 engages the shoulder surface 216, which facilitates expansion of the end portion 326 to the second portion diameter 218.

In some embodiments, the sleeve diameter 308 may be between about 0.008 and about 0.02 inches (e.g., between about 0.2 and about 0.5 millimeters) less than the second portion diameter 218. As will be appreciated by a person of ordinary skill in the art, an interference fit with the aforementioned tolerance range is generally tighter than a standard and accepted interference fit. Herein, the terms "enhanced interference fit" and "increased interference fit" are used to refer to an interference fit that is tighter than an acceptable or typical interference fit (e.g., the shaft has a diameter that is greater than the traditionally accepted diameter for a hole of a given size). As understood by persons skilled in the art, forming an interference fit between two components outside of the accepted tolerance ranges can lead to a fit that is either too loose (e.g., a local interference fit, rigidity of the fitting may be compromised under load) or too tight (e.g., causing unintentional damage to the components during assembly and/or use, such as causing the shaft to ream a new hole, bending/breaking of the shaft, or cracking of the hole).

Referring now to FIGS. 18 and 19, the retainer sleeve 128 is shown before and after being coupled to the connector body 124. Referring specifically to FIG. 18, plurality of latches 310 is in the released (e.g., initial, first, rest, unlocked, etc.) position 313. In the released position 313, the plurality of latches 310 may extend at the first non-zero angle relative to the longitudinal axis 122. When the retainer sleeve 128 is coupled to the connector body 124, the thin sidewall 303 of the retainer sleeve 128 allows the end portion 326 to flare radially outward to the second portion diameter 218 to form a flared portion 327.

Referring now to FIG. 19, the retainer sleeve 128 is shown coupled to the connector body 124 with the plurality of latches 310 shown in a locked (e.g., second, engaged, leveraged, etc.) position 315. In the locked position 315, the plurality of latches 310 is at a position, orientation, configuration, etc. (i.e., second position, orientation, configuration, etc.) that is different from the position, orientation, configuration, etc. of the latches in the initial, released position 313 (i.e., first position, orientation, configuration, etc.), with the second position, orientation, configuration, etc. of the plurality of latches 310 improving, increasing, etc., engagement between the plurality of latches 310 and the connector body 124. For example, in the locked position 315, the free end 312 of the latch member 311 may be spaced further away from the inner sleeve surface 304 of the retainer sleeve 128 in comparison to the latch member 311 in the initial, released position 313. That is, a distance between the free end 312 of the latch member 311 and the inner sleeve surface 304 of the retainer sleeve 128 in the locked position 315 is greater than a distance between the free end 312 of the latch member 311 and the inner sleeve surface 304 of the retainer sleeve 128 in the initial released position 313. Accordingly, the plurality of latches 310 have improved/increased engagement with the catch surface 210 on the connector body 124 (e.g., the increased distance between the free end 312 of the latch member 311 and the retainer sleeve 128 increases the area or portion of engagement between the latch member 311 and the catch surface 210 (or groove surface 232), reduces the likelihood of partial or discontinuous engagement between the plurality of latches 310 and the catch surface 210 (or groove surface 232), or increases the force of engagement between the plurality of latches 310 and the catch surface 210 (or groove surface 232)). Further still, in the locked position 315, the plurality of latches 310 may extend radially inward at a second non-zero angle relative to the longitudinal axis 122, the second non-zero angle being greater than the first non-zero angle of the plurality of latches 310 in the initial, released position 313.

In some embodiments, the plurality of latches 310 is biased radially outward such that the plurality of latches 310 is more in line with the sidewall 303 in the locked position 315 than in the released position 313. In some embodiments, the flared portion 327 of the end portion 326 is substantially maintained within the end portion 326 (e.g., between the bend plane 328 and the second end 302). In some embodiments, the enhanced (e.g., increased, extreme, etc.) interference fit creates (e.g., imparts) a slight taper in the retainer sleeve 128 that extends beyond the bend plane 328 and toward the first end 300 when the retainer sleeve 128 is coupled to the connector body 124. In some embodiments, the end portion 326 is flared radially outward at the second end 302 such that the second end 302 has a diameter greater than a median diameter of the retainer sleeve 128. In some embodiments, the flared portion 327 extends radially away from the longitudinal axis 122 at a non-zero angle. When the retainer sleeve 128 is coupled to the connector body 124, the second end 302 defines a third diameter 329 greater than the second portion diameter 218.

The flaring of the end portion 326 causes deformation (e.g., levering, bending, biasing, etc.) of the plurality of latches 310 toward the longitudinal axis 122. In other words, each of the plurality of latches 310 is transitioned from the released position 313 to the locked position 315 when the end portion 326 engages the interference portion 212. In the released position 313, each of the plurality of latches 310 extends radially inward from the inner sleeve surface 304 at the first non-zero angle. In the locked position 315, each of the plurality of latches 310 is biased radially inward toward the connector body 124 to improve the engagement between the plurality of latches 310 and the connector body groove 230. In some embodiments, the plurality of latches 310 bite into (e.g., sink into) the catch surface 210 (or into groove surface 232) to improve the connection between the retainer sleeve 128 and the connector body 124.

When the end portion 326 engages the interference portion 212, the transition of the plurality of latches 310 from the released position 313 to the locked position 315 facilitates an increase in the failure strength of the connector assembly 120. In other words, when the plurality of latches 310 is in the locked position 315, the ambient burst strength is improved (e.g., due at least in part to the increased engagement of the plurality of latches 310) and the point of failure may be failure between the fluid conduit and the teeth 444 rather than at engagement of the retainer sleeve 128 with the connector body 124.

When the retainer sleeve 128 is coupled to the connector body 124, the interference portion 212 engages with the end portion 326 and causes the second end 302 of the retainer sleeve 128 to flare outward with respect to the second portion diameter 218. The flaring of the end portion 326 causes the plurality of latches 310 to deform (e.g., rotate or otherwise lever about the bend plane 328 shown in FIG. 19) and engage with the catch surface 210 (or the groove surface 232). The levering of the plurality of latches 310 can increase the engagement (e.g., are of engagement, force of engagement, etc.) between the plurality of latches 310 and the connector body 124. In some embodiments, the levering of the plurality of latches 310 improves the burst failure strength of the connector assembly 120. In particular, the retainer sleeve 128 and plurality of latches 310 collectively provide the connector assembly 120 with sufficient strength to reduce the likelihood of a burst-related failure.

In some embodiments, the ambient burst strength of the connector assembly 120 is 1,800 pounds per square inch (psi) or more. In some embodiments, the ambient burst strength is between 1,000 psi and 2,100 psi, inclusive. For example, the ambient burst strength may be between 1,100 psi and 2,100 psi, inclusive; between 1,200 psi and 2,100 psi, inclusive; between 1,300 psi and 2,100 psi, inclusive; between 1,400 psi and 2,100 psi, inclusive; between 1,500 psi and 2,100 psi, inclusive; between 1,600 psi and 2,100 psi, inclusive; between 1,700 psi and 2,100 psi, inclusive; and between 1,800 psi and 2,100 psi, inclusive, etc.

The flaring of the end portion 326 also serves to facilitate centering of the retainer sleeve 128 about the connector body 124 during assembly. The flared portion 327 may extend radially outward equally at all points circumferentially about the end portion 326 such that the retainer sleeve 128 is centered relative to the interference portion 212. In some embodiments, the plurality of latches 310 is compressed into the connector body 124 with a separate process after the retainer sleeve 128 is coupled to the connector body 124. For example, the retainer sleeve 128, and specifically the plurality of latches 310 and the end portion 326, may be joined to the connector body 124 (e.g., forced into the connector body 124 such that the retainer sleeve 128 is plastically deformed, such as by rolling, knurling, individually pressing each of the plurality of latches 310 into the connector body 124, etc.). In some embodiments, the enhanced interference fit between the connector body 124 and the retainer sleeve 128 prevents rotation of the retainer sleeve 128 relative to the connector body 124 about the longitudinal axis 122 when the retainer sleeve 128 is coupled to the connector body 124. The retainer sleeve 128 may be formed of stainless steel and is advantageously drawn to shape by successive drawing steps with the latch opening 314 and the plurality of latches 310 punched into the retainer sleeve 128 at later drawing stages. The plurality of latches 310 may be formed by a punching or stamping process. The punching or stamping process can creates lanced edges in the retainer sleeve 128. In certain examples, the plurality of latches 310 can be punched separately such that the retainer sleeve 128 is rotated 90 degrees between each punch to fabricate the plurality of latches 310 in four steps. In certain examples, a total of four latches 310 are formed in the retainer sleeve 128 and two of the four latches 310 may be punched in the retainer sleeve 128 simultaneously at 180 degrees apart.

The various connector assemblies shown in FIGS. 20-22, 23A-23C, and 24-26 may have one or more parts of the connector assembly 120 described above, and the description of those parts is not repeated although certain part numbers are shown in the Figures. In particular, it will be appreciated that the connector bodies 124a-124g may be used instead of the connector body 124 while the remaining parts of the connector assembly 120 (i.e. the retainer sleeve 128, the sealing member 132, the protection ring 136, the grab ring 140, the cartridge 146, and the demount body 154) are used to create the respective connectors. As can be seen in FIGS. 20-22, 23A-23C, and 24-26, multiple connectors are respectively used on each end of the connector bodies 124a-124g to form the connector assemblies. In configurations in which the fluid passage extends through the connector body 124a-124c, 124e-124g, a tube stop may take the form of an internal shoulder on the connector body 124a-124c, 124e-124g encircling the flow passage, and preferably forming an annular surface.

Referring generally to FIGS. 27-33, a method 500 of assembling the connector assembly 120 is shown, according to an example embodiment. At 502, a connector body, such as the connector body 124, is obtained. The connector body is positioned along an axis, such as the longitudinal axis 122. In some embodiments, the connector body includes a fluid passage (e.g., flow path) that extends at least partially therethrough. The connector body may further include an interference portion, such as the interference portion 212. In some embodiments, obtaining the connector body includes forming the connector body. The connector body may be formed with or without the interference portion. In some embodiments, the obtained connector body is the connector body 124 according to FIGS. 14 and 15.

At 504, a retainer sleeve, such as the retainer sleeve 128, is obtained. The retainer sleeve is configured for receiving over at least part of the connector body and extending circumferentially around the axis. In some embodiments, the retainer sleeve is provided with a plurality of latches. The retainer sleeve is configured for receiving over at least part of the connector body and the retainer sleeve is configured for extending circumferentially about the fluid passage. In some embodiments, providing the retainer sleeve includes forming the retainer sleeve. In some embodiments, the obtained retainer sleeve is the retainer sleeve 128 according to FIGS. 16 and 17.

Figure 28:
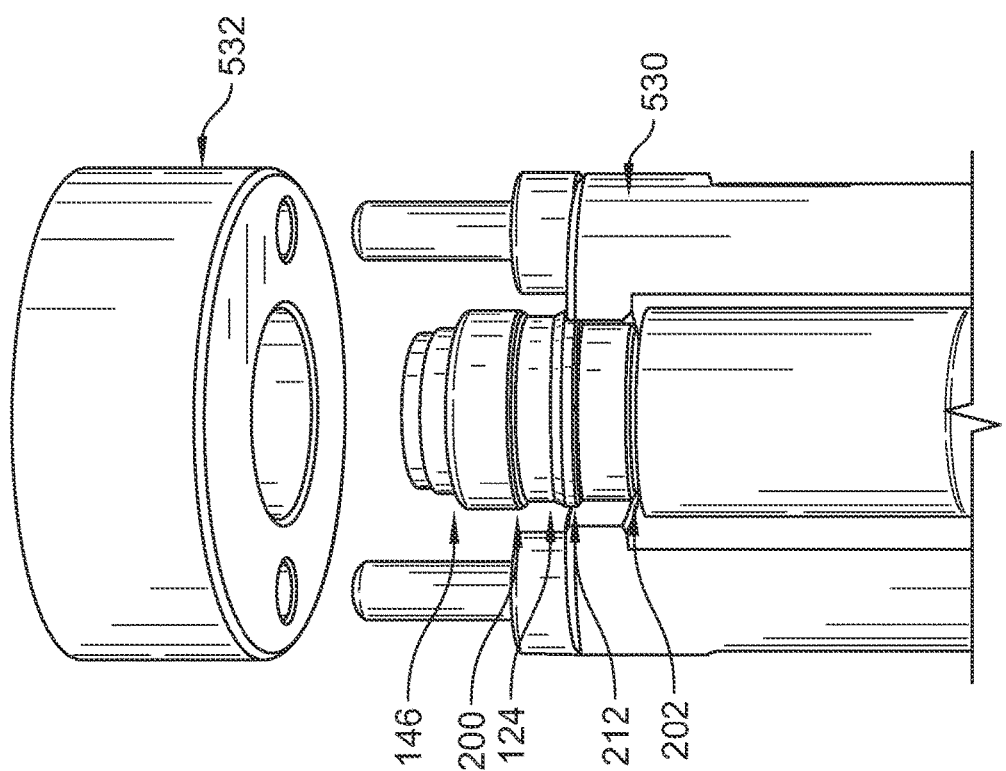
FIG. 28 is a front view of a partially assembled connector assembly positioned on a fixture.

At 506, the connector body is positioned on a fixture, such as the fixture 530. As shown in FIG. 28, the connector body is positioned on the fixture such that the first end 200 of the connector body is positioned nearer to the press 532 than the second end 202 of the connector body.

At 508, a plurality of components is positioned between the retainer sleeve and the connector body. In some embodiments, the sealing member 132, the protection ring 136, the grab ring 140, the demount body 154, and the cartridge 146 are positioned between the connector body 124 and the retainer sleeve 128. For example, as shown in FIG. 28, the connector body may be positioned on a fixture 530, and the sealing member 132, the protection ring 136, grab ring 140, the demount body 154, and the cartridge 146 are positioned on (e.g., in) the connector body 124. More specifically, the demount body 154 and the grab ring 140 are contained between the cartridge 146 and the protection ring 136 by the engaging member 477 and the circumferential recess 479, described above, to form a sub-assembly. Separately, the sealing member 132 is placed into the connector body 124 and the above-described sub-assembly is then inserted into the connector body 124 so the second end 402 of the protection ring 136 enters the cylindrical recess of the connector body 124 until the protection shoulder 404 contacts the first end of the connector body 124. In this manner, the sealing member 132 is positioned between the inner shoulder 242 of the connector body 124 and the second end 402 of the protection ring 136.

At 510, an interference portion, such as the interference portion 212, is positioned circumferentially about the axis. In some embodiments, the interference portion is positioned circumferentially about the fluid passage. In some embodiments, the interference portion is coupled to the connector body. In some embodiments, the interference portion is formed into the connector body before or after obtaining of the connector body.

Figure 29:
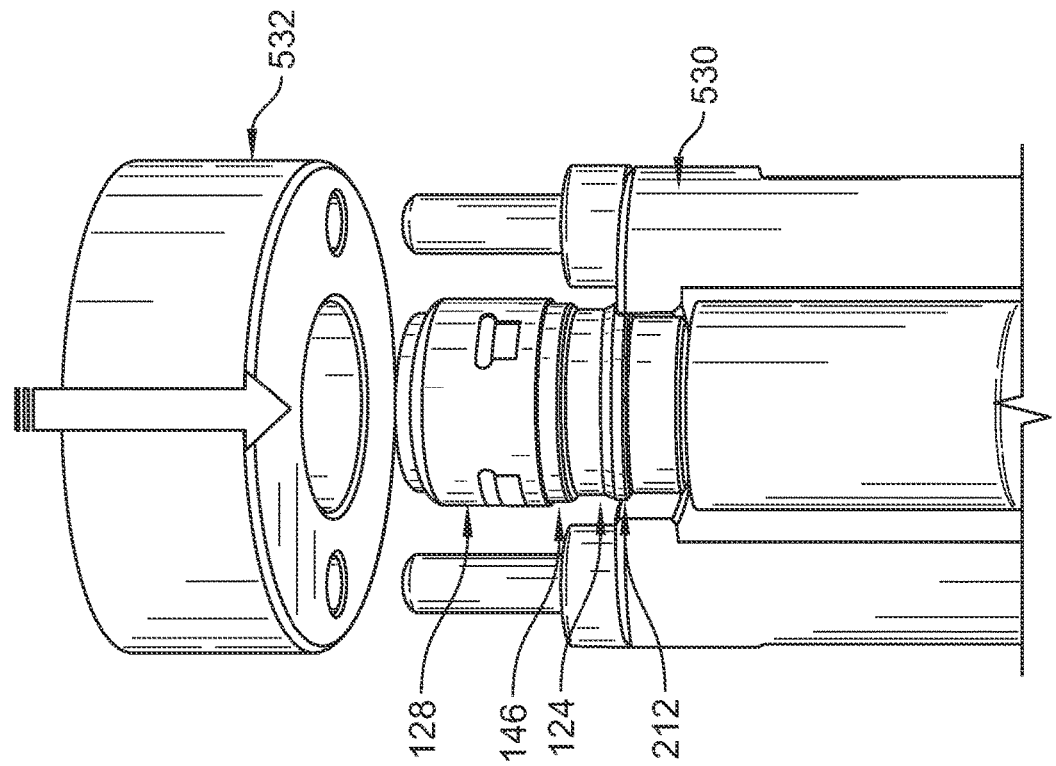
FIG. 29 is a front view of the retainer sleeve positioned over the partially assembled connector assembly of FIG. 28.

At 512, the retainer sleeve is positioned on the internal components such that the internal components are interposed between the retainer sleeve and the connector body. Referring now to FIG. 29, the retainer sleeve is shown positioned on the cartridge 146.

At 514, the retainer sleeve is pressed around the connector body and the connector body using a press 532. As shown in FIG. 30, the press 532 is moved downward in a direction toward the second end 202 of the connector body.

At 516, as shown in FIG. 31, the retainer sleeve is moved (e.g., pressed) to interpose the interference portion between the connector body and the retainer sleeve. In some embodiments, the retainer sleeve is pressed around the interference portion such that the interference portion engages a portion of the inner sleeve surface proximate to the first sleeve end and causes the portion of the inner sleeve surface proximate to the first sleeve end to deform and expand in diameter to a coupling diameter greater than the inner sleeve diameter.

In some embodiments, the press 532 is operated to push (e.g., press) the retainer sleeve 128 over the connector body 124.

In some embodiments, pressing the retainer sleeve around both the connector body and the interference portion forms an interference fit between the retainer sleeve and the interference portion such that rotation of the retainer sleeve relative to the connector body about the axis is prevented. In some embodiments, rotation about the fluid passage is prevented by the interference fit between the retainer sleeve and the connector body.

At 518, the plurality of latches are engaged with a catch surface of the connector body. More specifically, the retainer sleeve 128 is pressed onto the connector body 124 until each of the plurality of latches 310 engages the catch surface 210 to lock (e.g., couple) the retainer sleeve 128 to the connector body 124 and form the connector assembly 120. At the same time, the end portion 326 of the retainer sleeve 128 engages the interference portion 212 and forms an interference fit such that the retainer sleeve 128 is prevented from rotating relative to the connector body 124. In some embodiments, such as shown in FIG. 31, the interference portion is interposed between the retainer sleeve and the connector body generally at or around the same time that the plurality of latches engage the catch surface of the connector body. Moreover, the plurality of latches 310 are moved from the initial, released position 313 to the locked position 315, e.g., to increase engagement between the plurality of latches 310 and the catch surface 210. While being retained by the catch surface 210, the plurality of latches 310 extends in a transverse direction to the longitudinal axis 122. Further, the end portion 326 of the retainer sleeve 128 engages the shoulder surface 216 such that the shoulder surface 216 causes expansion of the end portion 326 to the second portion diameter 218. The expansion of the end portion 326 further causes centering of the retainer sleeve 128 about the connector body 124 and about the interference portion 212

Figure 33:
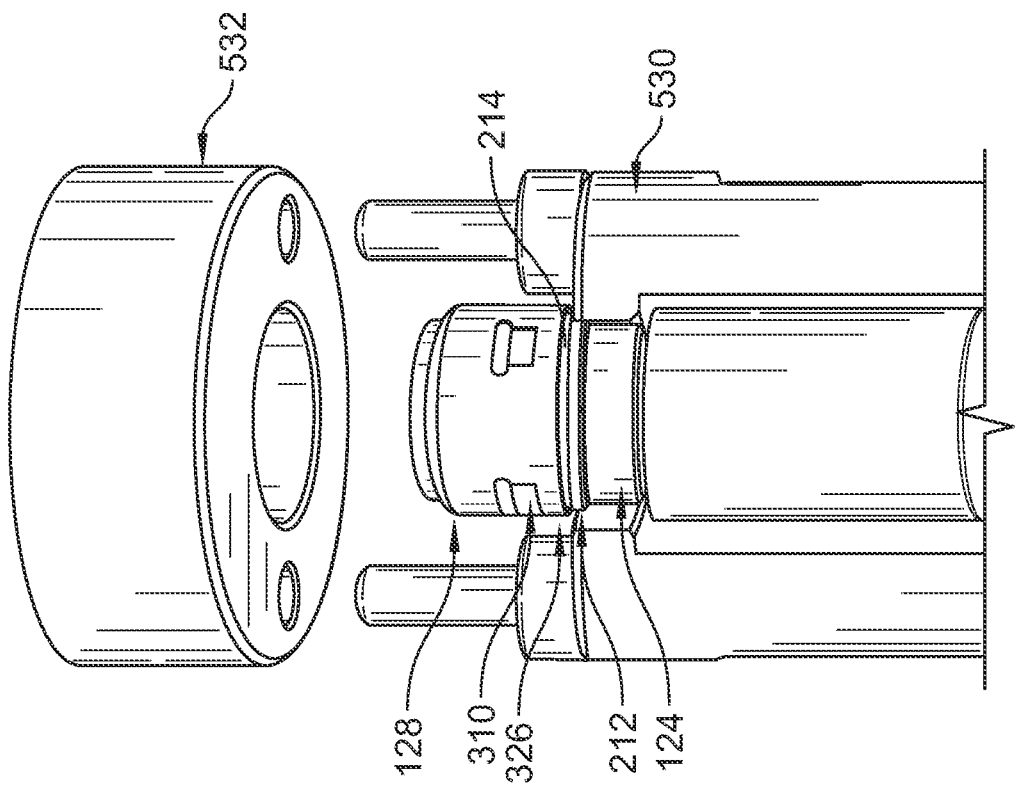
FIG. 33 is a front view of the connector assembly of FIG. 32 positioned on the fixture.
Figure 32:
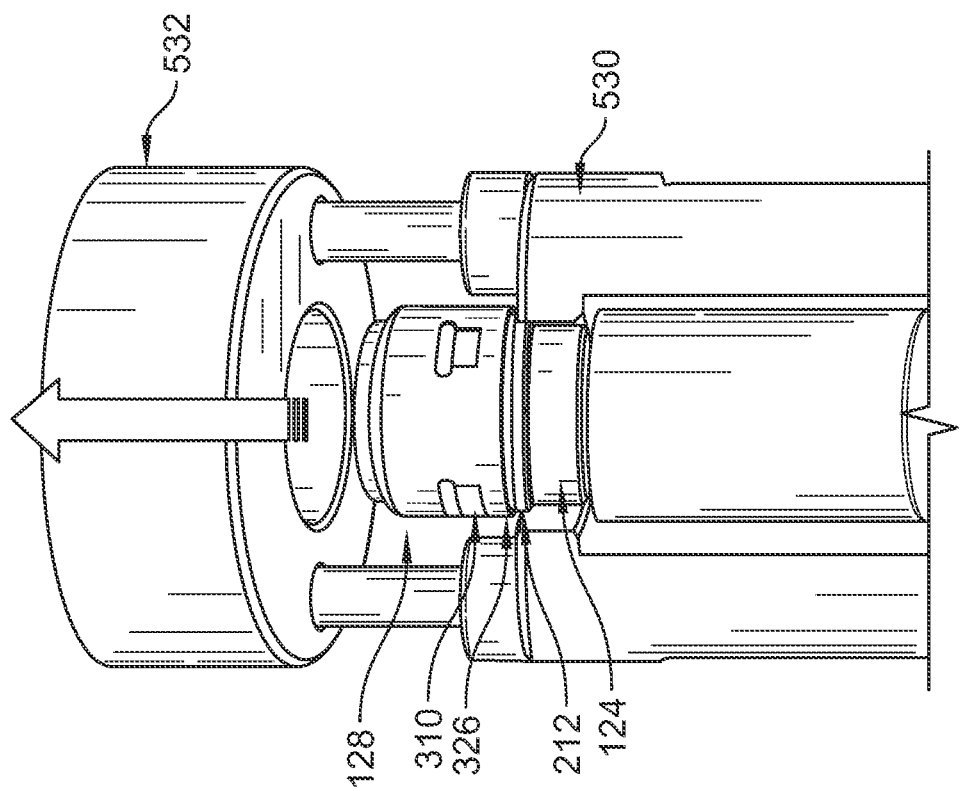
FIG. 32 is a front view of the press being operably disengaged from the fully assembled connector assembly of FIG. 31.

At 520, the press 532 is disengaged (e.g., released) from engagement with the connector assembly. As shown in FIGS. 32 and 33, the press 532 is raised above and away from the completed connector assembly 120 such that the connector assembly 120 may be removed from the fixture 530. A portion of the second engagement surface 214 may be uncovered and exposed to air after the retainer sleeve 128 is coupled to the connector body 124. In some embodiments, the retainer sleeve 128 covers and is engaged with the entirely of the second engagement surface 214 such that no portion of the second engagement surface 214 is visible after the retainer sleeve 128 is coupled to the connector body 124.

In another embodiment, a mechanical mechanism or tool may be configured to press the retainer sleeve over the connector body while simultaneously engaging the plurality of latches. That is, the mechanical mechanism or tool can be operated to push the retainer sleeve over the connector body and press the plurality of latches all in a single action. As such, a separate station is not needed for engaging the plurality of latches on the retainer sleeve.

Figure 34:
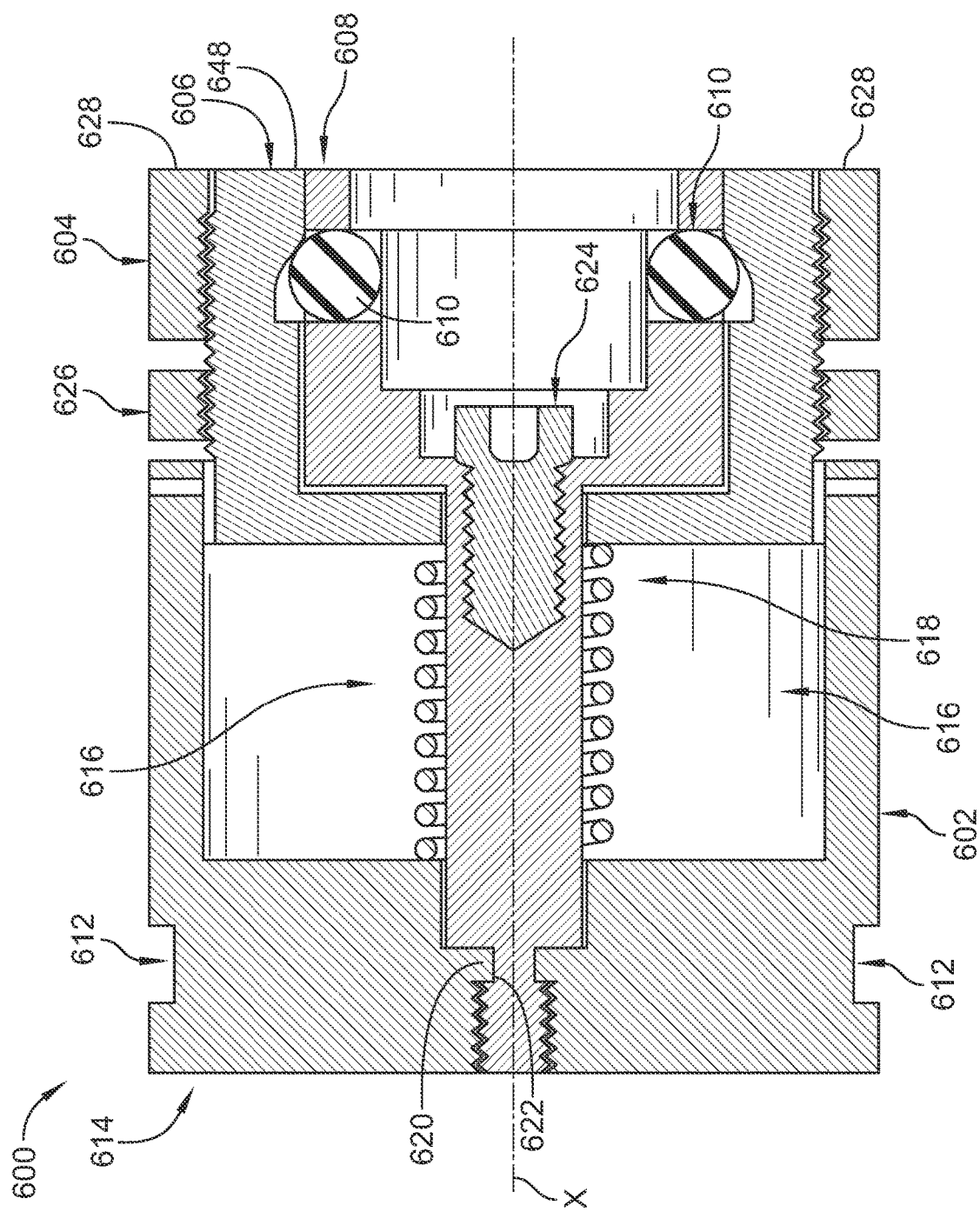
FIG. 34 is a schematic cross-sectional view of a press bit for use with a pressing tool, the press bit shown in a disengaged position, according to another example embodiment.

FIG. 34 illustrates a schematic view of a tool, such as a press-bit or press tool, 600 for use with the press 532 or other pressing tool for assembling the connector assembly 120 on a fixture similar to fixture 530. As depicted, the tool 600 is in an initial, unloaded position. The tool 600 can be adapted to mount to the press 532 or other pressing tool, such as a hydraulic or pneumatic cylinder or other structure thereof, which also includes an actuator. As such, the tool 600 can be moved up and down with the actuator during operation. In embodiments, the press 532 or other pressing tool can be connectable to the tool 600; though the tool 600 can replace the press 532 or other pressing tool without departing from the scope of the present disclosure.

Figure 35:
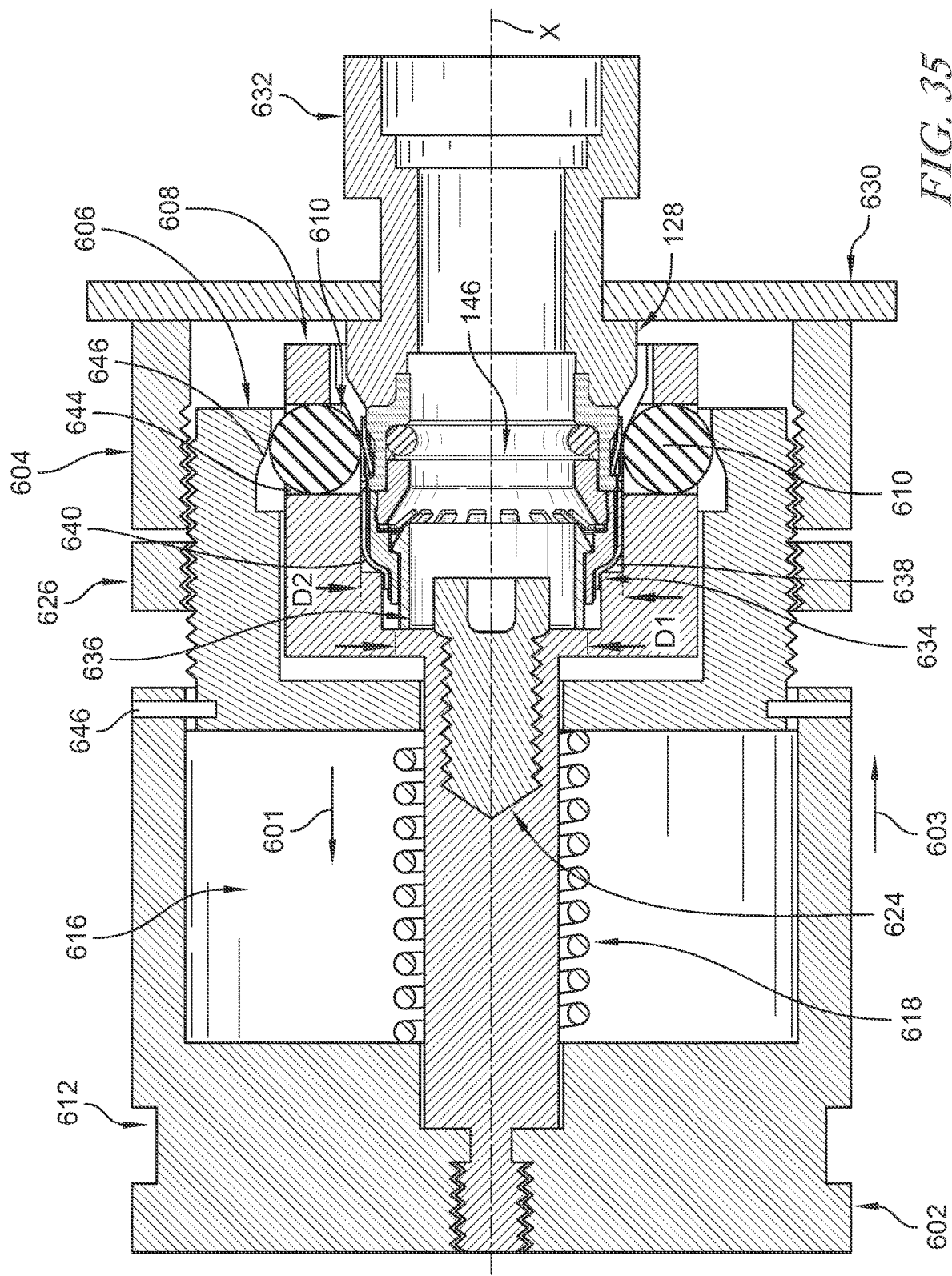
FIG. 35 is a schematic cross-sectional view of the press bit of FIG. 34 shown in an engaged position.

As generally indicated in FIGS. 34 and 35, the tool 600 can include an adapter sleeve 602, an adjustment sleeve 604, a collet sleeve 606, and a tool body 608, and a plurality of latch engagement members 610 (e.g., including bearing members, such as ball-shaped members, ball bearings, or other engagement members sized, designed or otherwise configured to engage the latches). The tool 600 is configured to position or apply the retainer sleeve 128 onto the connector body 124 (securing the sealing member 132, the protection ring 136, grab ring 140, the demount body 154, the cartridge 146, etc. therein) and also engage or press the latches 310 into their locked/engagement positions, or further locked/engagement positions, in relation to the connector body 124. In this regard, the tool 600 is configured to engage or press the latches 310 towards their engagement or locking positions substantially simultaneously with positioning of the retainer sleeve 128 on the connector body 124. That is, the engagement members 610 are configured to engage and move the latches 310 towards their engagement or locking positions while or at the same time that the retainer sleeve 128 is positioned onto the connector body 124.

The adapter sleeve 602 may be fixedly connected to the pressing tool via a cutout 612 (e.g., a notch, a slot) at a distal end 614 of the adapter sleeve 602. As such, the adapter sleeve 602 can be held in the pressing tool and not be movable relative thereto. The adapter sleeve 602 also defines a cavity 616 (i.e., pocket) configured for receiving a spring 618 and a portion of the collet sleeve 606. That is, the cavity 616 is designed to cover or protect the spring 618.

In one example, the adapter sleeve 602 may have flanges 620 configured to be received in recesses 622 defined in the tool body 608 when the tool body 608 is attached to the adapter sleeve 602, although alternatives are possible. In other examples, the tool body 608 may include a shoulder that engages a recess defined in the adapter sleeve 602. The tool body 608 can be threaded to the adapter sleeve 602 at the distal end 614 thereof such that the tool body 608 and the adapter sleeve 602 are fixed together as a single piece. A cap screw 624 can be used as an anchor as a means for gripping the tool body 608 when securing, tightening, or fixing the tool body 608 to the adapter sleeve 602. In certain examples, a hex screw or Allen key may be formed in the tool body 608 as a means to tighten the tool body 608 to the adapter sleeve 602, although alternatives are possible (e.g., a hexagon structure for engagement by a wrench or other tool or other structure for engagement by a tool can be employed without departing from the scope of the present disclosure). Because the adapter sleeve 602 is connected to an actuating mechanism of the pressing tool, the adapter sleeve 602 and the tool body 608 may actuate up and down together when mounting the retainer sleeve 128 onto the connector body 124.

The adjustment sleeve 604 may be threaded to the collet sleeve 606. The adjustment sleeve 604 may be used to set or calibrate a linear distance in which the collet sleeve 606 may travel when pushing the retainer sleeve 128 onto the connector body 124, e.g., to adjust the engagement (e.g., force, pressure applied, distance traveled etc.) of the latch engagement members 610 and/or the depth or amount the retainer sleeve 128 is positioned on or received over the connector body 124. The adjustment sleeve 604 may be adjusted backward or forward to achieve the desired calibration, and the lock nut 626 may be positioned, tightened, etc. to hold or lock the adjustment sleeve 604 into place. When a load or resistance is detected on the latch engagement members 610, this is an indication that the latch engagement members 610 are aligned and engaged with the latches 310 of the retainer sleeve 128. Adjustments using the adjustment sleeve 604 may facilitate or otherwise allow for calibrations of the latch engagement members 610 to ensure proper engagement or positioning thereof in relation to the latches 310.

Turning to FIG. 35, the tool 600 is shown in a loaded or completed operation position. When mounting the retainer sleeve 128 to the connector body 124, the adapter sleeve 602 and tool body 608 will travel along a longitudinal axis X from a retracted or unloaded position (see FIG. 34) to an extended or loaded position as shown.

The pressing tool is operated to push a retainer sleeve 128 to a set depth on a connector body 124 as controlled by a hydraulic or pneumatic cylinder of the press machine. In certain examples, the adjustment sleeve 604 can be used to set a depth for mounting the retainer sleeve 128 onto the connector body 124. The retainer sleeve 128 can be mounted over an interference portion similar to the interference portion 212 of the connector body 124 until positioned in place as detailed above. During operation, the adjustment sleeve 604 of the tool 600 will begin to move to position the retainer sleeve 128 onto the connector body 124 and an end face 628 of the adjustment sleeve will engage or contact a pallet plate or structure 630 upon mounting of the retainer sleeve 128 to the connector body 124. In embodiments, the assembly of the protection ring 136, grab ring 140, the demount body 154, the cartridge 146, etc. will be received within the connector body 124 prior to positioning of the retainer sleeve 128. In addition or alternative embodiments, the assembly of the protection ring 136, grab ring 140, the demount body 154, the cartridge 146, etc. can be received within the retainer sleeve 128 and positioned within the connector body 124 as the retainer sleeve 128 is positioned thereover. The pallet plate 630 includes or is attached to a pallet or other fixture mechanism or is designed to hold a connector body 124 or fitting member 632 (e.g., connector sub-assembly, e.g., connector body 124 with the sealing member 132, the protection ring 136, the grab ring 140, the demount body 154, the cartridge 146, etc. received therein) that includes the connector body 124. The pallet may be movable on a conveyor so that the fitting members are arranged to move therealong to be respectively aligned with the tool 600 for assembling the retainer sleeve 128 thereon.

The retainer sleeve 128 fits within the tool body 608 of the tool 600 during operation. The tool body 608 contains a stepped bore or socket 634 integrally formed with the tool body 608. The tool body 608 defines a first opening 636 with a first inner diameter D1 and a second opening 638 with a second inner diameter D2 different from the first inner diameter D1. A step 640 may be configured between the first and second openings 636, 638. The first inner diameter D1 may be smaller than the second diameter D2. In certain examples, the second diameter may be twice as large as the first diameter D1. The step 640 may be configured to cooperate with the retainer sleeve 128 for mounting the retainer sleeve 128 onto the fitting member 632 when the tool 600 moves towards or is in the loaded or completed position.

The tool body 608 further defines a groove, hole, or slot 644 for receiving the latch engagement members 610 which are mounted and carried therewith. The latch engagement members 610 may be approximately 4.5 mm in diameter, although alternatives are possible. An inner side of the collet sleeve 606 includes an inclined or tapered surface 646 opposite a threaded outer side of the collet sleeve 606 that threadedly engages with the adjustment sleeve 604 and lock nut 626. The collet sleeve 606 is designed to surround a portion of the connector body 124 which in turn holds the latch engagement members 610 in place to prevent the latch engagement members 610 from falling outside of the connector body 124. During operation of the tool 600, the latch engagement members 610 are configured to move along the inclined or tapered surface 646 of the collet sleeve 606. The latch engagement members 610 may slowly start to engage the latches 310 before being fully engaged therewith. The angle of the inclined or tapered surface 646 engages or guides the latch engagement members 610 to facilitate or otherwise provide the desired travel distance for the latch engagement members 610 to simultaneously engage or press the latches 310 when the retainer sleeve 128 is pressed over the connector body 124. In this regard, the latch engagement members 610 travel or are otherwise guided along and engaged by the surface 646 as the tool 600 is moved downwardly or otherwise toward the connector body 124 to move or direct the latch engagement members radially inwardly toward or into engagement with the latches 310 of the connector body 124 (e.g., to press the latches to or further into their locking positions in relation to the connector body). The distance of travel for the collet sleeve 606 and thus the latch engagement members 610 can be set by the adjustment sleeve 604. In certain examples, the inclined or tapered surface 646 of the collet sleeve 606 is between about 10 degrees and about 25 degrees. In certain examples, the inclined or tapered surface 646 of the collet sleeve 606 is less than 20 degrees. In certain examples, the inclined or tapered surface 646 of the collet sleeve 606 is at least 15 degrees. In certain examples, the inclined or tapered surface 646 of the collet sleeve 606 is about 15 degrees.

The tool body 608 of the tool 600 travels down to push the retainer sleeve 128 on until a predetermined resistance is reached. The predetermined resistance is built into the press tool and is controlled and measured within the cylinder connected to the tool body 608. The press tool may have a load sensor that measures the resistance. Once the resistance load is reached, the tool body 608 of the tool 600 can push the retainer sleeve 128 onto the connector body 124 at the optimum set distance (e.g., until the retainer sleeve sufficiently engages or is positioned sufficiently in relation to the interference portion). The adjustment sleeve 604 is designed to move first upon actuation until the end face 628 of the adjustment sleeve 604 contacts the pallet plate 630 thus allowing the collet sleeve 606 to be pressed or pushed back against the spring 618. The collet sleeve 606 can be pressed back into the cavity 616 of the adapter sleeve 602 as the adjustment sleeve 604 contacts the pallet plate 630. That is, the collet sleeve 606 can be pressed against the spring 618 in a distal direction 601 relative to the connector body 124. As the tool 600 begins to actuate with the press tool, the latch engagement members 610 are configured to move simultaneously as the retainer sleeve 128 is pushed onto the connector body 124. That is, as the collet sleeve 606 is pushed back against the spring 618, the latch engagement members 610 may simultaneously slide along the inclined surface 646 of the collet sleeve 606 and are aligned to engage the latches 310. The inclined surface 646 is designed to push or press the latch engagement members 610 inwardly toward the retainer sleeve 128. The latch engagement members 610 may apply a force to the latches 310 without damaging the latches 310. The latch engagement members 610 may push, activate, flex, or deform the latches 310 inwardly to provide an effective latch or engagement with the connector body 124. In embodiments, the latch engagement members 610 can apply or form a feature on the surface of the latches 310, such as a detent or other substantially noticeable deformation, for verification of sufficient engagement thereby. In additional or alternative embodiments, the latch engagement members 610 will not apply any surface deformation, indentation, detents, etc. to the surface of the latches 310.

It will be appreciated that the amount of force in which the latch engagement members 610 push the plurality of latches 310 may be controlled by adjusting the adjustment sleeve 604. The adjustment sleeve 604 and the lock nut 626 set a depth amount in which the latch engagement members 610 will engage the latches 310 of the retainer sleeve 128. The further away the adjustment sleeve 604 is set from an end 648 (see FIG. 34) of the collet sleeve 606, the higher the force will be in which the latch engagement members 610 can push the latches 310. While making linear adjustments, a lock pin 646 may be configured to extend through the collet sleeve 606 and the adapter sleeve 602 to stop or prevent the collet sleeve 606 from rotating or spinning. The lock nut 626 can be used to lock the adjustment sleeve 604 in the desired position once set.

At completion of the operation, tool 600 begins to lift off of the fitting member 632 and the spring 618 begins to bias the collet sleeve 606 in a proximal direction 603 relative to the connector body 608 which allows the latch engagement members 610 to slide away from the inclined surface 646 of the collet sleeve 606 to be released off of the latches 310 of the retainer sleeve 128. Although the spring 618 may be provided to safely return the collet sleeve 606 to its original position after operation, in other embodiments, gravity and the weight of the collet sleeve 606 may be sufficient to return the collet sleeve 606 to its pre-operating position. At completion of the press operation, the spring 618 can function to bias the collet sleeve 606 in the proximal direction 603 relative to the connector body 608 to its original position.

Figure 36:
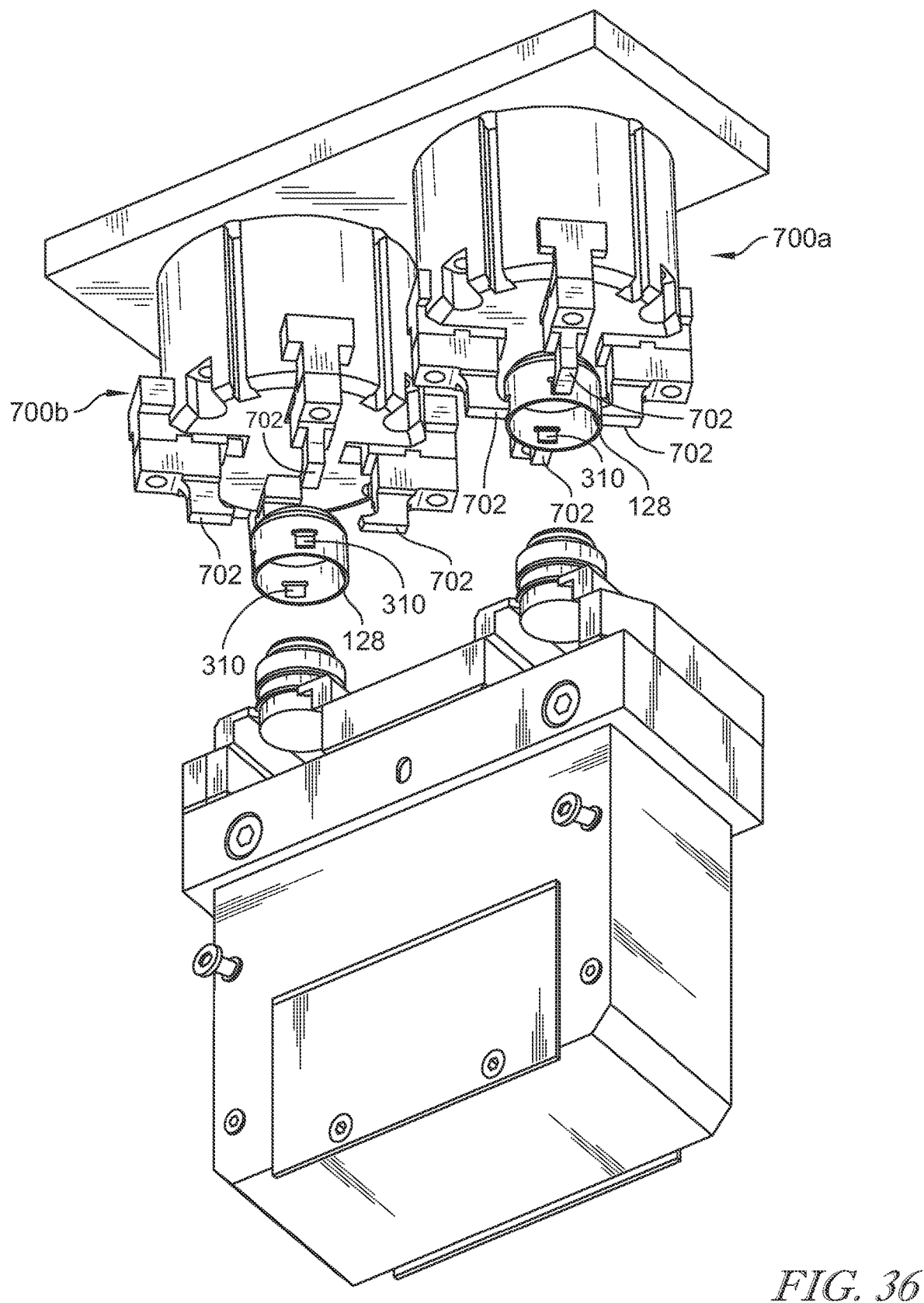
Figure 37:
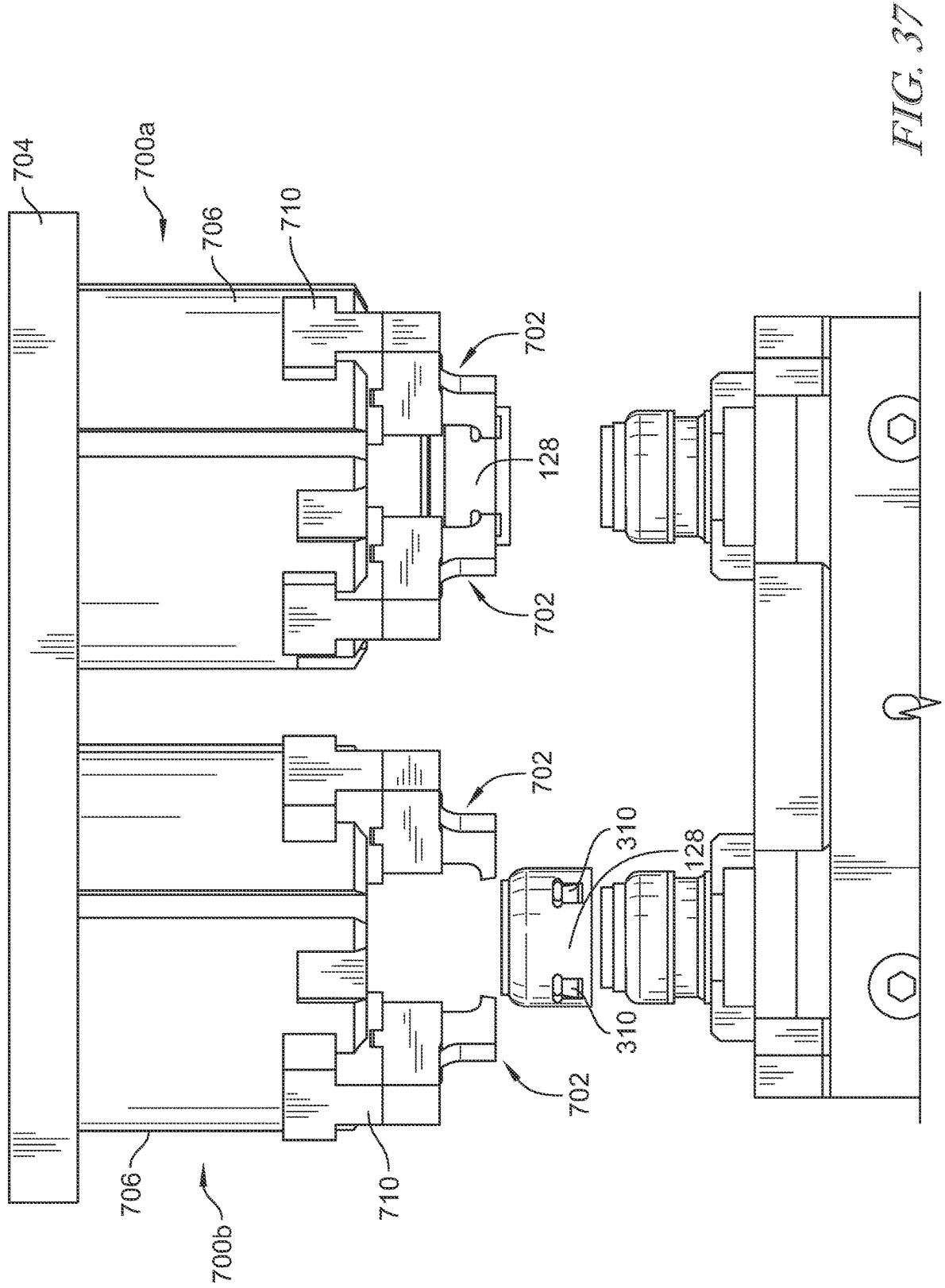
Figure 38:
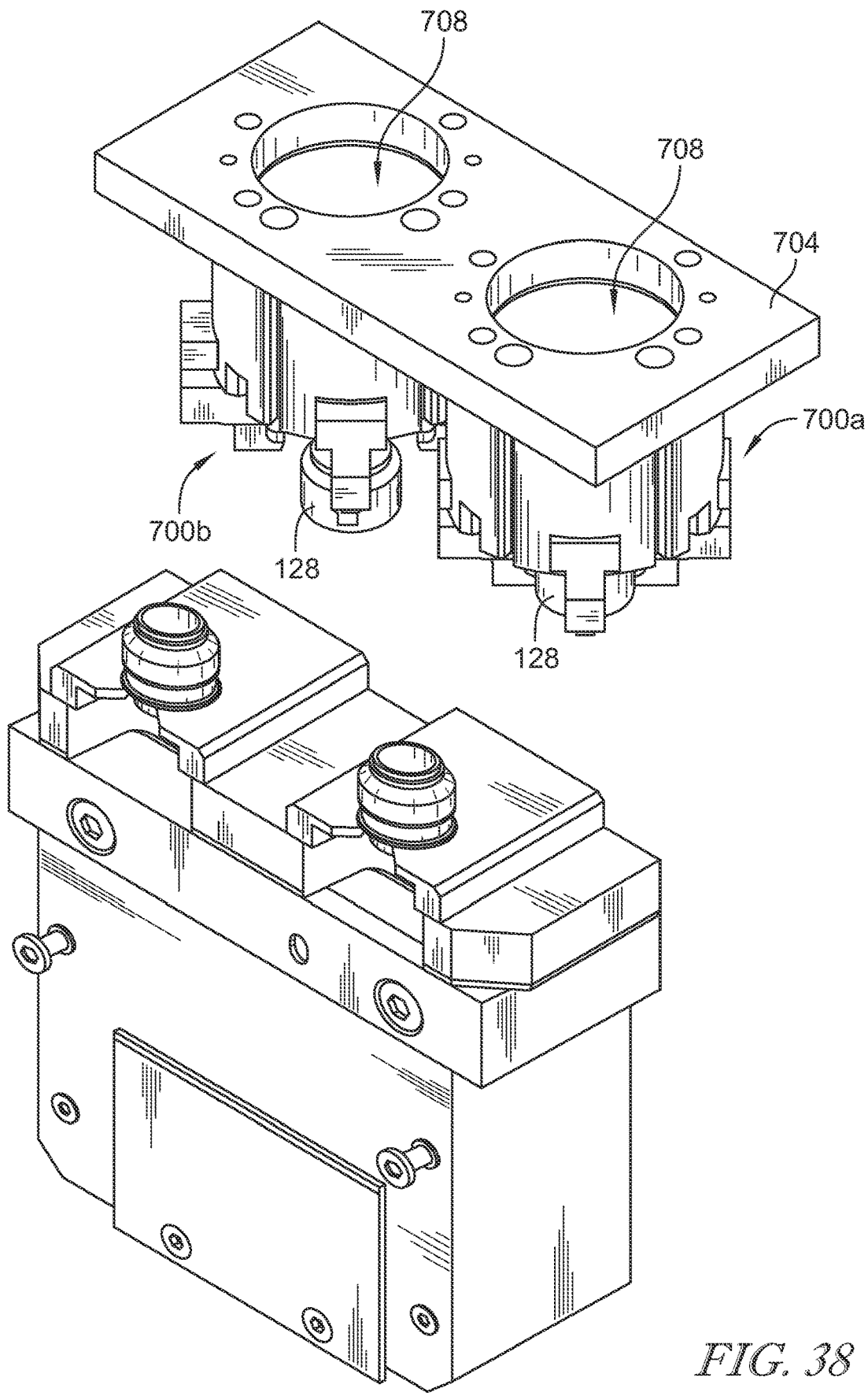

Referring to FIGS. 36-38, multiple views of another tool or tool assembly 700 is depicted. The tool 700 can be used as a separate station to the press tool. That is, the retainer sleeve 128 is pressed onto the connector body 124, and then, the fitting member can be moved (e.g., via pallets on a conveyor) to another station that includes the tool 700. The tool 700 includes a plurality of latch engagement portions 702 that are each configured to engage a respective latch 310 on the retainer sleeve 128. That is, the latch engagement portions 702 can be aligned with the latches 310 to press the latches 310 inward to provide an effective latch or engagement with the connector body 124. The latch engagement portions 702 of the tool 700 can be controlled to actuate simultaneously for pressing the latches 310 of the retainer sleeve 128.

Figure 39:
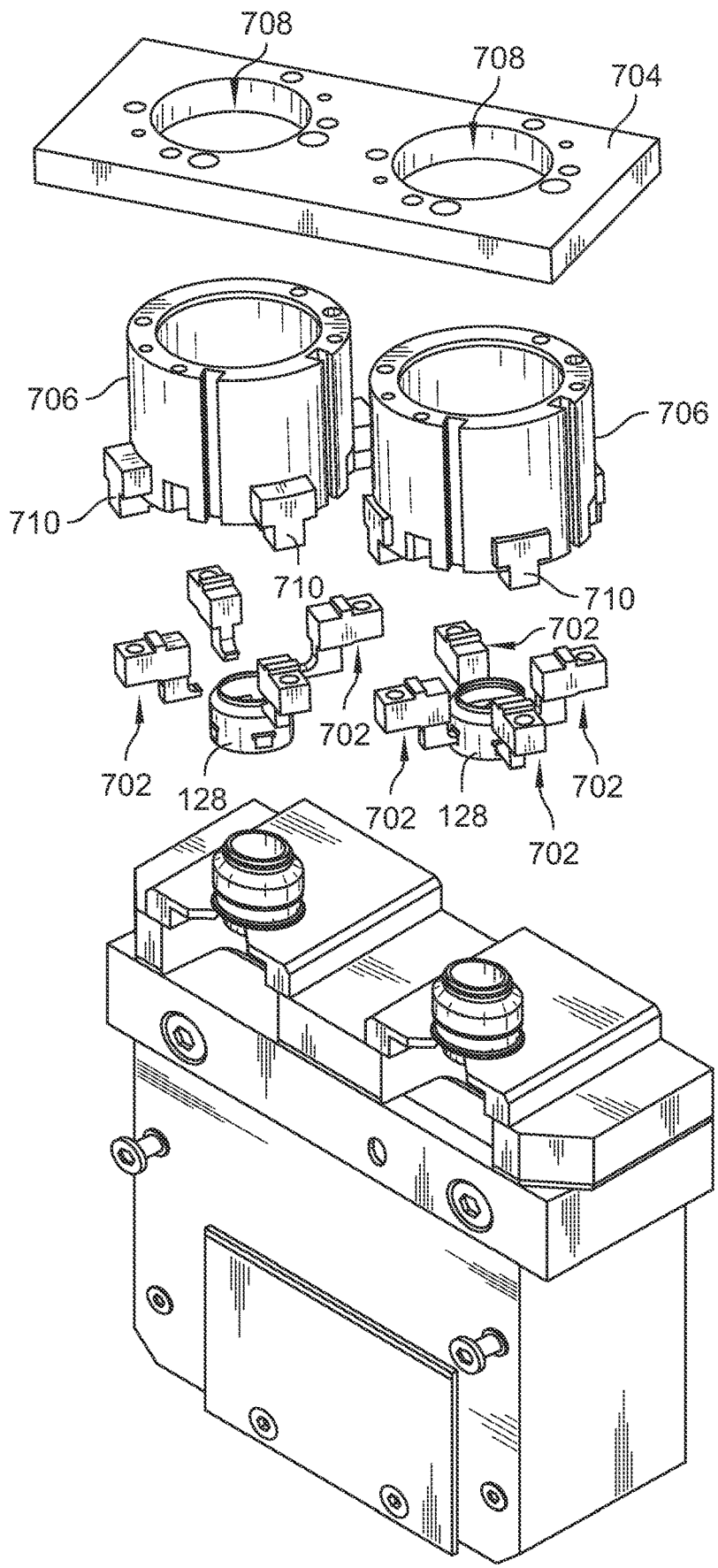
Figure 40:
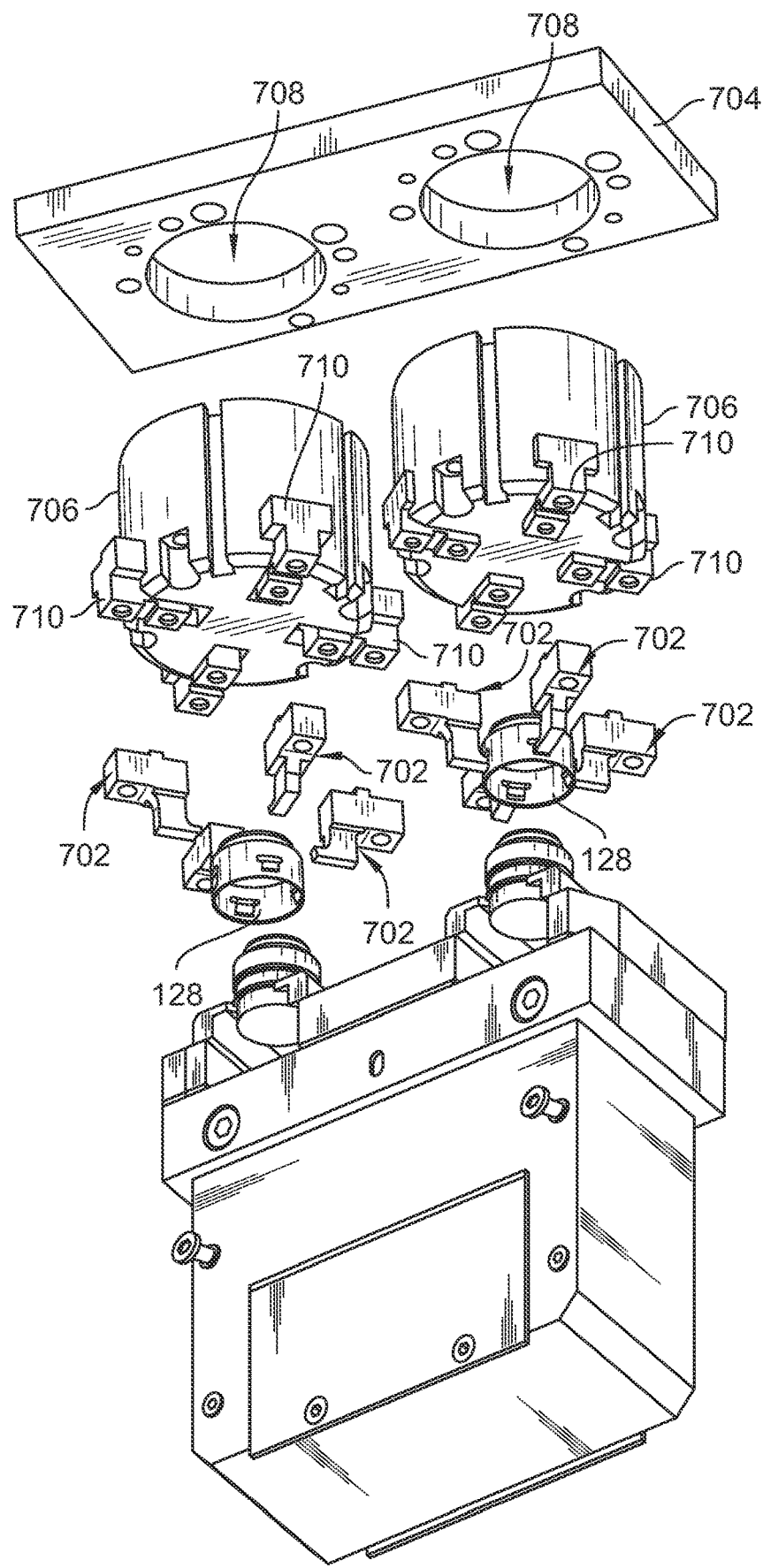
Figure 41:
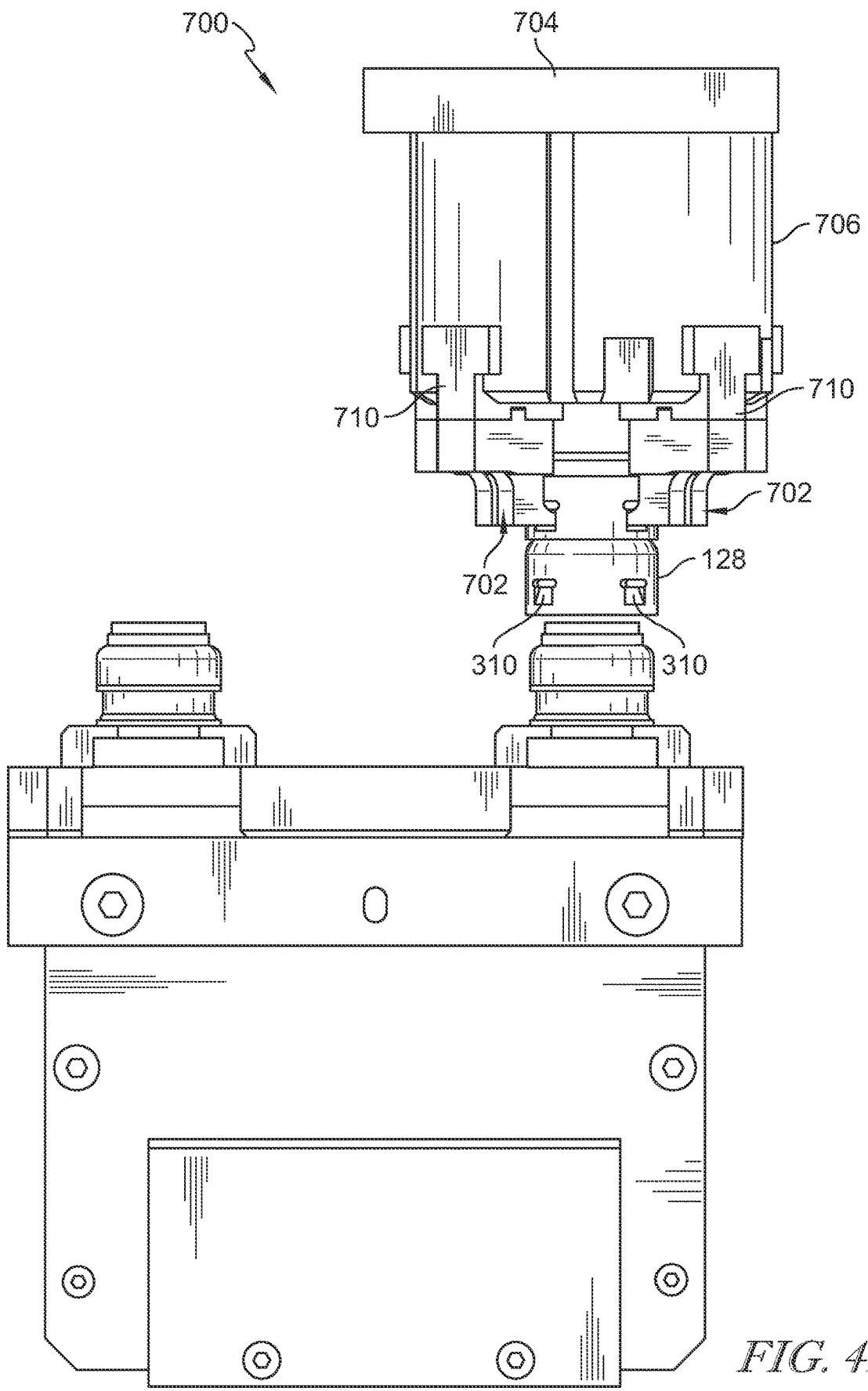
Figure 42:
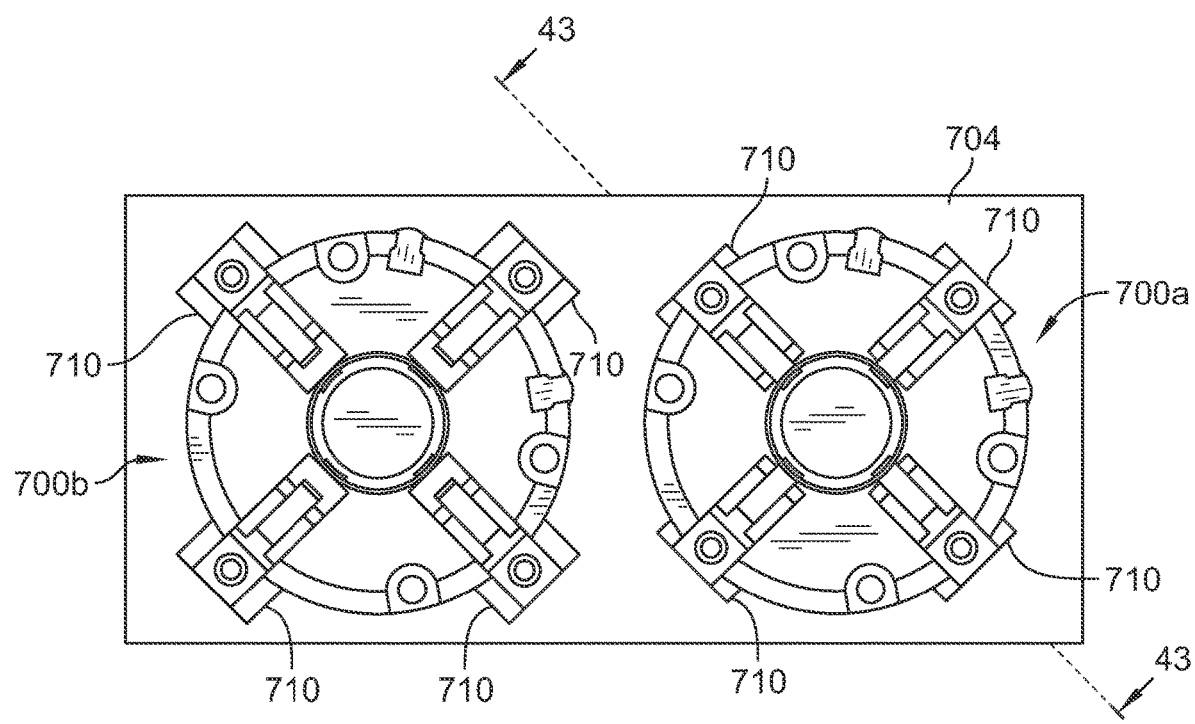
Figure 44:
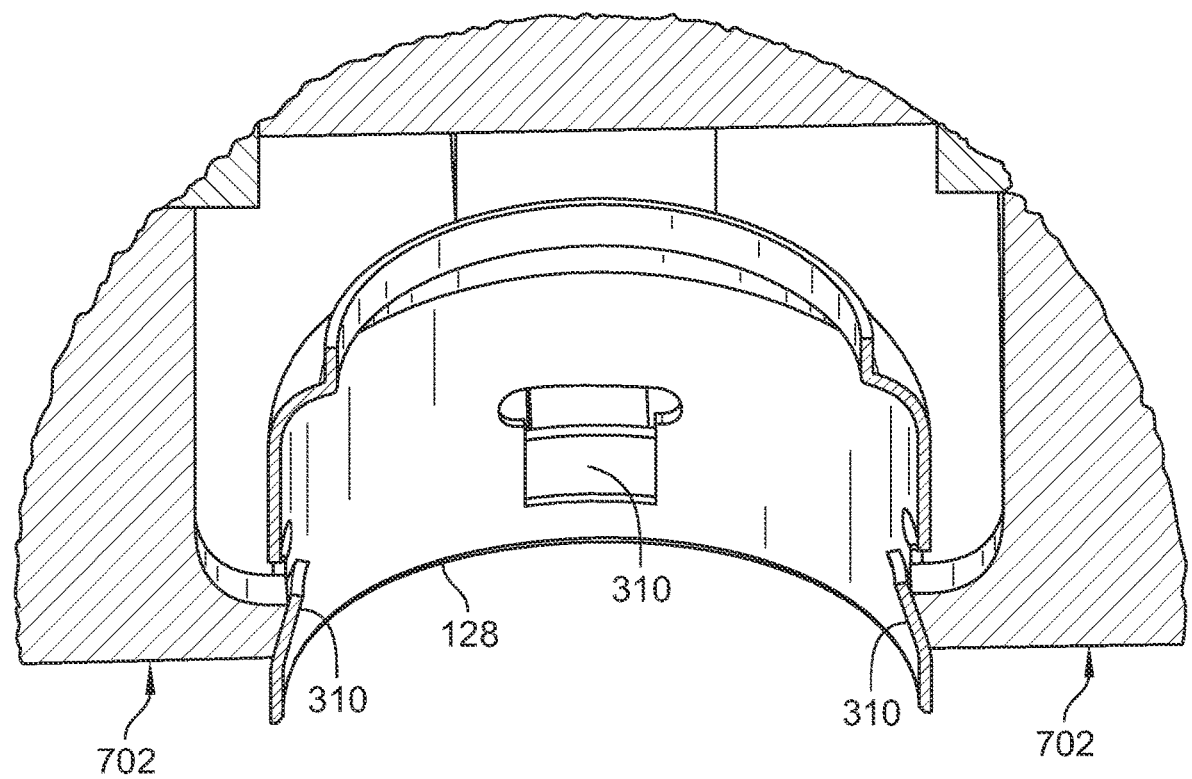

FIGS. 39-40 show exploded views of the tool 700. The tool 700 can include a mounting plate 704 that can be attached to a pressing device. The tool 700 includes tool housings 706 that can be mounted within openings 708 defined in the mounting plate 704. The mounting plate 704 is shown with two tools 700a, 700b mounted thereto, although alternatives are possible. The latch engagement portions 702 of the tool 700a is depicted in an actuated or engaged position relative to the release sleeve 128 such that the latch engagement portions 702 press or push the latches 310. The latch engagement portions 702 of the tool 700b is shown in a disengaged position relative to the release sleeve 128.

The tool housings 706 can include mounting block members 710 that are equally spaced thereabout. The mounting block members 710 define fastener openings 712 that can receive mechanical fasteners (not shown). The latch engagement portions 702 can be attached to the mounting block members 710 via the fastener openings 712.

FIGS. 41-44 show the latch engagement portions 702 of the bit 700a in the actuated or engaged position with the latches 310 of the retainer sleeve 128. The latch engagement portions 702 can be configured to push the latches 310 of the retainer sleeve 128 simultaneously. The latch engagement portions 702 can be controlled via cylinders of a pressing device.

Other additional process steps can be included and steps removed without departing from the scope of the present disclosure, e.g., the plurality of latches can be engaged, e.g., pressed in, by a mechanical mechanism to further improve engagement thereof.

In a further embodiment, it would be appreciated that, for example, the retainer sleeve 128, the protection ring 136, the grab ring 140, the cartridge 146, and the demount body 154 form a sub-assembly during production. This sub-assembly may then be compressed onto the connector body 124 with the sealing member 132 positioned therein. During production of the connector assembly 120, according to an embodiment of the present disclosure, the latch member 311 may require the above sub-assemblies to be compressed to allow the latch member 311 to engage with the catch surface 210. That is, one or more of the internal components of the subassemblies may be compressed to a point that allows the latch member 311 to engage with the catch surface 210. After the compression force is released, such as at 520, one or more internal components of the sub-assemblies applies a tension force on the retainer sleeve 128. This tension force locks each of the plurality of latches 310 against the catch surface 210, thereby substantially preventing rotation of the retainer sleeve 128 about the longitudinal axis 122. The engagement of the plurality of latches 310 with the catch surface 210 in this regard also assists in providing the forces necessary to sustain the integrity of the connector assembly 120 when a (high pressure) fluid passes therethrough.

Figure 45:
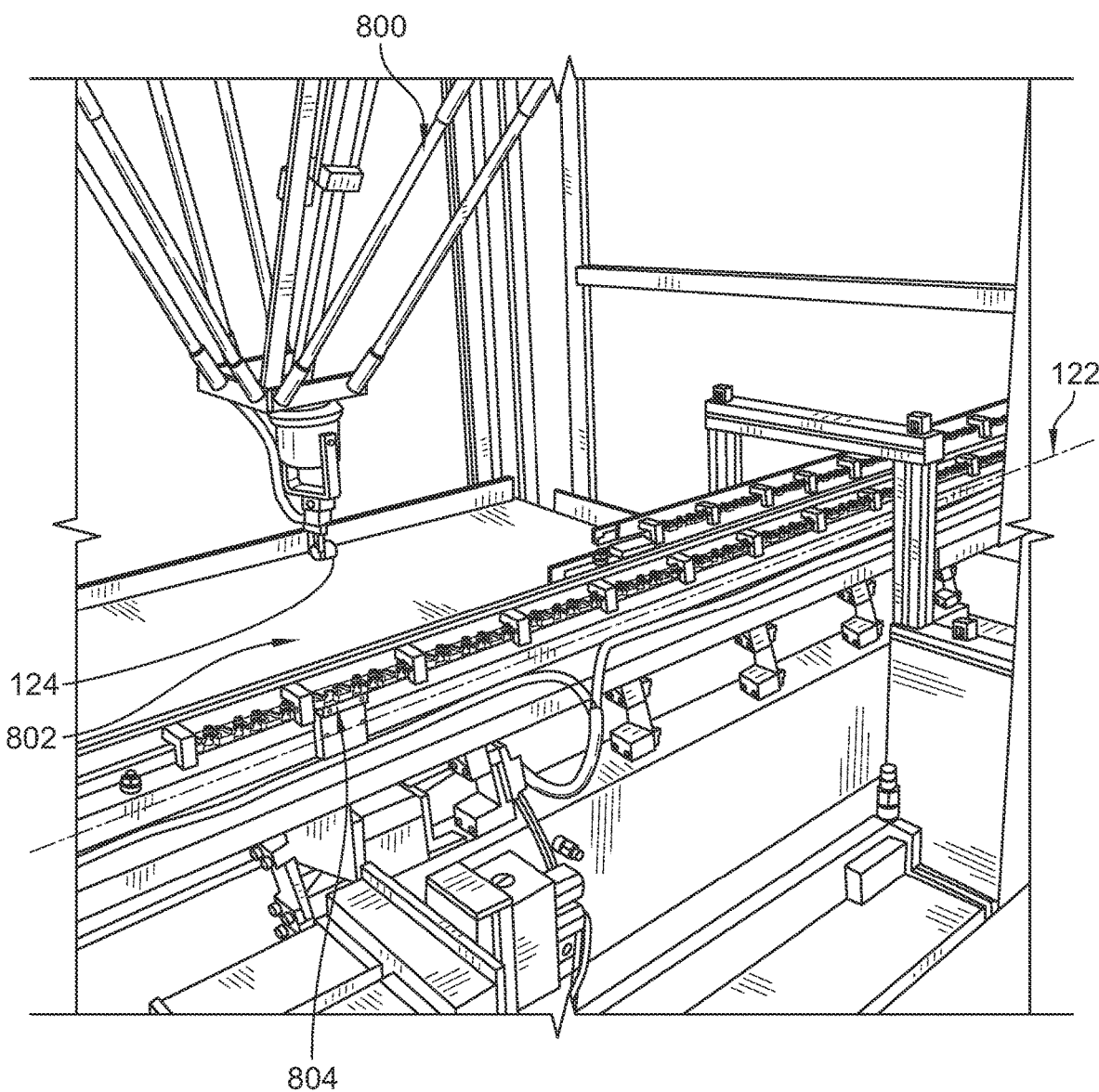
FIGS. 45-52A are multiple views and images showing various stations of the assembly steps of FIG. 27.
Figure 45A:
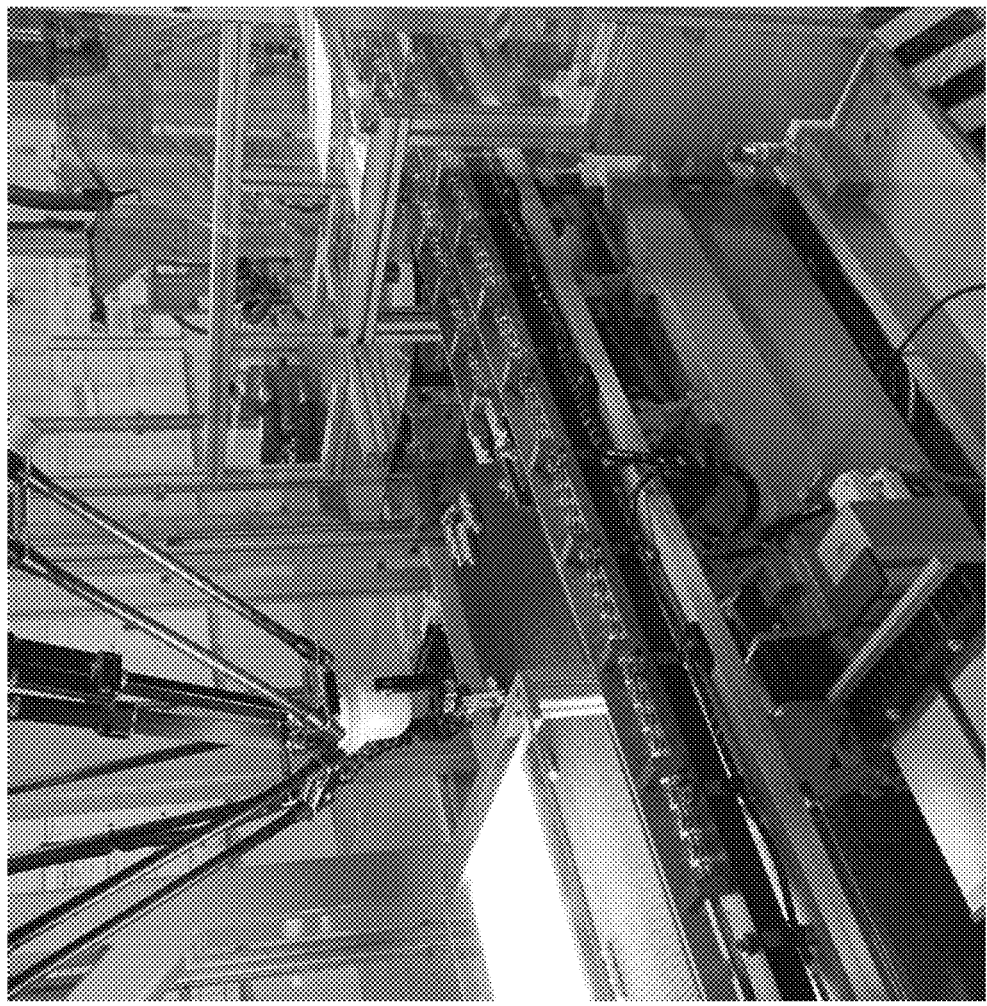

FIGS. 45-45A are schematic and image illustrations showing the step 502 described above. In the depicted example, at least one robotic arm 800 may be used to grab one of the connector bodies 124 on a conveyor belt 802 moving along the longitudinal axis 122. The connector body 124 is then placed into a carrier 804 for assembly. The carrier 804 may be configured to receive two connector bodies 124, although alternatives are possible. The carrier 804 moves along the longitudinal axis 122 adjacent the conveyor belt 802.

Figure 46:
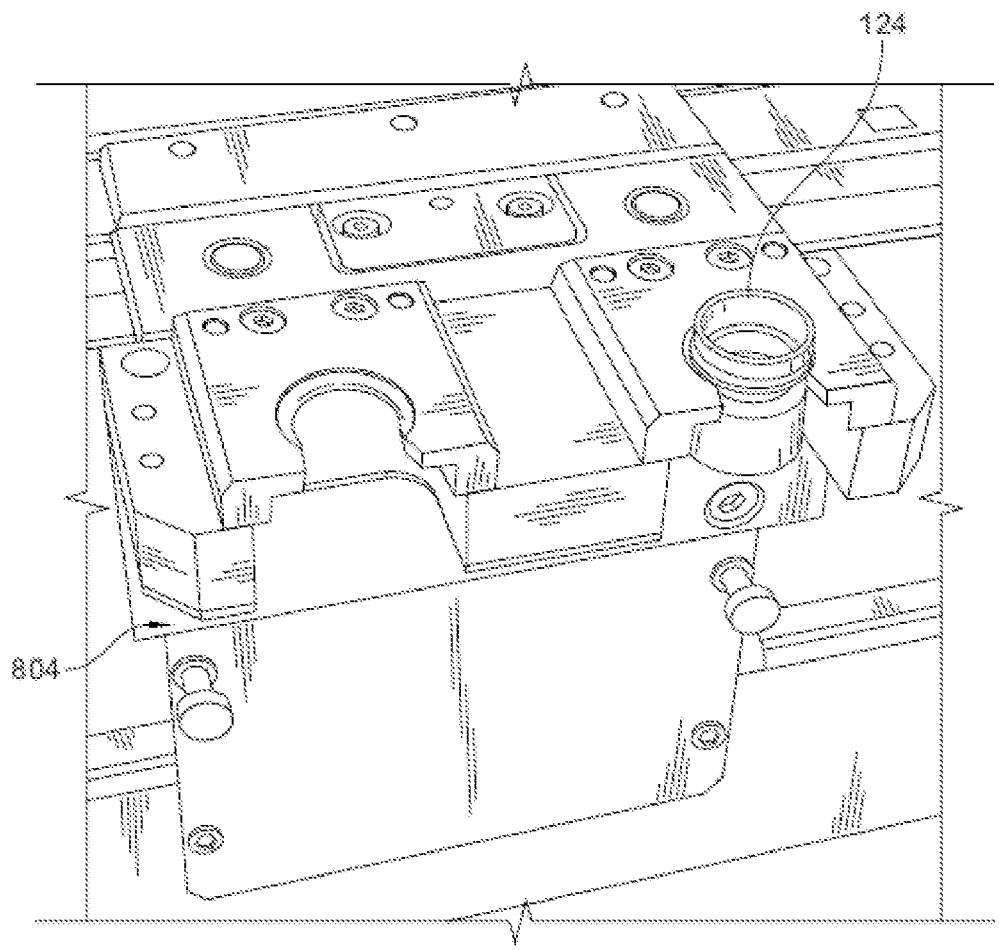
Figure 46A:
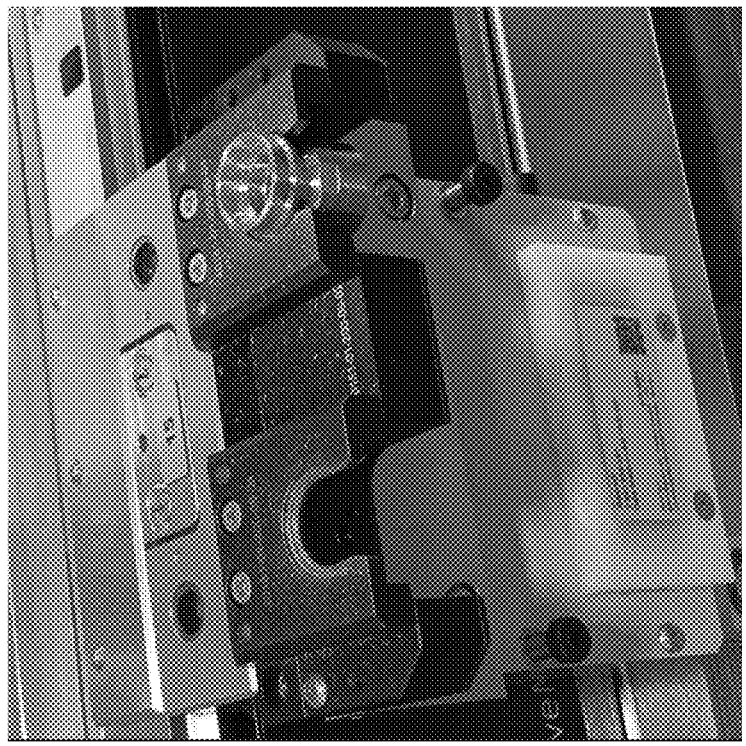

FIGS. 46-46A are schematic and image illustrations of the carrier 804 used to move the connector bodies 124 to multiple stations in the assembly process.

Figure 47:
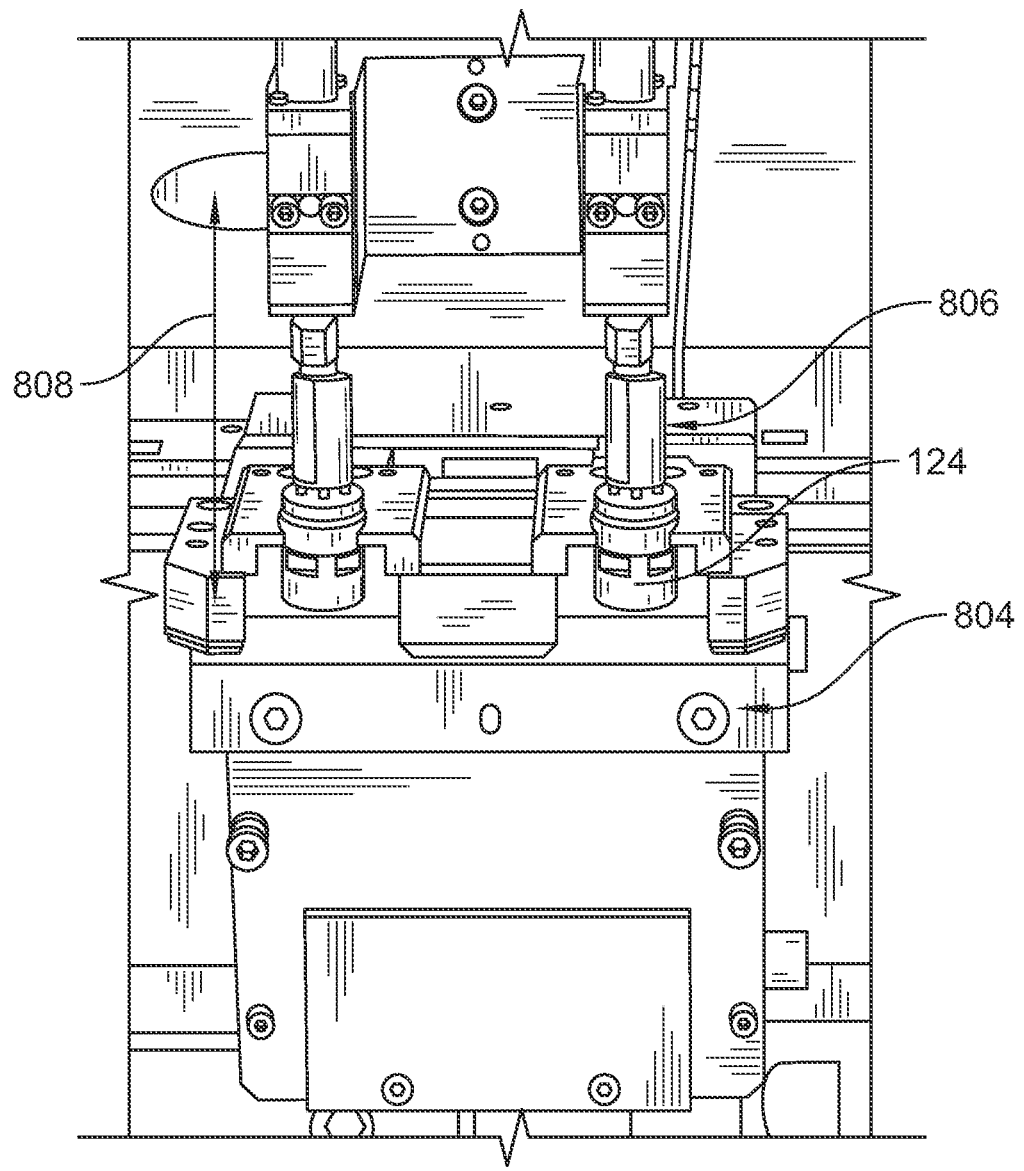
Figure 47A:
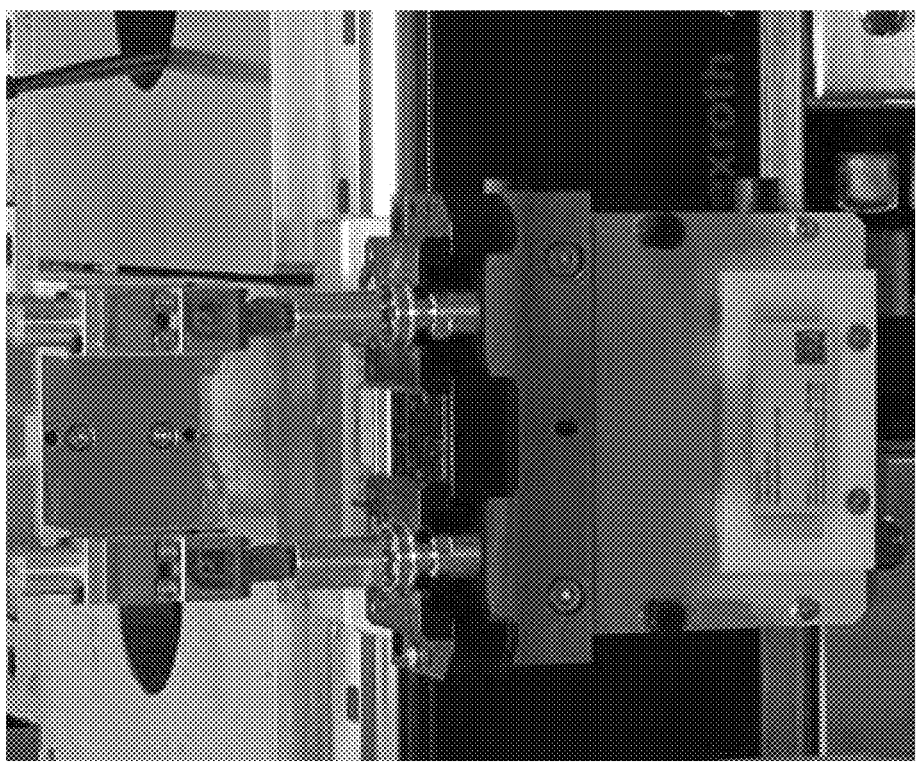

FIGS. 47-47A are schematic and image illustrations showing at least one cylinder 806 movable along a vertical axis 808. The cylinder 806 includes grease such that when lowered into a cavity of the connector body 124, applies the grease therein. The grease may be applied prior to the insertion of the sealing member 132 into the connector body 124 as shown in FIG. 48. In other examples, the grease may be applied after the sealing member 132 has been inserted into the connector 124. As such, there may be two grease stations in the assembly process, although alternatives are possible.

Figure 48A:
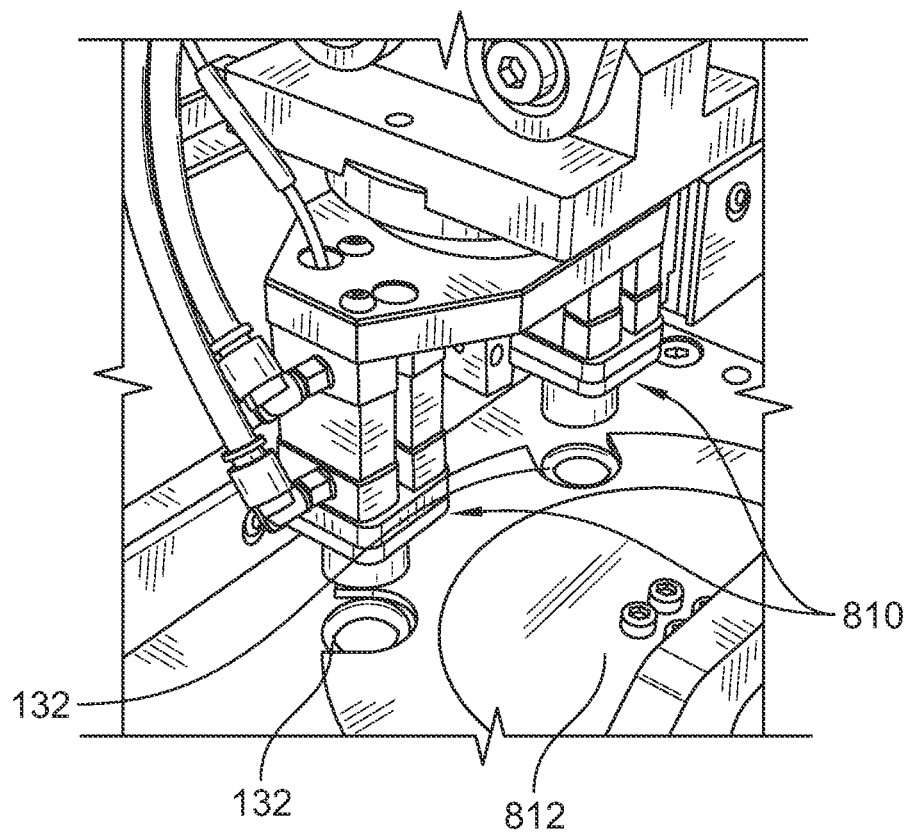
Figure 48B:
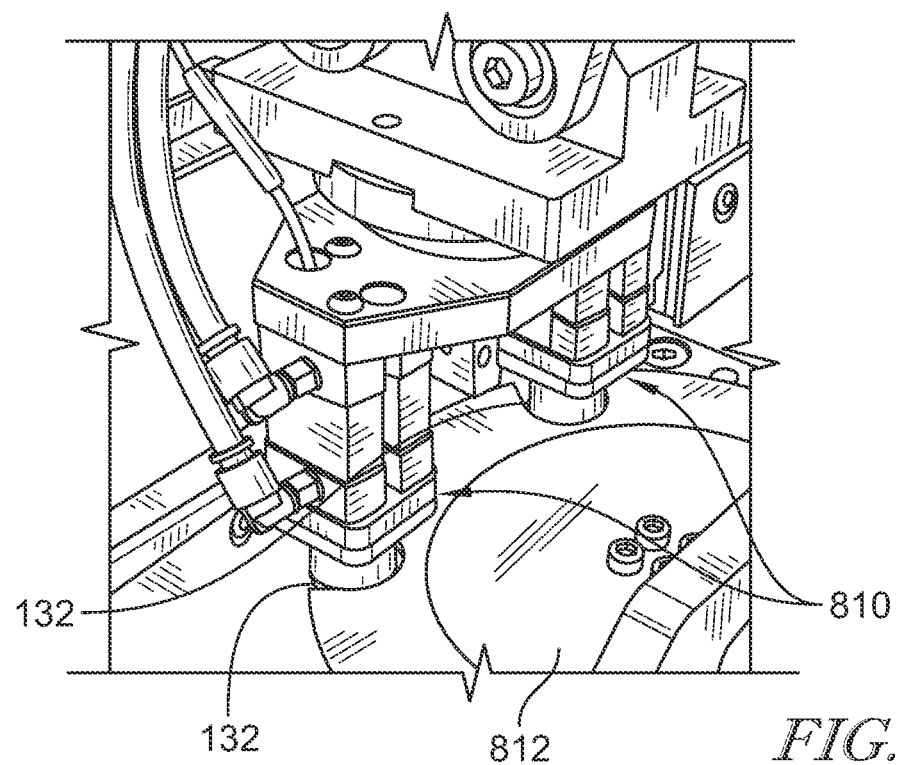
Figure 48D:
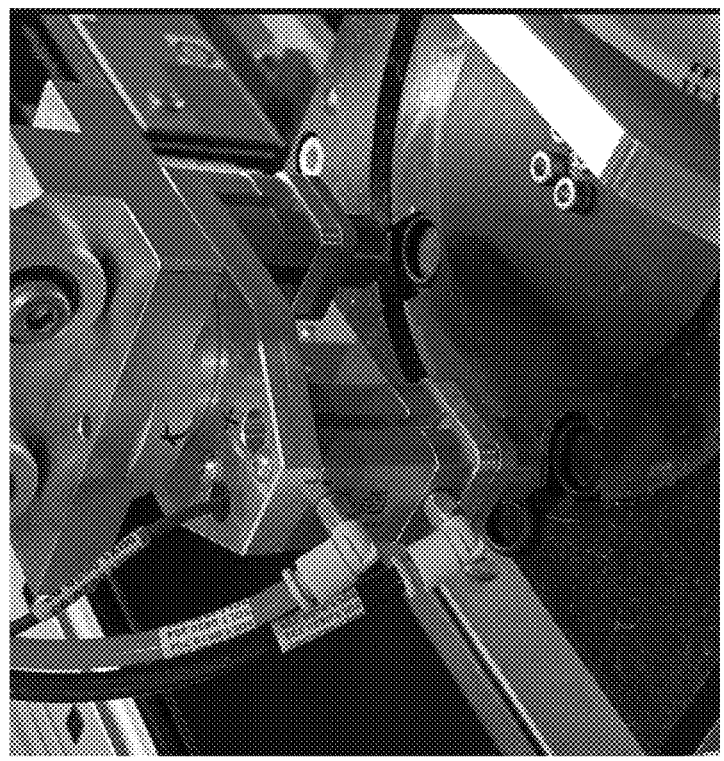

FIG. 48A is a schematic view showing at least one actuation member 810 in position to pick up the sealing member 132 off a drum 812. FIG. 48D is an image of the same. FIG. 48B is a schematic view of the actuation member

Figure 48C:
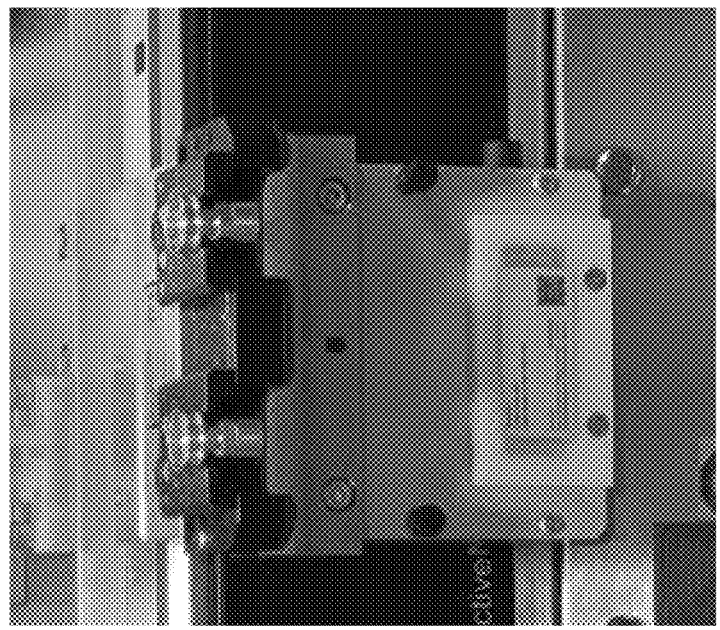

808 in position to place the sealing member 132 into the connector body 124 on the carrier 804. FIG. 48C is an image of the carrier with the connector body 124 prior to the sealing member 132 being placed.

Figure 49A:
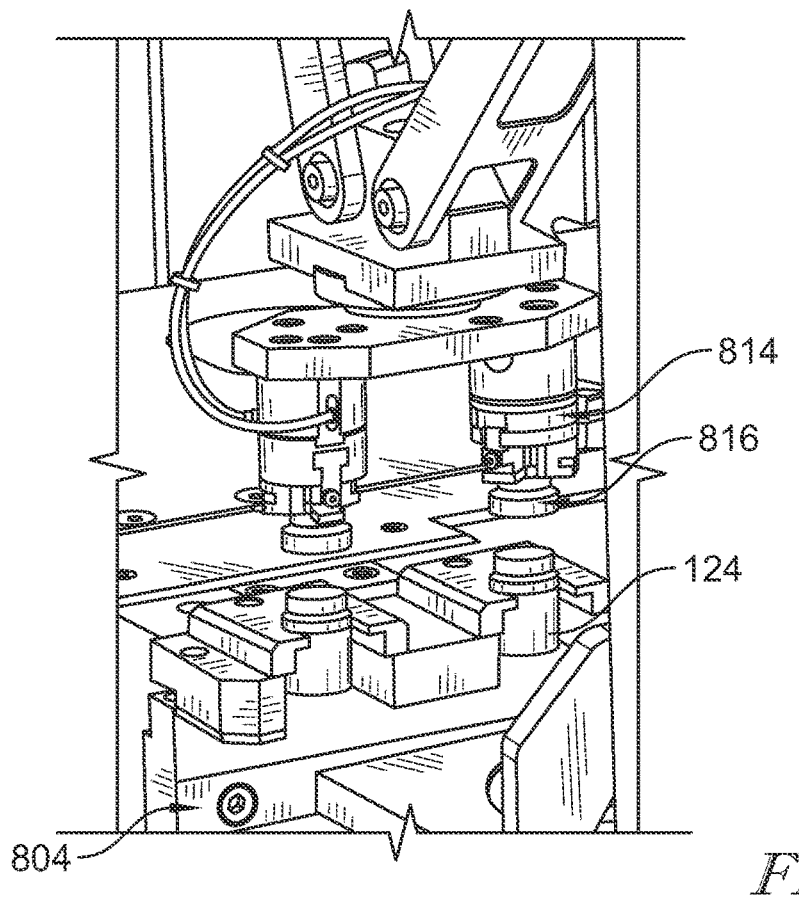
Figure 49B:
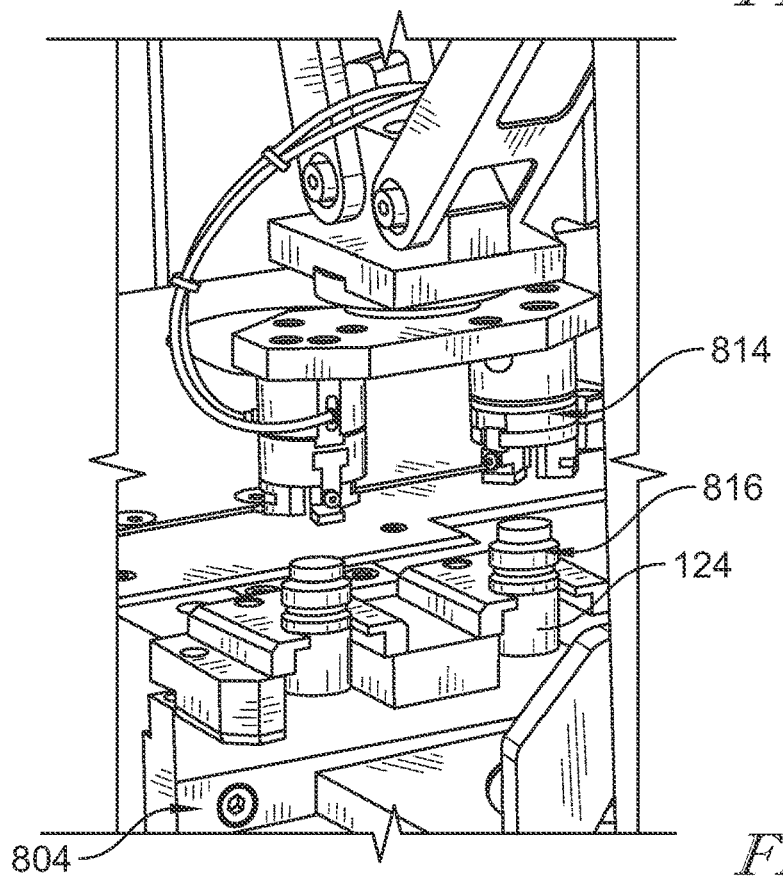
Figure 49D:
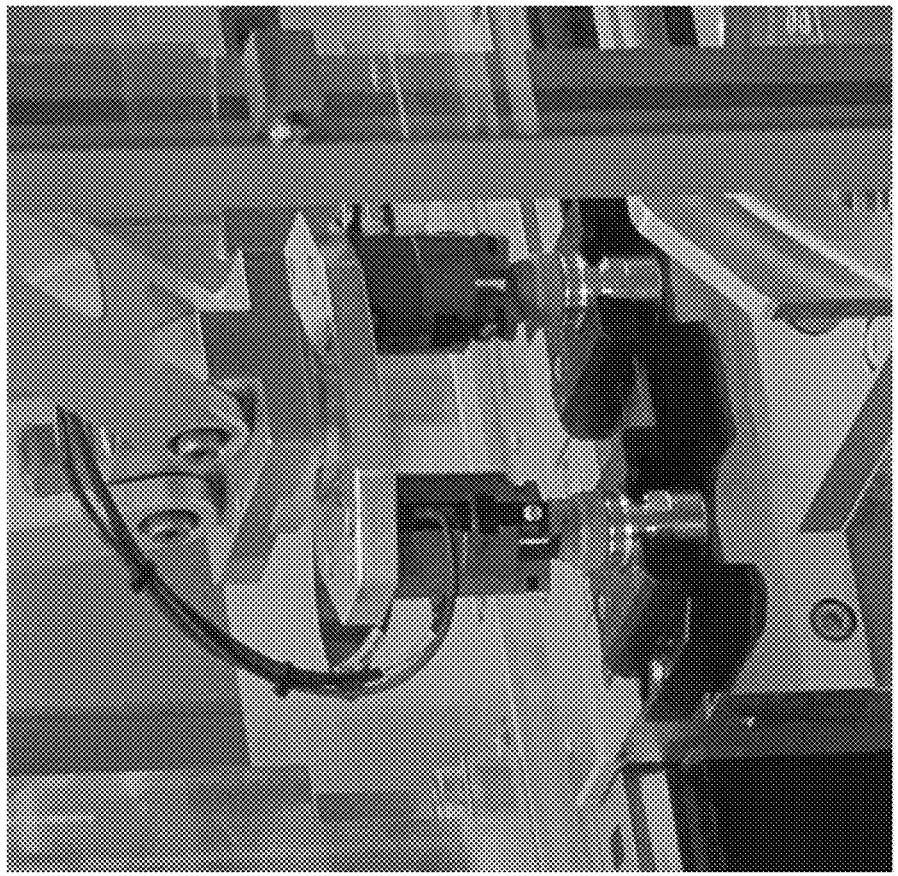
Figure 49C:
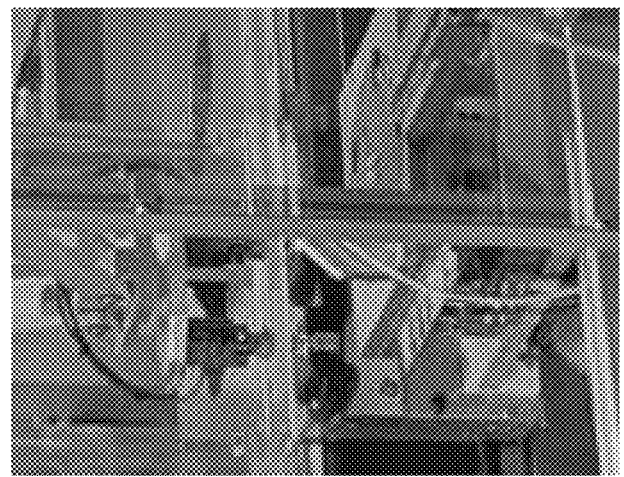

FIG. 49A is a schematic view of a mechanism 814 used to load a cartridge 816 into the connector body 124. The mechanism 814 is configured to carry the cartridge 816 and load the cartridge 816 into the connector body 124. FIG. 49C is an image of the mechanism 814 carrying the cartridge 816. FIG. 49B shows the cartridge 816 assembled onto the connector body 124. FIG. 49D is an image of the same.

Figure 50:
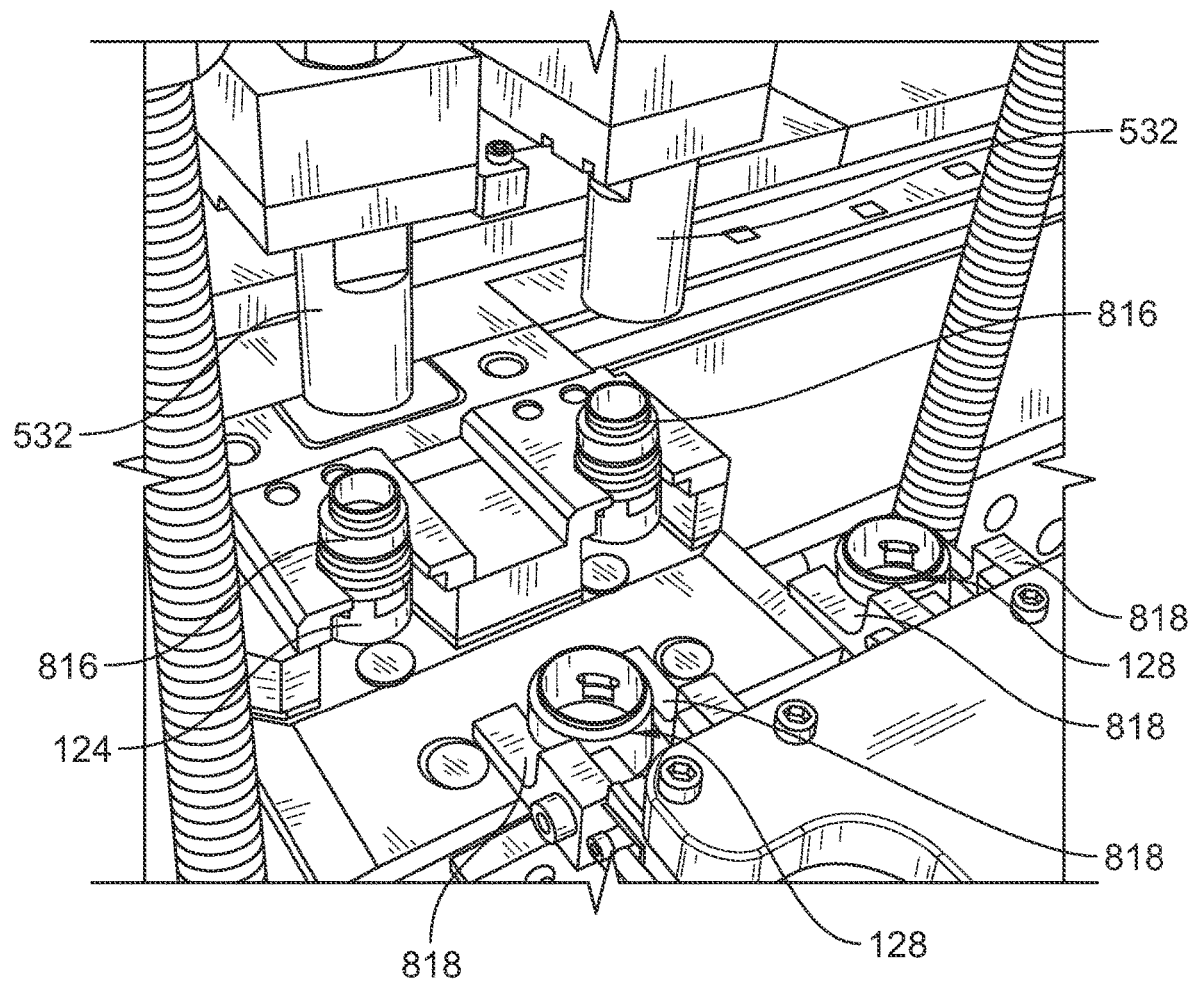
Figure 50A:
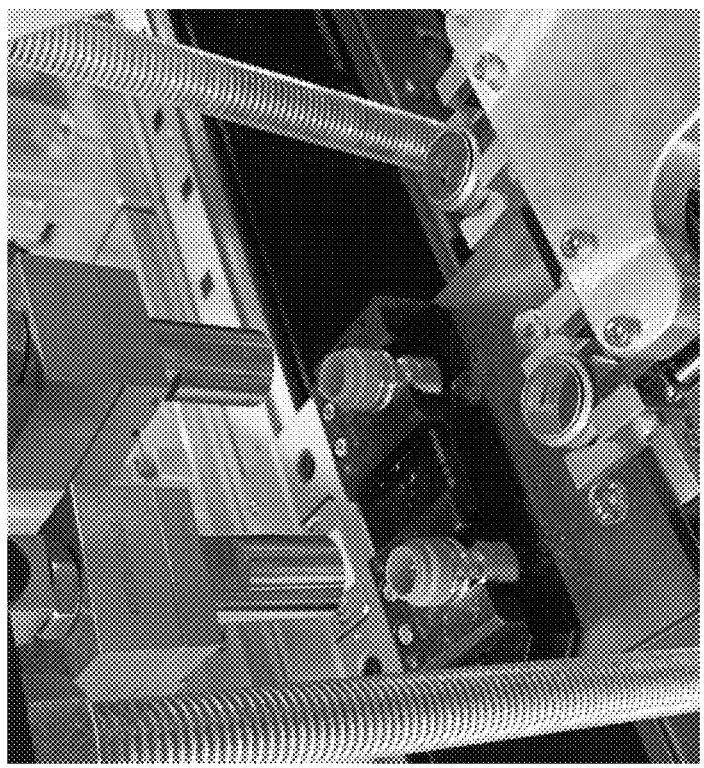

FIGS. 50-50A are schematic and image illustrations showing the retainer sleeve 128 picked up by arm assemblies 818. The arm assemblies 818 are configured to load the retainer sleeve 128 onto the cartridge 816 and other components of the connector body 124 as described above in method step 512.

The press 532 may be used to press the retainer sleeve 128 over the internal components and the connector body 124 as described above in method step 514. The retainer sleeve 128 may be pressed until the latches 310 are engaged in the catch surface 210 as described above in method step 518.

Figure 51:
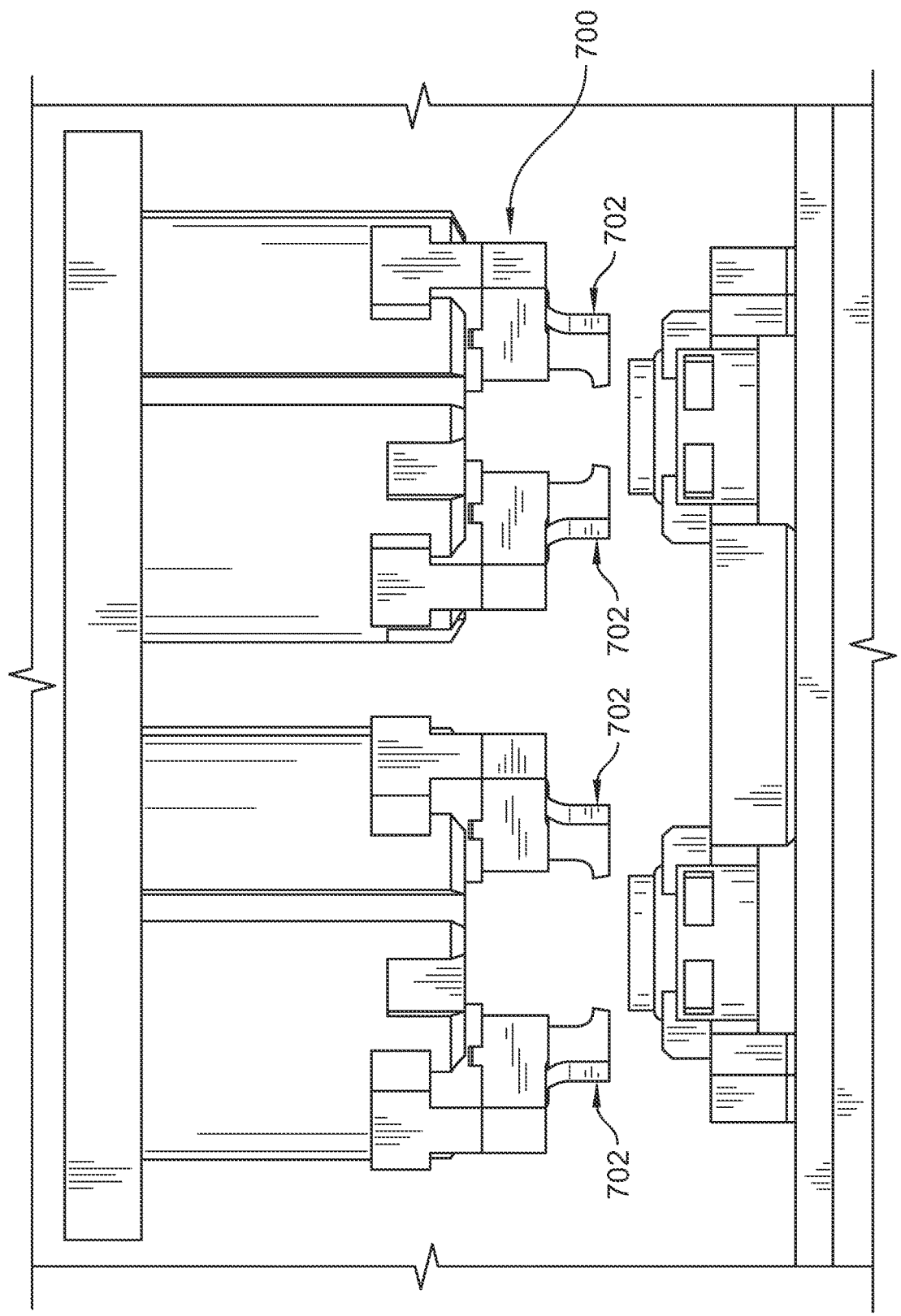
Figure 51A:

FIG. 51 is a schematic view showing the tool 700 including the plurality of latch engagement portions 702. FIG. 51A is an image of the same. The plurality of latch engagement portions 702 of the tool 700 are each configured to engage a respective latch 310 on the retainer sleeve 128 to press the latches 310 inward to provide an effective latch or engagement with the connector body 124.

Figure 52:
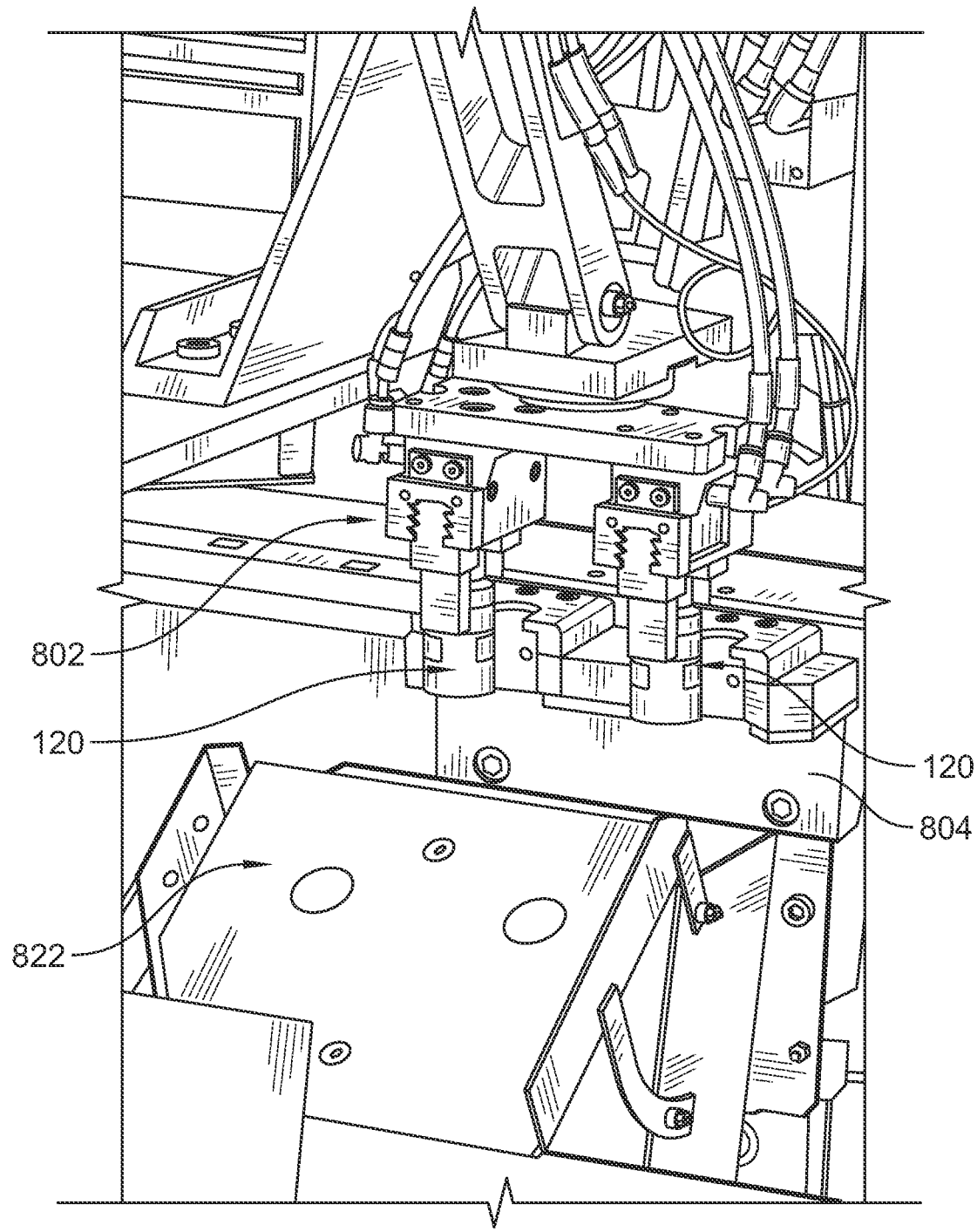
Figure 52A:
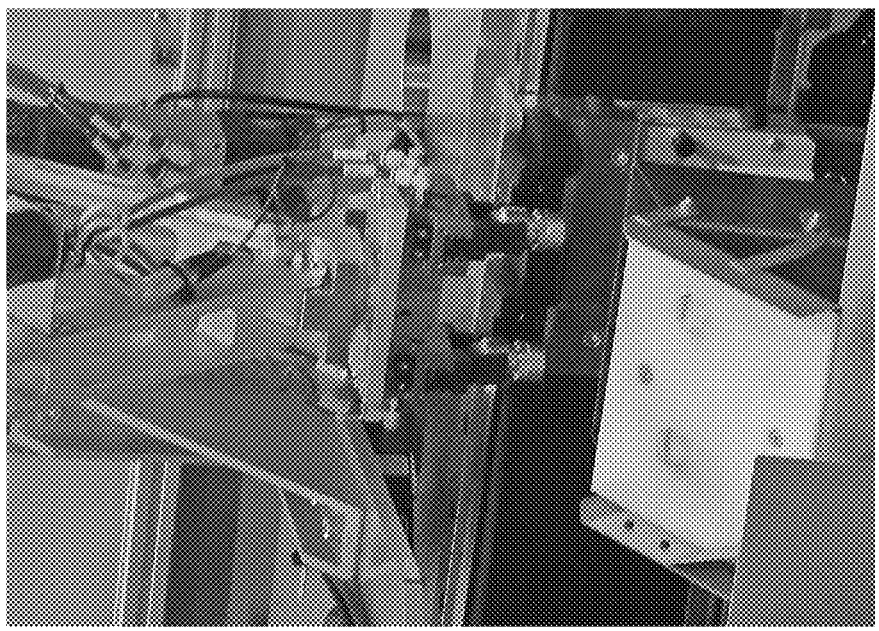

FIGS. 52-52A are schematic and image illustrations showing the completed connector assembly 120 having been removed from the carrier 804 by a grab arm 820. The grab arm 820 is configured to place the connector assembly 120 into a bin 822.

The above description is given by way of example, and not limitation. Given the above disclosure, one skilled in the art could undertake modifications that are within the scope and spirit of the present disclosure, including various ways of connecting the demount body 154 and the cartridge 146. For example, an axial slot may be formed along the length of the demount body 154. The slot may be sufficiently large such that the demount body 154 compresses enough to fit through the proximal end of the cartridge 146 and expand so the protection shoulder 404 engages the second internal shoulder 462 on the cartridge 146 to connect those parts. Similarly, while each of the plurality of latches 310 is integrally formed with the retainer sleeve 128, and the catch surface 210 is integrally formed with the connector body 124, the location of these parts may be reversed and other configurations of latches and catches may be used. Further, the various features of the present disclosure may be used alone, or in varying combinations with each other, and are not intended to be limited to the specific combination described herein. Thus, the present disclosure is not to be limited by the illustrated embodiments.

In this specification, adjectives such as left and right, top and bottom, first and second, and the like may be used to distinguish one element or action from another element or action without necessarily requiring or implying any actual such relationship or order. In addition or alternatively, references herein to the positions of elements (e.g., top, bottom, above, below) may merely be used to describe the orientation of various elements in the Figures. It should be noted that the orientation of various elements may differ according to various exemplary embodiments, and that such variations are intended to be encompassed by the present disclosure. Where context permits, reference to a component, an integer, or a step (or the alike) is not to be construed as being limited to only one of that component, integer, or step, but rather could be one or more of that component, integer, or step.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

Although the figures and description may illustrate a specific order of method steps, the order of such steps may differ from what is depicted and described, unless specified differently above. Also, two or more steps may be performed concurrently or with partial concurrence, unless specified differently above.

In at least one aspect, a push-to-connect fitting includes a connector body having a fluid passage that extends at least partially therethrough; a sealing member configured to form a sealing engagement with a fluid conduit; a grab ring comprising a plurality of teeth configured for coupling to the fluid conduit, a cartridge positioned adjacent to at least part of the grab ring and having a hollow portion therethrough, the grab ring being interposed between the cartridge and the sealing member; a retainer sleeve received over at least part of the cartridge and at least part of the connector body; a plurality of latches located on the retainer sleeve, the plurality of latches configured to secure the retainer sleeve to the connector body to facilitate retention of the sealing member, the grab ring, and the cartridge, and an interference portion interposed between the connector body and the retainer sleeve, the interference portion configured to engage the retainer sleeve to substantially prevent rotation of the retainer sleeve relative to the connector body.

In at least one aspect, the push-to-connect fitting further comprises a demount body movable within the hollow portion of the cartridge and configured to engage the plurality of teeth of the grab ring to facilitate decoupling of the plurality of teeth from the fluid conduit.

In at least one aspect, the push-to-connect fitting further comprises a protection ring positioned within the connector body and positioned between the sealing member and the grab ring, the protection ring comprising an inclined surface tapering to a smaller diameter as the inclined surface extends away from the grab ring.

In at least one aspect, the retainer sleeve includes an inner sleeve surface having a first diameter; and the interference portion includes one or more protrusions with a second diameter that is greater than the first diameter such that an interference fit exists between the interference portion and the retainer sleeve.

In at least one aspect, the retainer sleeve comprises a compliant material such that an end portion of the retainer sleeve engaged by the interference portion expands to a third diameter when the end portion engages the interference portion, the third diameter being greater than the second diameter.

In at least one aspect, in the push-to-connect fitting, the interference portion is formed as an annular member having a diameter larger than a diameter of the connector body, the interference portion is integrally formed with the connector body, and the interference portion extends radially from the connector body in a direction away from the fluid passage.

In at least one aspect, the push-to-connect fitting further comprises: a catch surface located on the connector body, wherein the plurality of latches are configured to engage the catch surface to facilitate coupling of the retainer sleeve to the connector body.

In at least one aspect, each of the plurality of latches is configured to rotate about a sidewall connected thereto and engage with the catch surface when the retainer sleeve engages the interference portion.

In at least one aspect, the plurality of latches are configured to move in a direction away from or toward the catch surface in order to engage the catch surface.

In at least one aspect, the plurality of latches include one or more protruding portions that extend transversely from a sidewall connected thereto.

In at least one aspect, engagement of the plurality of latches with the catch surface inhibits rotation of the retainer sleeve relative to the connector body.

In at least one aspect, each of the plurality of latches includes a released position and a locked position, and when the retainer sleeve is engaged by the interference portion, the each of the plurality of latches are in the locked position.

In at least one aspect, the interference portion further comprises a shoulder surface having a frustoconical profile configured to engage an end portion of the retainer sleeve as the retainer sleeve is received over the interference portion.

In at least one aspect, the shoulder surface facilitates alignment of the retainer sleeve.

In at least one aspect, the retainer sleeve comprises a first retainer sleeve; and the connector body further comprises: a first connector end coupled to the first retainer sleeve; a second connector end coupled to a second retainer sleeve; and the first connector end and the second connector end are in fluid communication with one another via the fluid passage.

In at least one aspect, a plumbing fitting comprises a first connector assembly comprising: a first connector body centered along a first axis and configured to receive a first fluid conduit end; a first retainer sleeve coupled to the first connector body and configured to receive the first fluid conduit end; and a first interference portion interposed between the first connector body and the first retainer sleeve, the first interference portion configured to prevent rotation of the first retainer sleeve about the first axis relative to the first connector body; a second connector assembly comprising: a second connector body centered along a second axis and configured to receive a second fluid conduit end, the second connector body in fluid communication with the first connector body; a second retainer sleeve coupled to the second connector body and configured to receive the second fluid conduit end; and a second interference portion interposed between the second connector body and the second retainer sleeve, the second interference portion configured to prevent rotation of the second retainer sleeve about the second axis relative to the second connector body; and a fluid passage extending between the first connector assembly and the second connector assembly.

In at least one aspect, in the plumbing fitting, the first retainer sleeve includes a first inner sleeve surface having a first diameter; and the first interference portion has a second diameter greater than the first diameter such that an interference fit exists between the first interference portion and the first retainer sleeve.

In at least one aspect, in the plumbing fitting, the first interference portion is integrally formed with the first connector body, the first interference portion extending radially from the first connector body in a direction away from the first axis.

In at least one aspect, in the plumbing fitting, the first retainer sleeve further comprises a compliant material such that an end portion of the first retainer sleeve engaged by the first interference portion expands to a third diameter when the end portion engages the first interference portion, the third diameter being greater than the second diameter.

In at least one aspect, the plumbing fitting further comprises a catch surface located on the first connector body; and a plurality of latches located on the first retainer sleeve and configured to engage the catch surface to facilitate coupling of the first retainer sleeve to the first connector body.

In at least one aspect, in the plumbing fitting, each of the plurality of latches is configured to rotate about a sidewall connected thereto and engage with the catch surface when the first interference portion engages the retainer sleeve.

In at least one aspect, in the plumbing fitting, each of the plurality of latches includes a released position and a locked position, and when the first retainer sleeve is engaged by the first interference portion, the each of the plurality of latches are in the locked position.

In at least one aspect, a connector assembly comprises a connector body having a fluid passage that extends at least partially therethrough, the connector body comprising: a first end and a second end opposite the first end; a first connector flange extending radially from the connector body between the first end and the second end and having a first diameter; and a second connector flange extending radially from the connector body between the first connector flange and the second end, the second connector flange having a second diameter greater than the first diameter; and a retainer sleeve configured for coupling to the connector body and configured for extending around the fluid passage, the retainer sleeve comprising: a first sleeve end and a second sleeve end opposite to the first sleeve end; an inner sleeve surface having a third diameter, the third diameter being less than the second diameter; and a plurality of latches positioned circumferentially about the inner sleeve surface and extending radially inward relative to the inner sleeve surface; wherein the retainer sleeve is configured such that when the retainer sleeve is coupled to the connector body and the second connector flange engages a portion of the inner sleeve surface proximate to the first sleeve end: the portion of the inner sleeve surface proximate to the first sleeve end expands to a fourth diameter greater than the second diameter responsive to deformation of the retainer sleeve, and the plurality of latches rotate inward toward the connector body when the first sleeve end expends to the fourth diameter.

In at least one aspect, in the connector assembly, the connector body further comprises a catch surface positioned on the first connector flange and extending circumferentially about the fluid passage; and the plurality of latches are configured to engage the catch surface when the retainer sleeve is coupled to the connector body.

In at least one aspect, in the connector assembly, the connector body further comprises a shoulder surface positioned between the first connector flange and the second connector flange, the shoulder surface tapering outward toward the second connector flange to facilitate centering of the retainer sleeve around the connector body.

In at least one aspect, in the connector assembly, the third diameter is less than the second diameter by between about 0.01 and about 0.15 millimeters, inclusive, such that an interference fit is formed between the retainer sleeve and the connector body.

In at least one aspect, in the connector assembly, the third diameter is less than the second diameter by between about 0.2 and about 0.5 millimeters, inclusive, such that an interference fit is formed between the retainer sleeve and the connector body.

In at least one aspect, in the connector assembly, the retainer sleeve is a first retainer sleeve; and the connector body further comprises a first connector end coupled to the first retainer sleeve; a second connector end coupled to a second retainer sleeve, the second retainer sleeve being substantially similar to the first retainer sleeve; and the first connector end and the second connector end are in fluid communication with one another via the fluid passage.

In at least one aspect, a method of manufacturing a connector assembly is provided, the method comprising: obtaining a connector body positioned along an axis; obtaining a retainer sleeve configured for receiving over at least part of the connector body and extending around the axis, the retainer sleeve comprising: a first sleeve end and a second sleeve end opposite to the first sleeve end; and an inner sleeve surface having an inner sleeve diameter; positioning an interference portion circumferentially about the connector body, the interference portion being an annular body having a retaining diameter greater than the inner sleeve diameter; positioning a plurality of internal components; and pressing the retainer sleeve around the connector body and the interference portion such that the interference portion is interposed between the retainer sleeve and the connector body and such that the interference portion engages a portion of the inner sleeve surface proximate to the second sleeve end and causes the portion of the inner sleeve surface proximate to the second sleeve end to expand in diameter to a coupling diameter greater than the inner sleeve diameter in response to deformation of the retainer sleeve.

In at least one aspect, pressing the retainer sleeve around the connector body and the interference portion forms an interference fit between the retainer sleeve and the interference portion such that rotation of the retainer sleeve relative to the connector body about the axis is prevented.

In at least one aspect, the connector body further comprises a catch surface; the retainer sleeve further comprises a plurality of latches configured to engage the catch surface when the retainer sleeve is coupled to the connector body, and the method further comprises pressing the retainer sleeve around the connector body and the interference portion such that the plurality of latches engage the catch surface.

In at least one aspect, the connector body further comprises a shoulder surface defining a frustoconical profile that tapers outward toward the interference portion, and the method further comprises pressing the retainer sleeve around the connector body and the interference portion such that the inner sleeve surface engages the shoulder surface, the shoulder surface (i) causing expansion of the second sleeve end to the coupling diameter and (ii) facilitating centering of the retainer sleeve about the connector body and the interference portion.

In at least one aspect, a pressing tool comprises an adapter sleeve, a connector body, and a collet sleeve connected to one another by a connecting member, the tool being acted upon by an actuating fixture; wherein the connector body has a socket section for engaging a retainer sleeve upon actuation, the retainer sleeve including a plurality of latches; and wherein the retainer sleeve is pressed onto the connector body while simultaneously pressing the plurality of latches in the retainer sleeve to provide an effective latch or engagement with the connector body.

In at least one aspect, a tool acted upon by an actuating fixture, the tool being configured to join components of a connector assembly, the connector assembly including a connector body and a retainer sleeve, the retainer sleeve having a plurality of latches, the tool comprises a tool housing; and a plurality of latch engagement portions equally spaced about the tool housing, each of the plurality of latch engagement portions being aligned with a respective one of the plurality of latches of the retainer sleeve, each of the plurality of latch engagement portions being configured to engage the respective one of the plurality of latches of the retainer sleeve for pressing the plurality of latches inward to provide an effective latch or engagement with the connector body.

In at least one aspect, a method of manufacturing a connector assembly, the method comprises obtaining a connector body positioned along an axis; obtaining a retainer sleeve configured for mounting over a portion of the connector body, the retainer sleeve including a plurality of latches; pressing the retainer sleeve over the connector body; and pressing the plurality of latches of the retainer sleeve inwardly to provide an effective latch or engagement with the connector body.

What is claimed is:

1. A system for manufacturing a connector assembly, the system comprising:
   a connector body having a catch surface extending circumferentially at an end and around the connector body, a sealing member, a protecting ring, a grab ring, a demount body, a cartridge, and a retainer sleeve, wherein the retainer sleeve includes a plurality of latches extending inwardly and configured to engage the catch surface to connect the retainer sleeve to the connector body upon actuation and secure the sealing member, the protecting ring, the grab ring, the mount body and the cartridge in between the retainer sleeve and the connector body to form the connector assembly; and a tool member including an adapter sleeve, an adjustment sleeve, a collet sleeve, a tool body, and a plurality of latch engagement members equally spaced about the tool body, wherein an actuating fixture is configured to act upon the tool member such that the tool member travels a distance relative to the connector body to push the retainer sleeve held in a socket of the tool body over a portion of the connector body, wherein each of the plurality of latch engagement members is configured to align with a respective one of the plurality of latches of the retainer sleeve to press the respective one of the plurality of latches of the retainer sleeve inwardly to provide an effective latch or engagement with the catch surface of the connector body, wherein the tool member is configured to push the retainer sleeve over the connector body and press the plurality of the latches simultaneously and all in a single action.

2. The system of claim 1, wherein the connector body includes an interference portion and a shoulder surface defining a frustoconical profile that tapers outward toward the interference portion.

3. The system of claim 1, wherein the plurality of latch engagement portions are bearing balls.

4. The system of claim 3, wherein the bearing balls are calibrated using the adjustment sleeve that calibrates the amount of force applied to the plurality of latches.

5. A method of manufacturing a connector assembly, the method comprising:
   providing a connector body positioned along an axis, wherein the connector body includes a catch surface extending circumferentially at an end and around the connector body;
   providing a plurality of internal components including a sealing member, a protecting ring, a grab ring, a demount body, and a cartridge;
   providing a retainer sleeve, wherein the retainer sleeve includes a plurality of latches extending inwardly and configured to engage the catch surface to connect the retainer sleeve to the connector body upon actuation;
   providing a tool member including an adapter sleeve, an adjustment sleeve, a collet sleeve, a tool body, and a plurality of latch engagement members equally spaced about the body, wherein an actuating fixture is configured to act upon the tool member such that the tool member travels a distance relative to the connector body to push the retainer sleeve over a portion of the connector body,
   positioning the connector body on a fixture;
   positioning the retainer sleeve within a socket of the tool body;
   interposing the plurality of internal components including the sealing member, the protecting ring, the grab ring, the demount body, and the cartridge between the retainer sleeve and the connector body;
   pushing and positioning the retainer sleeve over the plurality of interposed internal components and over the connector body using a press;
   aligning each of the plurality of latch engagement members of the tool member with a respective one of the plurality of latches of the retainer sleeve; and
   pressing the plurality of latches by pressing each respective one of the plurality of latches inwardly to provide an effective latch or engagement with the catch surface of the connector body to form the connector assembly,
   wherein the pushing and positioning the retainer sleeve over the connector body and the pressing each respective one of the plurality of latches of the retainer sleeve are done simultaneously and all in a single action.

6. The method of claim 5, wherein the connector body includes an interference portion and a shoulder surface defining a frustoconical profile that tapers outward toward the interference portion.

7. The method of claim 5, wherein the step of pressing the plurality of latches is performed using bearing balls housed within an opening of the connector body.

8. The method of claim 7, further comprising a step of calibrating the bearing balls using the adjustment sleeve that calibrates an amount of force applied to the plurality of latches by the bearing balls.

9. The method of claim 7, wherein the plurality of latches are formed by a punching or stamping process.

10. The method of claim 5, wherein the punching or stamping process creates lanced edges in the retainer sleeve.

11. The method of claim 5, wherein the plurality of latches are punched separately such that the retainer sleeve is rotated 90 degrees between each punch to fabricate the plurality of latches in four steps.

12. The method of claim 5, wherein a total of four latches are formed in the retainer sleeve, wherein two of the four latches may be punched in the retainer sleeve simultaneously at 180 degrees apart.

* * * * *